United States Patent
Horimoto

(10) Patent No.: US 10,107,435 B2
(45) Date of Patent: Oct. 23, 2018

(54) COUPLING

(71) Applicant: Sakura Rubber Co., Ltd., Tokyo (JP)

(72) Inventor: Akira Horimoto, Tokyo (JP)

(73) Assignee: SAKURA RUBBER CO., LTD., Tokyo (JP)

( * ) Notice: Subject to any disclaimer, the term of this patent is extended or adjusted under 35 U.S.C. 154(b) by 0 days.

(21) Appl. No.: 15/418,294

(22) Filed: Jan. 27, 2017

(65) Prior Publication Data
US 2017/0138521 A1  May 18, 2017

Related U.S. Application Data

(63) Continuation of application No. PCT/JP2015/071403, filed on Jul. 28, 2015.

(30) Foreign Application Priority Data

Jul. 29, 2014  (WO) .................. PCT/JP2014/069959

(51) Int. Cl.
  *F16L 37/24*  (2006.01)
  *A62C 33/00*  (2006.01)
  (Continued)

(52) U.S. Cl.
  CPC .............. *F16L 37/24* (2013.01); *A62C 33/00* (2013.01); *F16K 17/02* (2013.01); *F16K 17/04* (2013.01);
  (Continued)

(58) Field of Classification Search
  CPC .................................................. F16L 37/252
  (Continued)

(56) References Cited

U.S. PATENT DOCUMENTS

| 380,363 | A | * | 4/1888 | Sturgeon | ............... | F16L 37/252 |
| | | | | | | 285/70 |
| 813,235 | A | * | 2/1906 | Pine et al. | ............ | F16L 37/252 |
| | | | | | | 285/70 |

(Continued)

FOREIGN PATENT DOCUMENTS

| CN | 101307851 A | 11/2008 |
| CN | 101382219 A | 3/2009 |

(Continued)

OTHER PUBLICATIONS

International Search Report and Written Opinion of the International Searching Authority in connection with PCT/JP2014/069959, including English language the International Search Report.

(Continued)

*Primary Examiner* — David Bochna
(74) *Attorney, Agent, or Firm* — John P. White; Cooper & Dunham LLP

(57) ABSTRACT

A coupling includes an engagement face included in an engagement hook which is set at an angle in a range where the engagement face is still inclined at a positive angle, which is maintained when the coupling and a counterpart coupling are in a coupling state, even if a fluid leaks as a result of opening a sealing portion of the couplings, at a state where the coupling state is maintained, or even if a hose or the like fitted to the coupling bursts when high pressure is applied to the coupling, the hose, etc., while in use.

17 Claims, 26 Drawing Sheets

(51) Int. Cl.
*F16K 17/02* (2006.01)
*F16L 55/07* (2006.01)
*F16K 17/04* (2006.01)
*F16L 19/025* (2006.01)
*F16L 37/252* (2006.01)

(52) U.S. Cl.
CPC .......... *F16L 19/025* (2013.01); *F16L 37/252* (2013.01); *F16L 55/07* (2013.01); *F16L 2201/20* (2013.01)

(58) Field of Classification Search
USPC .......................................... 285/70
See application file for complete search history.

(56) References Cited

U.S. PATENT DOCUMENTS

| | | | | |
|---|---|---|---|---|
| 894,900 | A * | 8/1908 | Pohlman | F16L 37/252 285/70 |
| 1,217,041 | A * | 2/1917 | Martz | F16L 37/248 285/70 |
| 5,857,713 | A * | 1/1999 | Horimoto | F16L 37/252 285/91 |
| 6,382,680 | B1 * | 5/2002 | Horimoto | F16L 37/252 285/91 |
| 7,481,467 | B2 * | 1/2009 | Horimoto | F16L 37/252 285/82 |
| 7,798,537 | B2 * | 9/2010 | Nakamura | F16L 37/252 285/376 |
| 9,568,135 | B2 | 2/2017 | Lehmann et al. | |
| 2017/0138520 | A1 | 5/2017 | Horimoto | |

FOREIGN PATENT DOCUMENTS

| | | |
|---|---|---|
| JP | 1988-106990 | 7/1988 |
| JP | 10-038153 A | 2/1998 |
| JP | 3107507 B2 | 11/2000 |
| JP | 2002-039475 A | 2/2002 |
| JP | 2002-039477 A | 2/2002 |
| JP | 200209477 A | 2/2002 |
| JP | 2003-090479 | 3/2003 |
| JP | 3971421 B2 | 9/2007 |
| JP | 4601780 | 12/2010 |
| JP | 4659302 | 3/2011 |
| JP | 4834423 B2 | 12/2011 |

OTHER PUBLICATIONS

International Search Report in connection with PCT International Application No. PCT/JP2014/069959.
Jul. 7, 2017 non-final Office Action in connection with related U.S. Appl. No. 15/418,136.
Aug. 14, 2017 Amendment in Response dated Jul. 7, 2017 Non-Final Office Action in connection with related U.S. Appl. No. 15/418,136.
Aug. 30, 2017 Notice of Allowance in connection with related U.S. Appl. No. 15/418,136.
Fire and Disaster Management Agency, Extraordinary Disaster Management Office, "Notice No. 204", Oct. 28, 2013.
Jan. 19, 2018 Chinese official action (including English translation) in connection with corresponding Chinese patent application No. 201480080864.7.
International Search Report and Written Opinion of the International Searching Authority in connection with PCT/JP2015/071403, including English language the International Search Report.

* cited by examiner

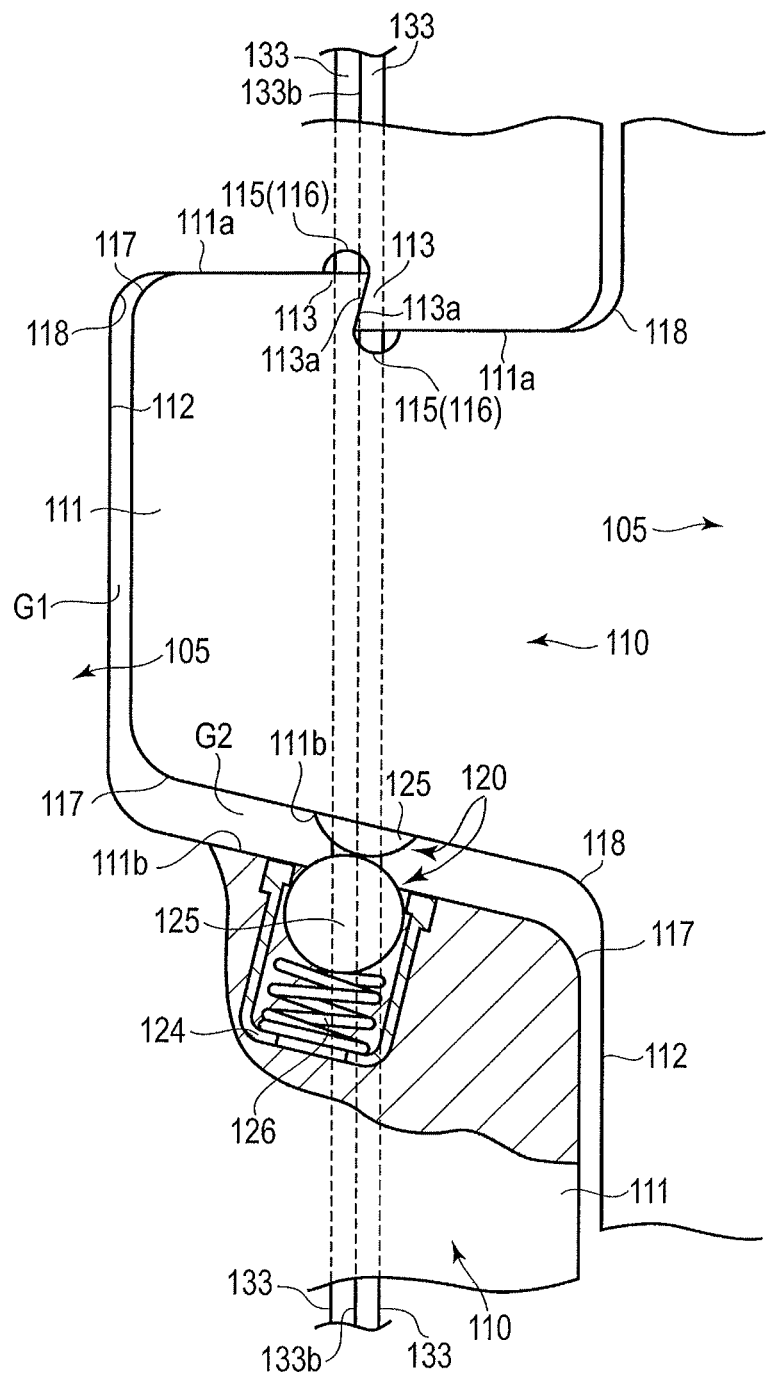
F I G. 2

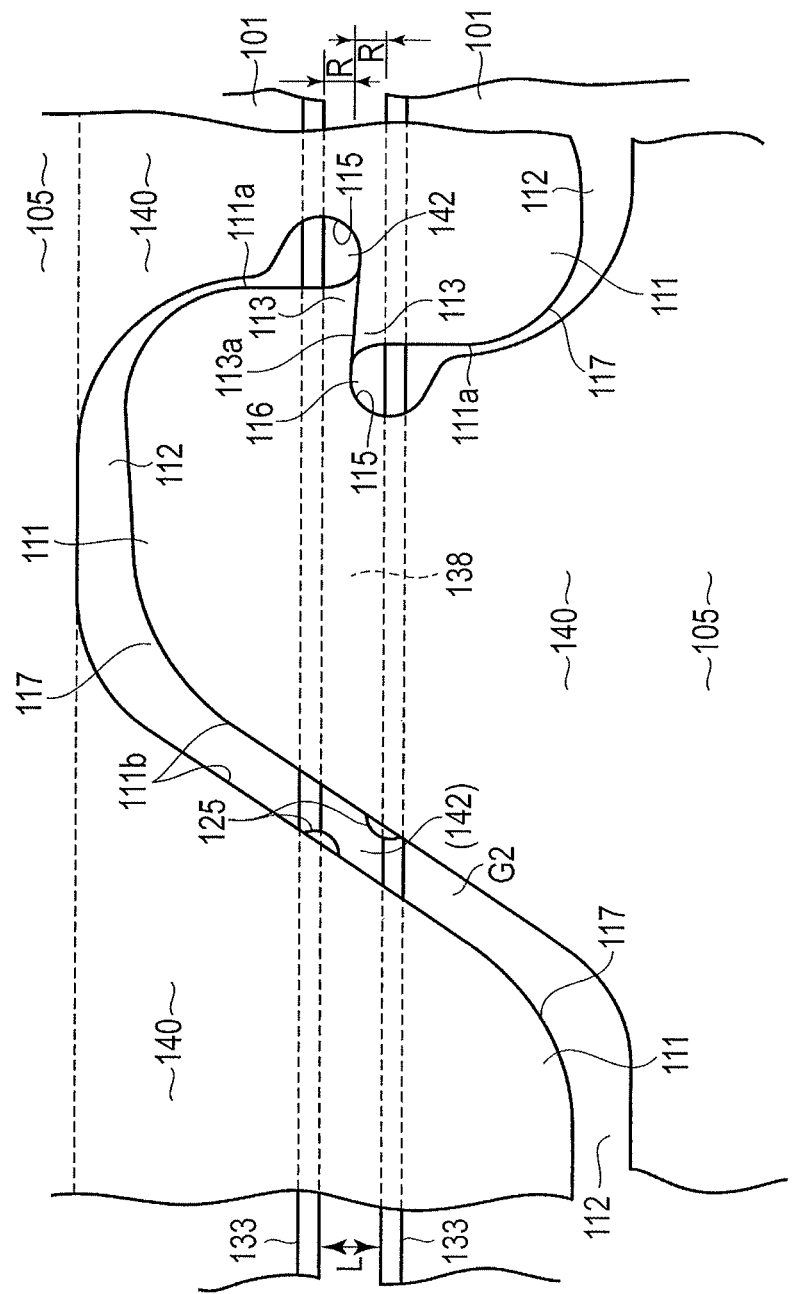
F I G. 5

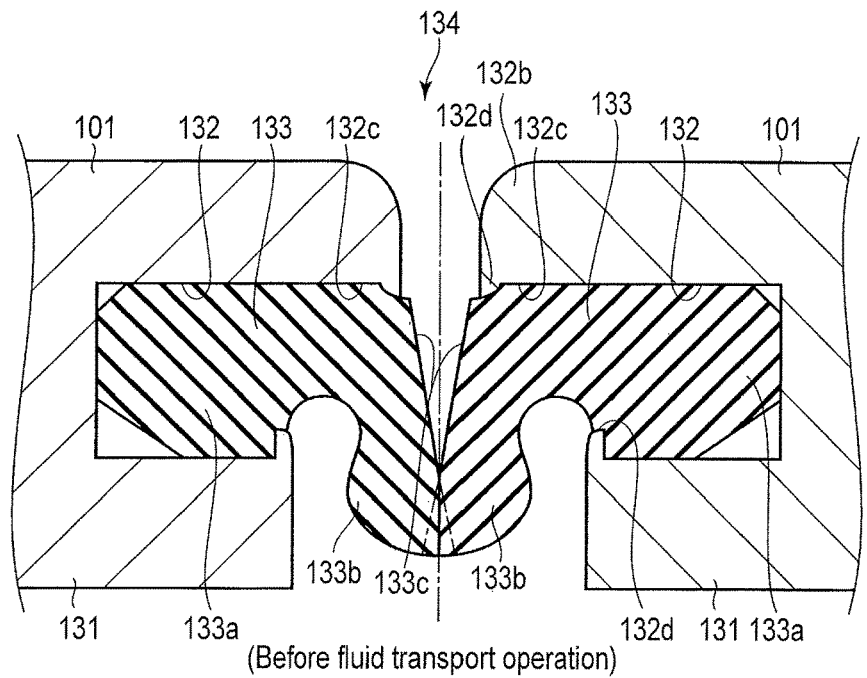
F I G. 7A (Before fluid transport operation)
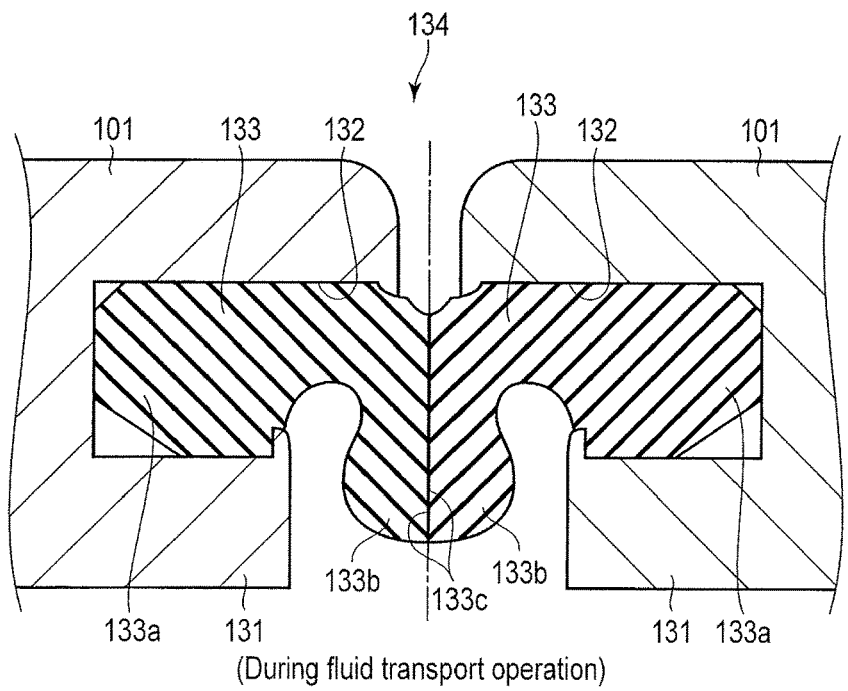
F I G. 7B (During fluid transport operation)

(In state where excessively over-pressurized fluid is discharged)

(In state where excessively over-pressurized fluid has been released)

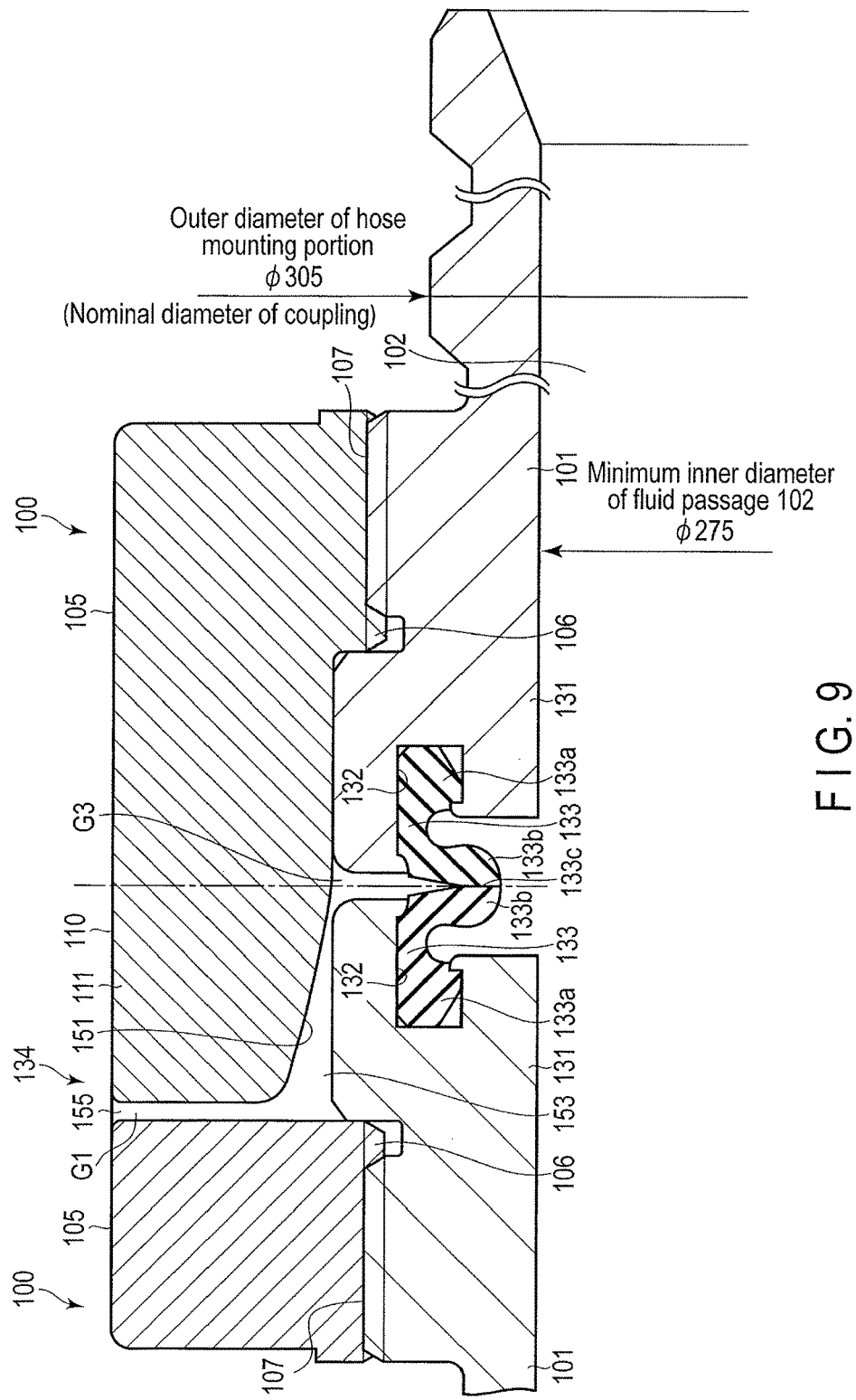
F I G. 9

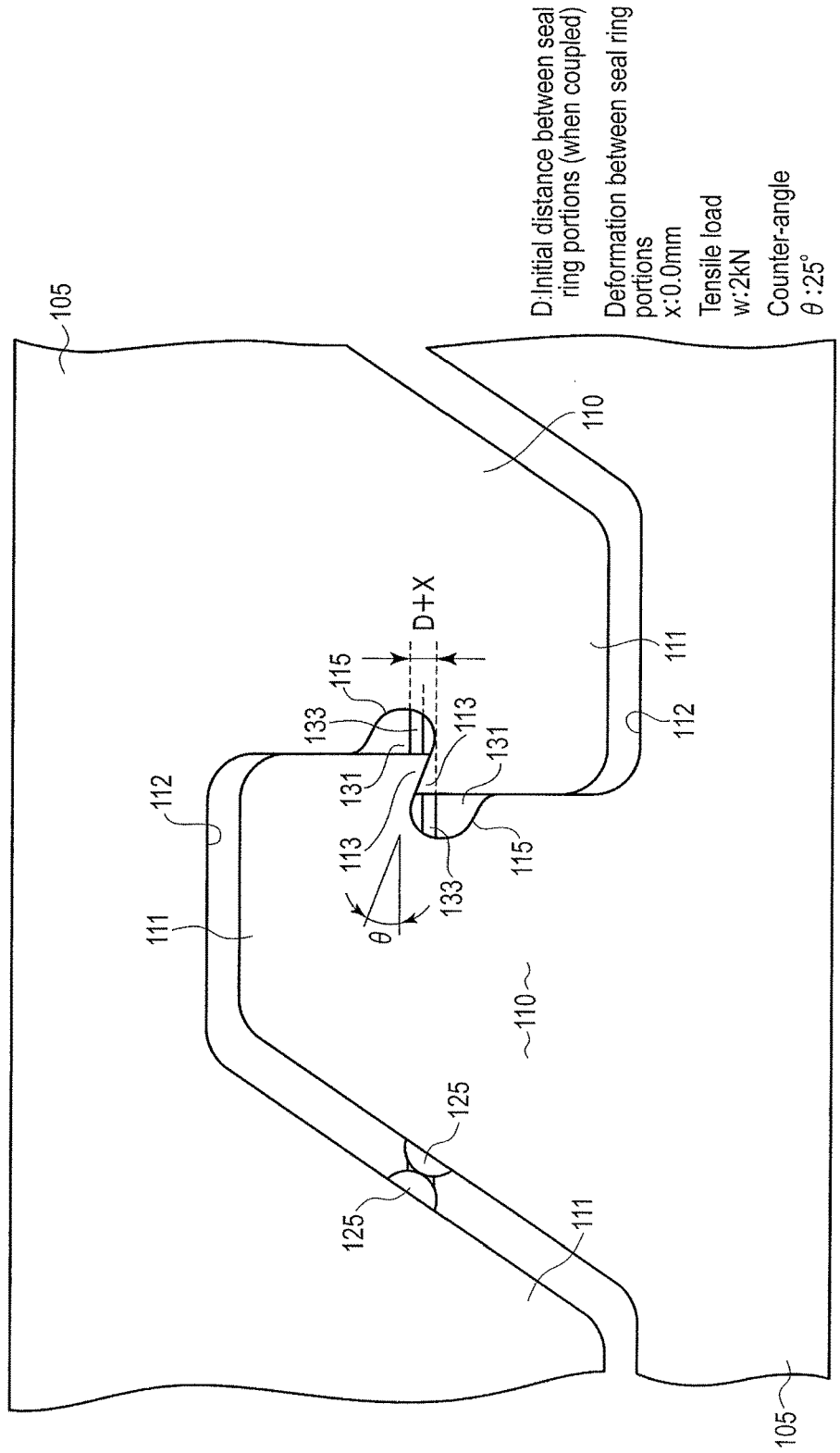
F I G. 18A

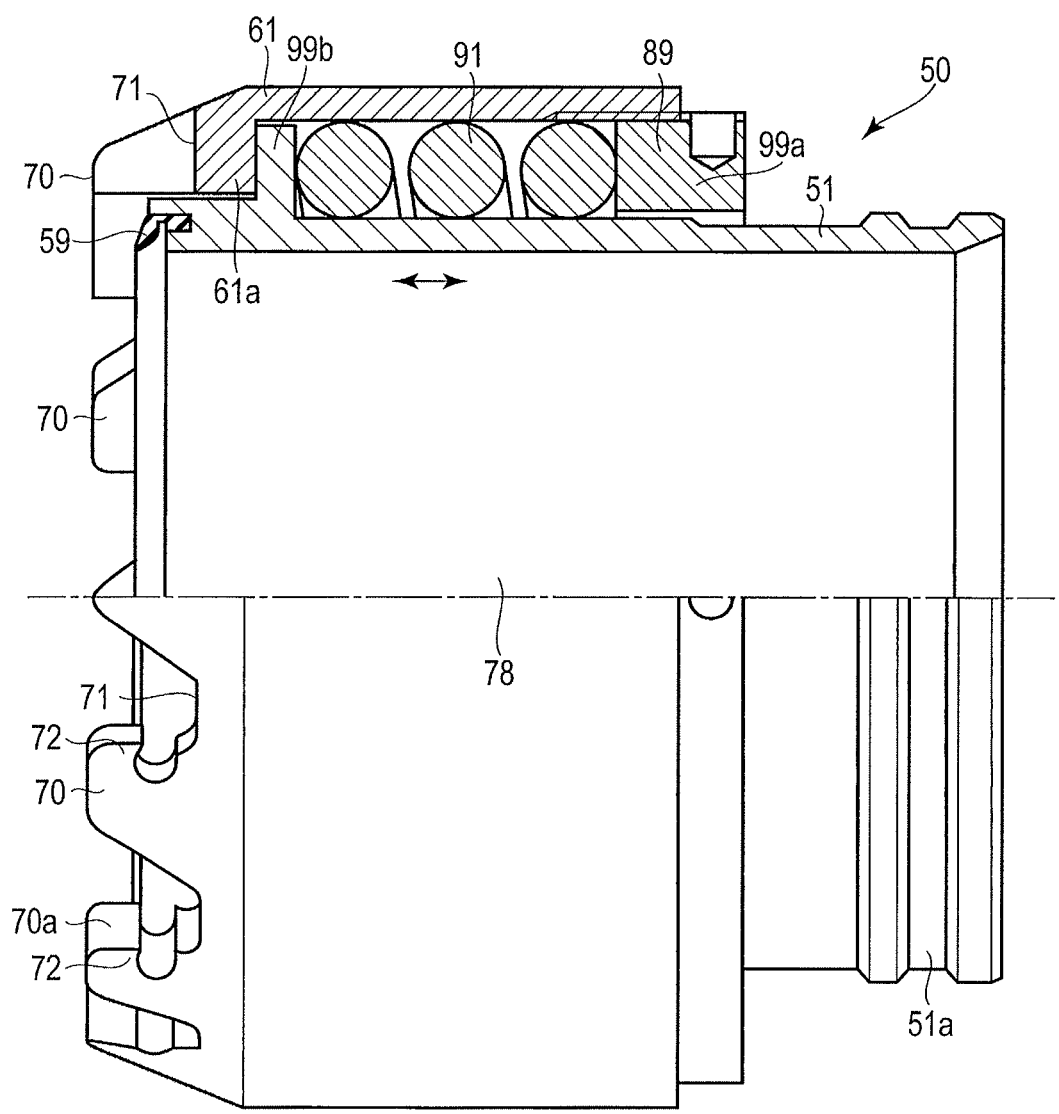
F I G. 21

COUPLING

CROSS REFERENCE TO RELATED APPLICATIONS

This application is a Continuation Application of PCT Application No. PCT/JP2015/071403, filed Jul. 28, 2015 and based upon and claiming the benefit of priority from prior International Application No. PCT/JP2014/069959, filed Jul. 29, 2014, the entire contents of all of which are incorporated herein by reference.

BACKGROUND OF THE INVENTION

1. Field of the Invention

Embodiments described herein relate generally to a coupling which connects tubes such as hoses or pies to each other or the tube to another device such as a pump.

2. Description of the Related Art

Conventionally, safety valves have been used for protecting devices, couplings, hoses and the like from breakage caused by an abnormal pressure surge of a transfer fluid on steam and gas supply lines. However, a conventional safety valve has not been assumed to be used in combination with a large number of hoses, shutoff nozzles, and the like or to be used for a large-capacity foam-water discharge system using a foam fire-extinguishing solution used for such an occasion that an oil storage tank at a petroleum complex catches fire.

In a major petroleum complex, dozens of large-size oil storage tanks are installed. For example, such an oil storage tank has a diameter of 83 meters, a height of 24 meters, and a capacity of 120 thousand kiloliters. If a large-size oil storage tank catches fire, it is impossible to handle the situation with conventional firefighting equipment including fire pumps and fire hoses. The conventional firefighting equipment can discharge water at a maximum of about 2,000 [L/min] and thus cannot possibly handle a fire set to a large-size oil stage tank. Further, it has been said that a large-capacity foam-water discharge system which can discharge water at a rate of 10,000 to 30,000 [L/min] is required for a fire at a large-scale petroleum complex.

When a fire breaks out at a large-scale petroleum complex, a large-capacity foam-water discharge means is obviously required, but if a water source is located at a long distance of a several kilometers away from an oil storage tank, a means of supplying a large volume of water over such a long distance using a water supply hose is also required. When a large volume of water is transported over a long distance, as might be expected, a water supply hose will have a significantly large loss of pressure.

Therefore, to minimize the pressure loss during the transport operation, a large-diameter water supply hose and a large-diameter coupling (type 300 and type 200) are required. Further, it is necessary to pressurize a water supply hose, maintain predetermined pressure, and reliably supply water to a water cannon installed at the end of the water supply hose by installing a water supply pump and a pressure pump are installed in the middle of the water supply pathway of the water supply hose.

FIG. 19 shows an example of a large-capacity foam discharge system. In FIG. 19, reference number 11 indicates a water source such as the sea or a lake, and reference number 12 indicates the land. Reference number 13 indicates a fire site, namely, an oil storage tank at a petroleum complex located at a distance of a several kilometers away from the water source 11. A submersible pump 14 is sunk in the water source 11 and is driven by an engine generator 15 settled on the land 12. A water supply pump 16 is settled on the land 12. A discharge port 17 of the submersible pump 14 and an intake port 18 of the water supply pump 16 are connected to each other by a plurality of water supply hoses 19. To use the plurality of water supply hoses 19, the submersible pump 14 has, for example, four discharge ports 17, and the water supply pump 16 has, for example, four intake ports 18. The water supply hoses 19 which connect the discharge ports 17 and the intake ports 18, respectively, include, for example, four hoses, each having a diameter of 6 inches and a length of 10 meters, and three adjustment hoses, each having a diameter of 6 inches and a length of 3 meters. The water supply pump 16 is connected to a pressure pump 20 via a water supply pathway 21, and the pressure pump 20 is installed in a part of the land 12 which is close to the oil storage tank 13 at the fire site and is far from the water supply pump 16.

Next, the water supply pathway 21 which connects the water supply pump 16 and the pressure pump 20 will be described. The water supply pump 16 has a plurality of discharge ports, for example, four discharge ports 22, and similarly, the pressure pump 20 has a plurality of intake ports, for example, four intake ports 23. The discharge ports 22 of the water supply pump 16 are connected to one ends of four water supply hoses 24, for example, each having a diameter of 6 inches and a length of 50 meters, and the other ends of the water supply hoses 24 are connected to the intake side of a first manifold 25. The first manifold 25 has discharge ports, each having a diameter of 8 inches and connected to one ends of two water supply hoses 26, each having a length of 1000 meters. The other ends of the water supply hoses 26 are connected to a second manifold 27. The second manifold 27 has intake ports, each having a diameter of 6 inches and has discharge ports, respectively connected to one ends of four water supply hoses 28, each having a length of 10 meters. The other ends of these water supply hoses 28 are connected to the intake ports 23 of the pressure pump 20.

Further, in FIG. 19, reference number 29 indicates an undiluted solution transport vehicle loaded with a tank 30 containing foam-fire-extinguishing chemical agent (undiluted solution) to be used for extinguishing a fire set to the oil storage tank 13. The tank 30 of the undiluted solution transport vehicle 29 is connected to one ends of two rubber intake pipes 31, each having a diameter of 3 inches and a length of 10 meters, and the other ends of the rubber intake pipes 31 are connected to intake ports 33 of an undiluted solution pump 32. Discharge ports 34 of the undiluted solution pump 32 are connected to one ends of two canvas hoses 35, each having a diameter of 2.5 inches and a length of 10 meters. The other ends of the canvas hoses 35 are connected to undiluted solution intake ports 37 of the pressure pump 20 via a mixer 36, and in the mixer 36, the foam-fire-extinguishing chemical agent (undiluted solution) is diluted with water supplied from the water source 11 at a dilution rate of, for example, 1%, and a foam-fire-extinguishing solution is produced.

Further, the pressure pump 20 has a plurality of discharge ports, for example, four discharge ports 38. Similarly, a manifold 40 of a foam-water cannon 39 has a plurality of connection joints, for example, four connection joints (couplings) 41. The discharge ports 38 of the pressure pump 20 and the connection joints (couplings) 41 of the intake side of the manifold 40 of the foam-water cannon 39 are connected to each other, for example, by four water supply hoses 42, each having a length of 20 meters. Further, the foam-water cannon 39 discharges a large volume of foam to the fire site (oil storage tank) 13 to extinguish the fire.

Each of the water supply hoses 24, 28, 42 or the like comprises connection joints (couplings) 43 at both ends and is detachably connected to pumps or the like via the connection joints (couplings) 43. According to the fire extinguishing situation, it is possible to increase or decrease the number of the water supply hoses 24, 28 and 42. In the discharge ports 22 of the water supply pump 16 and the discharge ports 38 of the pressure pump 20, the connection joints (couplings) 43 are provided via valves 44.

In the meantime, during the firefighting operation using the above-described large-capacity foam-water discharge system, the operation of the system is monitored. In the operation, there is a possible of accidents, that is, water leakage may occur from between the connection joint 43 and the water supply hose 24 or 42 for some reason or other, or water leakage may occur when the connection joint 43 is broken. For example, if water leakage occurs in one of the four connection joints 43 connected to the connection joints 41 of the nearest manifold 40 to the foam cannon 39, an operator of the foam-water cannon 39 reports the situation to a supervisor, and the supervisor contacts an operator who is monitoring the pressure pump 20 by radio or the like and instructs the operator to decrease the rotation speed of the pump and then stop the operation of the pump, and also instruct the operator to stop the water supply pump 16 and the submersible pump 14 and then close the four valves 44 connected to the four hoses including the water supply hose 42 where the water leakage has occurred.

Then, the operator immediately instructs an operator who is monitoring the water supply pump 16 to decrease the rotation speed of the pump and then stop the operation of the pump, and instructs an operator who is monitoring the submersible pump 14 to decrease the rotation speed of the pump and then stop the operation of the pump after the supply pump 16 has stopped. In this case, there will be no trouble if the operator who is monitoring the pressure pump 20 closes the four valves 44 connected to the four hoses including the water supply hose 42 where the water leakage has occurred after the operations of the water supply pump 16 and the submersible pump 14 are completely stopped. However, if the operator makes haste to close the four valves 44 while the water supply pump 16 and the submersible pump 14 are still rotating, a fluid pressure surge, namely, a water hammer is created by dynamic pressure which is different from rated pressure (static pressure) of the water supply pump 16 and the like and is applied to the water supply hoses 28, 26, 24, and the like. Therefore, it may burst the water supply hoses 28, 26, 24, and the like or break the couplings 43 attached to these hoses.

Further, based on the assumption that the operators perform inappropriate operations and the water supply hoses 24, 26, 28, 42 and the like may be subjected to such high pressure, the pressure resistance level of the water supply hoses 24, 26, 28, 42 and the like is designed to some extent. However, such water supply hoses 24, 26, 28 and 42 having high pressure resistance level will be expensive and will be difficult to maneuver as the water supply hoses themselves become heavier and harder.

Still further, in a large-capacity foam-discharge system of this kind, a water supply line is composed of a several tens of hoses. Then, a safety valve is attached to a nearest manifold to a high-pressure fluid pump or the like. However, if a valve of a discharge port, an intake port, or the like is abruptly closed, a water hammer is created, and the pressures of the valve on the water source side increases up to about 2 to 3 times of the normal pressure of the water transport operation. Further, in a case where the water supply line equips with a plurality of pumps for preventing a pressure loss on the middle of the water supply line, a water hammer tends to be created on the water supply line by lack of cooperation between these pumps. In addition, a large number of valves are provided in various locations on the water supply line. Therefore, a water hammer may be created everywhere on the water supply line.

Therefore, to prevent breakage of water-discharge equipment, a coupling, a hose and the like or to avoid fatal accidents by such an abnormal pressure surge on a water supply line, a coupling with a safety mechanism has been proposed (JP 4834423 B). The coupling with the safety mechanism (connection joint) 50 is shown in FIG. 20. In this structure, a safety valve (pressure valve) is attached to the body of coupling 50. A branch pipe 52 is provided in the middle of a cylindrical coupling body 51 of the coupling 50, and a safety valve 80, which will be described later, is attached to the branch pipe 52. Therefore, the branch pipe 52 and the safety valve 80 are arranged perpendicularly with respect to the axis of the coupling body 51, and the coupling 50 has a T shape as a whole.

Further, as shown in FIG. 20, coupling portions 57a and 57b, which have the same structure as each other, are assembled into the ends of the coupling body 51, respectively. Each of the coupling portions 57a and 57b comprises a cylinder body 58. The cylinder body 58 has a cylindrical shape, and at the outer edge of the cylinder body 58, a sealing member 59 such as a rubber packing is attached. Further, the coupling portions 57a and 57b are axially coupled with those of the other coupling 50, which have the same structure as the one coupling 50, and at this time, the sealing members 59 at the outer edges of the cylinder bodies 58 are attached to those of the other couplings 50, and fluid passages 78 in the cylinder bodies 58 are, as maintained to be sealed from the outside, communicated with those of the other couplings 50.

Still further, in each of the coupling portions 57a and 57b, a coupling ring 61 is attached to the cylinder body 58, and at the outer edge of the coupling ring 61, a plurality of engagement projections, for example, nine engagement projections 70 are provided. These engagement projections 70 are circumferentially arranged at regular intervals and axially project outward with respect to the sealing member 59. The regions between the engagement projections 70 are engagement recesses 71. Further, when the coupling portions 57a and 57b are axially coupled with those of the other couplings 50, the engagement projections 70 of the coupling portion 57a of the one coupling 50 are fitted into the engagement recesses 71 of the coupling portion 57b of the other coupling 50, and the engagement projections 70 of the coupling portion 57b of the other coupling 50 are fitted in the engagement recesses 71 of the coupling portion 57a of the one coupling 50. That is, the coupling is a unisex coupling and is complementarily engaged with the other coupling.

Still further, a step-like hook, namely, an engagement hook 72 is formed in one side surface 70a of each engagement projection 70, and the engagement hooks 72 of the one engagement projections 70 are circumferentially engaged with the engagement hooks 72 of the engagement projections 70 of the other coupling 50.

Still further, a biasing mechanism 73 is provided in the other side surface of the engagement projection 70, which is opposite to the side surface of the engagement projection 70 provided with the engagement hook 72. The biasing mechanism 73 comprises a steel ball 74 and a spring (not shown)

which pushes the steel ball 74 in the projecting direction. Therefore, when the engagement projections 70 are engaged with the engagement recesses 71, the steel balls 74 of the one engagement projections 70 are pressed against the steel balls 74 of the other engagement projections 70, and the other side surfaces of the engagement projections 70, that is, the side surfaces of the engagement projections 70 provided with the steel balls 74 are separated from each other. As a result, the side surfaces of the engagement projections 70, that is, the side surfaces provided with the engagement hooks 72 are brought closer to each other, and thus the engagement hooks 72 are engaged with each other.

Still further, the safety valve (pressure valve) 80 is provided at the end of the branch pipe 52 as a safety valve mechanism which discharges an internal fluid to the outside when the inner pressure of the branch pipe 52 exceeds a set pressure level. A valve body 81 of the safety valve 80 is detachably attached to the end of the branch pipe 52. In the valve body 81, an inward-projecting valve seat element 84 and a valve body 86 are provided. When the pressure of the fluid passage 78 in the coupling 50 is abnormally high, the valve body 86 opens such that the fluid passage 78 becomes open to the outside.

An upward-projecting valve rod 87 is provided in the valve element 86. The valve rod 87 penetrates through a through-hole 90 of an adjustment screw member 89 screwed into a female screw portion 88 formed at the top of the valve body 81. The valve rod 87 is supported in an axially movable manner with respect to the adjustment screw member 89. A coil spring 91 is wound around the valve rod 87 and is interposed between the lower surface of the adjustment screw member 89 and the upper surface of the valve element 86 in a compressed manner. It is possible to adjust the pressing force of the coil spring 91 by rotating the adjustment screw member 89 and determining the vertical movement position of the adjustment screw member 89. In this way, it is possible to adjust a setting pressure at which the valve element 86 opens. A relief hole 92 which leads to the outside is provided in the circumferential wall of the valve body 81, and the fluid passage 78 is communicated with the outside through the relief hole 92.

Further, when the pressure of the foam fire-extinguishing solution or the like in the fluid passage 78 exceeds the setting pressure, the valve body 86 is pushed up against the pressing force of the coil spring 91, and as the valve body 86 is separated from the valve seat 84, a part of the foam fire-extinguishing solution or the like in a fluid passage 85 is discharged to the outside through the relief hole 92, and the pressure of the solution in the fluid passage 78 is reduced. Therefore, it is possible to prevent such a situation where fluid pressure higher than the setting pressure is applied to other fire hoses, couplings, and the like.

CITATION LIST

Patent Literature

Patent Literature 1: JP 3107507 B
Patent Literature 2: JP 3971421 B
Patent Literature 3: JP 4834423 B

BRIEF SUMMARY OF THE INVENTION

Technical Problem

A coupling of Patent Literature 1 is obtained from "a coupling which connects tubes to each other or the tube to another device, the coupling including: a fitting portion which is formed at one axial end of the coupling and on which the tube is fitted; a coupling portion which is formed at the other axial end of the coupling and is coupled with a counterpart coupling; an engagement hook which is provided in the coupling portion and is engaged with an engagement hook of the counterpart coupling; a sealing face which is axially abuts and closes a gap with a sealing face of the counterpart coupling; and a fluid passage which is formed inside the coupling" in combination with "a urging mechanism which engages the engagement hooks with each other". As the couplings are axially pushed into each other, the couplings are automatically rotated and jointed with each other.

Note that, as a coupling which is excluded "the biasing mechanism which engages the engagement hooks with each other" from the coupling of Patent Literature 1, an "AWG MultiLug" manufactured by AWG Fittings GmbH in Germany, a "J Stroz" manufactured by Japan Fire-fighting Equipment Manufacture's Association, and the like are known and are used for large-capacity foam-water discharge systems and the like.

A coupling of Patent Literature 2 is obtained from a "a coupling which connects tubes to each other or the tube to another device, the coupling including: a fitting portion which is formed at one axial end of the coupling and on which the tube is fitted; a coupling portion which is formed at the other axial end of the coupling and is coupled with a counterpart coupling; an engagement hook which is provided in the coupling portion and is engaged with an engagement hook of the counterpart coupling; a sealing face which is axially abuts and closes a gap with a sealing face of the counterpart coupling; and a fluid passage which is formed inside the coupling" which is modified with "an engagement face of the engagement hook that is engaged with the engagement hook of the counterpart coupling is inclined at an angle in an overhanging manner with respect to a circumferential direction of the coupling, and the engagement face makes the engagement hooks are further tightly engaged with each other by causing an axial load, which acts in a direction to separate the coupling from each other, generates a component force in the circumferential direction of the coupling according to the angle (counter-angle θ, the same applies hereafter) and brings the engagement hooks further closer to each other in the circumferential direction in the engagement state".

Note that the reason why the coupling fitting of Patent Literature 2 was assumed to be used under "an extremely large load which is produced by excessively high pressure such as excessively high water pressure or the like within the coupling and acts in directions to separate coupling bodies from the other" is that performances of general fire-fighting pumper trucks had been highly developed, and such a situation where "water pressure to be applied to a hose or a coupling fitting has increased from 1.3 MPa to 1.6 MPa (or even up to 2.0 MPa in some cases)" had been notable since the Heisei era (since 1989) and there had been need to deal with the situation. That is, the pressure was assumed to be within a range of the working pressure of the hose or the coupling, and the technical object was to prevent such a situation where "when an extremely high load is applied to the engagement hook for a long period of time, an engagement projection provided with the engagement hook is sagged (plastically deformed), and consequently, the engagement face of the engagement hook will be inclined in an opposite manner to the overhanging manner with respect to the circumferential direction of the coupling, so as to that a leading end portion that locates the farthest from the engagement projection provided with the engagement hook than a base portion that locates near to the engagement projection provided with, the engagement hook in the circumferential direction shifts axially farther from an innermost wall surface of the engagement recess which is adjacent to the engagement hook of the engagement projection" and such a situation where "since the leading end in the engagement face is more severely worn than the base portion in the engagement face, when wearing of the engagement face of the engagement hook proceeds in association with a long period of use, the engagement surface will be inclined in an opposite to the overhanging manner with respect to the circumferential direction of the coupling as in the above-described case of the sagging of the engagement projection".

However, in subsequent researches by the inventors of the present application, couplings which had been used for nearly ten years were retrieved and examined. As a result, it was found that, in the case of "the coupling, wherein at least one of the coupling, the coupling part and the coupling portion is formed of a forged aluminum alloy having a tensile strength of 250 N/mm² or more and an elongation rate of 15% or more", sagging (plastic deformation) has hardly occurred even after a long period of use, and "the engagement projection has not been sagged". Further, it was also found that, in the case of "the coupling, wherein at least one of the coupling, the coupling part, and the coupling portion is formed of a forged aluminum alloy and is applied hard anodic oxide coatings on aluminum treatment", even after a long period of use, "the wearing of the engagement face has slightly proceeded". Still further, it was also found that, in the case of "the coupling, wherein at least one of the coupling part and the coupling portion is formed of a forged aluminum alloy having a tensile strength of 140 N/mm² or more and an elongation rate of 6% or more and is not applied hard anodic oxide coatings on aluminum treatment", due to sagging (plastic deformation) associated with a long period of use, "the engagement projection has been greatly sagged" and "the wearing of the engagement surface has proceeded". Hence, it is not sufficient for dealing with the above-described situation, although the material, the material properties, the surface treatment, and the like are not specified but "only the overhanging angle is specified" for the coupling.

Note that, back in 1996 when the coupling of Patent Literature 2 was invented, fire-fighting equipment of the day in which pumps for various operations such as a water suction operation, a water transport operation and a water discharge, operation, as well as water discharge equipment, and the like were incorporated, was considered to have a high level of safety and was widely acknowledged as safely operable by fire departments, and thus it was assumed that "the pressure to be applied to the coupling for a long period of time is less than or equal to the working pressure of the coupling, and the maximum pressure to be applied to the coupling is the test pressure (1.5 times the working pressure) which is applied to the coupling for a short period of time.

However, after reviewing the notification from Fire and Disaster Management Agency (Fire and Disaster Management Agency, Special Disaster Office, No. 204 of Oct. 28, 2013), the inventors of the present application have recognized that "even in a large-capacity foam-water discharge system, it is possible to really happen an accident of the coupling disruption caused by that a coupling is applied abnormally high fluid pressure exceeding the working pressure or the test pressure of the coupling" and thus the inventors of the present application have arrived at the present invention through researches on accident prevention measures against all the new possibilities.

In the coupling with the safety mechanism of Patent Literature 3, the coupling body and the safety valve arranged in a substantially T shape, and the safety valve is attached to the coupling body as a separate voluminous mechanism. Therefore, as a whole, the coupling increases in size and volume. Further, since the coupling has a T-shaped outer shape, a direction for the installation of the top and the bottom of the coupling is specified. Therefore, the coupling with the safety mechanism cannot be easily installed in various locations on the water supply line. Further, since the safety valve is attached to the coupling body as a separate mechanism, the structure of the coupling becomes complicated, and consequently the manufacturing cost increases.

Still further, if the coupling or the like is broken and the pair of the couplings is uncoupled, the heavy couplings and the like will fly off at terrible speed. It is extremely dangerous, and more serious accidents than just hose breakage or fluid leakage will be occurred. In light of the above, there has been demand for a simple, compact, and easy-to-use coupling with a safety function.

In consideration of the above-described object, the inventor has considered a coupling 50 shown in FIG. 21. In the coupling 50, a coil spring 91 is not arranged inside a coupling body 51 but is arranged in such a manner as to be wound around the outer periphery of the coupling body 51, and a wide fluid passage 78 is secured in the coupling body 51. Further, the coil spring 91 is arranged in the room between the outer periphery of the coupling body 51 and the inner periphery of a coupling ring 61. The rear end of the coil spring 91 pushes a spring receiving member 99a which is screwed into the rear end of the coupling ring 61, and the front end of the coil spring 91 pushes a stopper wall 99b which stands in the outer periphery of the axial front end of the coupling body 51.

Further, engagement projections 70 and engagement recesses 71 which are similar to those shown in FIG. 20 are formed at the axial front end of the coupling ring 61. An axial front end portion 61a of the coupling ring 61 projects inward, and the end portion 61a abuts against the front wall surface of the stopper wall 99b from the front side. Further, the coupling body 51 is axially pushed forward by the coil spring 91, and thus the coupling body 51 is generally is in contact with the axial front end portion 61a of the coupling ring 61 and remains advanced.

In the coupling body 51, the coupling ring 61 is only provided at one axial end of the coupling body 51, and the other axial end of the coupling body 51 serves as a fitting portion 51a on which a hose or the like is mounted.

Further, a sealing member 59 is arranged in a ring region at the end of the coupling body 51. Still further, since the ring region of the coupling body 51 which functions as a valve body and a portion of the sealing member 59 which function as a valve unit have large diameters, the fluid passage 78 will have a large diameter, and a large volume of fluid can be transported trough the fluid passage 78. Still further, since the wide fluid passage 78 can be secured, the pressure loss can be reduced.

However, in the coupling of this structure, as the diameter of the valve unit increases, the area of the valve unit subjected to the fluid pressure increases, and the force applied to the valve body increases, accordingly. Therefore, it is necessary to increase the strength of the coil spring 91. Further, even if a strong material is used for the coil spring 91, as the inner diameter (winding diameter) of the coil spring 91 increases, the spring force decreases, accordingly. Therefore, it is impossible to make the coil spring 91 sufficiently strong without increasing the wire diameter of the material of the coil spring 91. Consequently, the coil spring 91 becomes large, and the coupling becomes heavy and voluminous.

Further, since the coupling 50 is equipped with a pressure valve driving mechanism, the structure of the coupling 50 becomes complicated, and the manufacturing cost increases, accordingly. Certainly, as compared to that of the T-shaped coupling shown in FIG. 20, the structure of the linear coupling 50 is simpler and more compact. However, this coupling 50 is still not light, simple or compact enough to substitute for a conventional coupling, and the manufacturing cost of this coupling 50 is still high.

In the case of using a large-diameter coupling for the above-described large-capacity foam-water discharge system or the like, when the pressure of fluid to be transported unusually increases and the coupling or the like is broken and is uncoupled from the other coupling, the heavy coupling will fly off at terrible speed. In case the coupling hits people, people will be seriously injured. Therefore, it is significantly important, even when an abnormality happens and the pressure of fluid to be transported exceeds an allowable limit or a test limit, to prevent the coupling from being uncoupled while the coupling is in use. Further, even in the case of a coupling which is not provided with a safety valve function, it should avoid the coupling being detached before the hose and the like are broken. Certainly, even in the case of a coupling which is provided with a safety valve function of releasing abnormally high pressure, it is preferable that the coupling should not be detached even under the maximum pressure at which the safety valve function is activated and the abnormally high pressure is released. Still further, to increase the freedom of selectivity for the hoses which is used with the coupling, it is also desired the coupling which is not detached even if the coupling is applied a high pressure with respect to the working pressure. Moreover, it is also desired the coupling which is not detached even if the coupling is applied a high pressure with respect to the testing pressure. Still further, in the case of the coupling with the safety valve function, it is also desirable that, when the pressure is reduced by leaking the fluid while the coupling is maintained to be coupling state, the coupling may warn the operator or the like of the abnormality by squirting the fluid out.

Solution to Problem

According to claim 1, a coupling which couples tubes to each other or the tube with another device, the coupling comprises: a fitting portion which is formed at one axial end of the coupling and on which the tube is fitted; a coupling portion which is formed at the other axial end of the coupling and is coupled with a counterpart coupling; an engagement hook which is provided in the coupling portion and is engaged with an engagement hook of the counterpart coupling; a sealing face which axially abuts and closes a gap (with a sealing face of the counterpart coupling); and a fluid passage which is formed inside the coupling; and an engagement face which is provided at the engagement hook and is inclined at a predetermined angle in an overhanging manner with respect to a circumferential direction of the coupling, the engagement face which makes the engagement hook engage further tightly with the engagement hook of the counterpart coupling causing an axial load, which acts in a direction to separate the couplings from each other in an engagement state where the engagement hook is engaged with each other, generates a component force in the circumferential direction of the coupling according to the predetermined angle and brings the engagement hooks further closer to each other in the circumferential direction in the engagement state, wherein the engagement face is kept the predetermined angle in a range where the engagement face is still inclined in the overhanging manner at a positive angle with respect to the circumferential direction of the coupling and the engagement hooks are still maintained in the engagement state, even if the coupling portions is elastically or plastically deformed when an excess load is applied axially to the coupling portions or the couplings during pressure of a fluid unusually increases up to bursting pressure of the tube.

According to claim 2, a coupling which couples tubes to each other or the tube with another device, the coupling comprises: a coupling body including a fitting portion which is formed at one axial end of the coupling body and on which the tube or the other device is fitted, and a fluid passage which is formed inside the coupling body; a coupling part including an attachment portion which is formed at one axial end of the coupling part and is attached to the coupling body, a coupling portion which is formed at the other axial end of the coupling part and is coupled with a counterpart coupling, an engagement hook which is provided in the coupling portion and is engaged with an engagement hook of a counterpart coupling, and a sealing face which is provided in the coupling portion and axially abuts (with a sealing surface of the counterpart coupling) to close a gap; a deformation portion which is formed in the coupling part the deformation portion which creates a leak path through which a fluid is discharged to outside by separating the sealing face from the sealing face of the counterpart coupling when the deformation portion is axially elongated by an unusual tensile force which is applied axially to the coupling part when pressure of a fluid within the coupling body abnormally increases; and an engagement face which is provided on the engagement hook that is engaged with the engagement hook of the counterpart coupling, the engagement face which is inclined at an angle in an overhanging manner in a circumferential direction of the coupling, wherein the engagement face keeps the angle in a range where the engagement face is still inclined in the overhanging manner at a positive angle with respect to the circumferential direction of the coupling and the engagement hook is still maintained in the engagement state, even if the leak path through which the fluid is discharged to the outside is created by separating the sealing faces from each other when the deformation portion is elongated during the pressure of the fluid unusually increases.

According to claim 3, in the coupling according to claims 1 or 2, the engagement face is kept the angle in a range where the engagement face is still inclined in the overhanging manner at a positive angle with respect to the circumferential direction of the coupling even if the coupling portion is deformed by being applied an axial load which is generated when the pressure of the fluid unusually increases 3 times working pressure of the coupling.

According to claim 4, in the coupling according to any one of claims 1, 2 and 3, the engagement face is kept the angle in a range where the engagement surface is still inclined in the overhanging manner at a positive angle with respect to the circumferential direction of the coupling even if the coupling portion is deformed by being applied an axial load which is generated when the pressure of the fluid increases up to test pressure of the coupling, which is 1.5 times high as the working pressure.

According to claim 5, in the coupling according to any one of claims 1 to 4, at least one of the coupling body, the coupling part, and the coupling portion is formed of a forged aluminum alloy having a tensile strength of 250 N/mm² or more and an elongation rate of 15% or more, and the engagement face is set at the angle in a range of 20° to 30°.

Present inventions aim to enhance the safety of the whole system for fire fighters or peoples around the system, by reducing the pressure to open a leak path in a sealing portion of the coupling appropriately while maintaining the coupling condition with the counterpart coupling or to break the light, soft and relatively-safe hose or the like while preventing the coupling from breaking and the heavy and hard coupling from flying off at terrible speed, even if a coupling, a tube such as a hose, and the like are subjected to unusually high pressure for some reason or other during the operation. Present inventions described herein also provide a coupling which can warn the operator or the like of an abnormality by ejecting the fluid out from the leak path.

Further, present inventions also aims to provide a coupling reduced in weight and size as much as possible and having the simplest structure possible at much the same cost as that of a conventional coupling and to substitute the present coupling with the safety valve function for the conventional coupling.

In the present inventions, the safety is placed at the highest priority, and thus once the safety valve is operated under abnormally high pressure, the safety valve are not necessarily reset to the original state.

Note that the fluid flowing through the coupling according to each claims of the present invention is mainly assumed to be fluid such as water or sea water, and that the coupling according to present invention is assumed to be applied to all the couplings or the main couplings used in one pumping system composed of hoses or the like. Further, in a case where a coupling is used in a large-capacity foam-water discharge system, at least ten pairs of the present couplings (ten pairs of the couplings in a case where two lines of four hoses are arranged in parallel) may be used.

Advantageous Effects of Invention

According to embodiments, the safety of the coupling is secured by reducing the pressure to open the leak path in the sealing portion of the coupling while maintaining the coupling condition between the couplings, or to break the light, soft, and relatively-safe hose or the like instead of breaking the coupling preventing the heavy and hard coupling from flying off at terrible speed, even if the coupling, the tube such as the hose and the like are subjected to abnormally high pressure for some reason or other during the operation.

Further, according to the coupling body provided with the fluid ejection ports which eject the fluid discharged from the leak path formed between the sealing members which are separated from each other when the pressure of the fluid unusually increases, it is possible to warn the operator of the abnormality which is revealed by ejecting the fluid, which is discharged from the leak path, from the fluid ejection ports.

BRIEF DESCRIPTION OF THE SEVERAL VIEWS OF THE DRAWING

FIG. 2 is a drawing showing a structure of coupling portion of the coupling of the same embodiment.

FIG. 5 is a drawing showing a region near the coupling portions and the sealing portions in a state where a safety function of the couplings of the embodiment is activated.

FIG. 7A is a cross-sectional drawing showing a region near sealing members in a state where the pair of couplings of the embodiment is coupled together.

FIG. 7B is a cross-section drawing showing a region near the sealing members during a fluid transport operation in a state where the pair of couplings of the embodiment is coupled together.

FIG. 9 is a drawing showing a region near coupling portions in a state where the pair of couplings of the modification is coupled together.

FIG. 18A is an explanatory drawing showing a deformation state of the coupling portion of the test specimen of the embodiment under a tensile load of 2 [kN].

FIG. 21 is a side view partly in section of a further improved coupling with a safety valve mechanism.

DETAILED DESCRIPTION OF THE INVENTION

Figure 1:
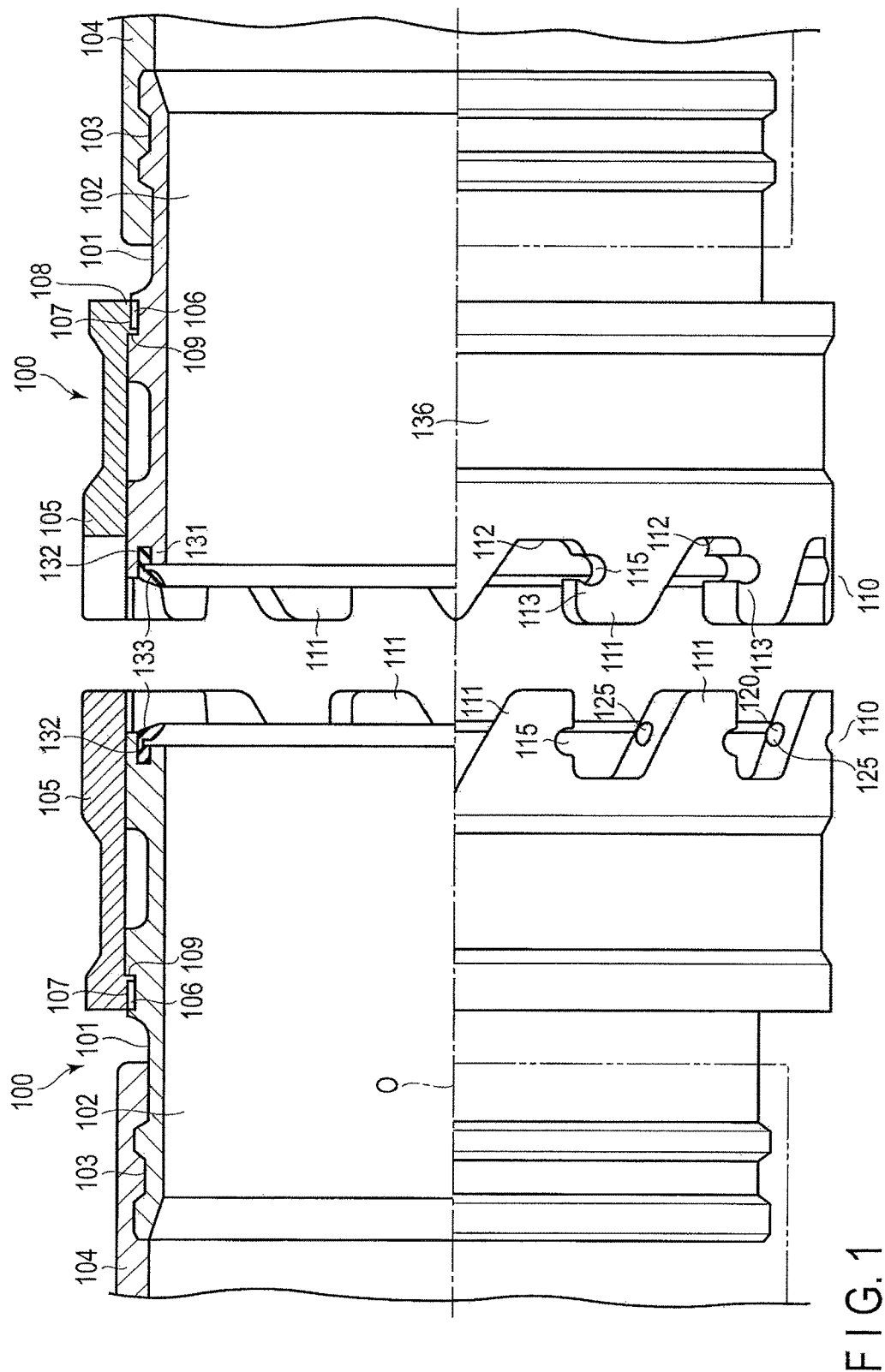
FIG. 1 is a side view partly in section of a pair of couplings of an embodiment.
Figure 3:
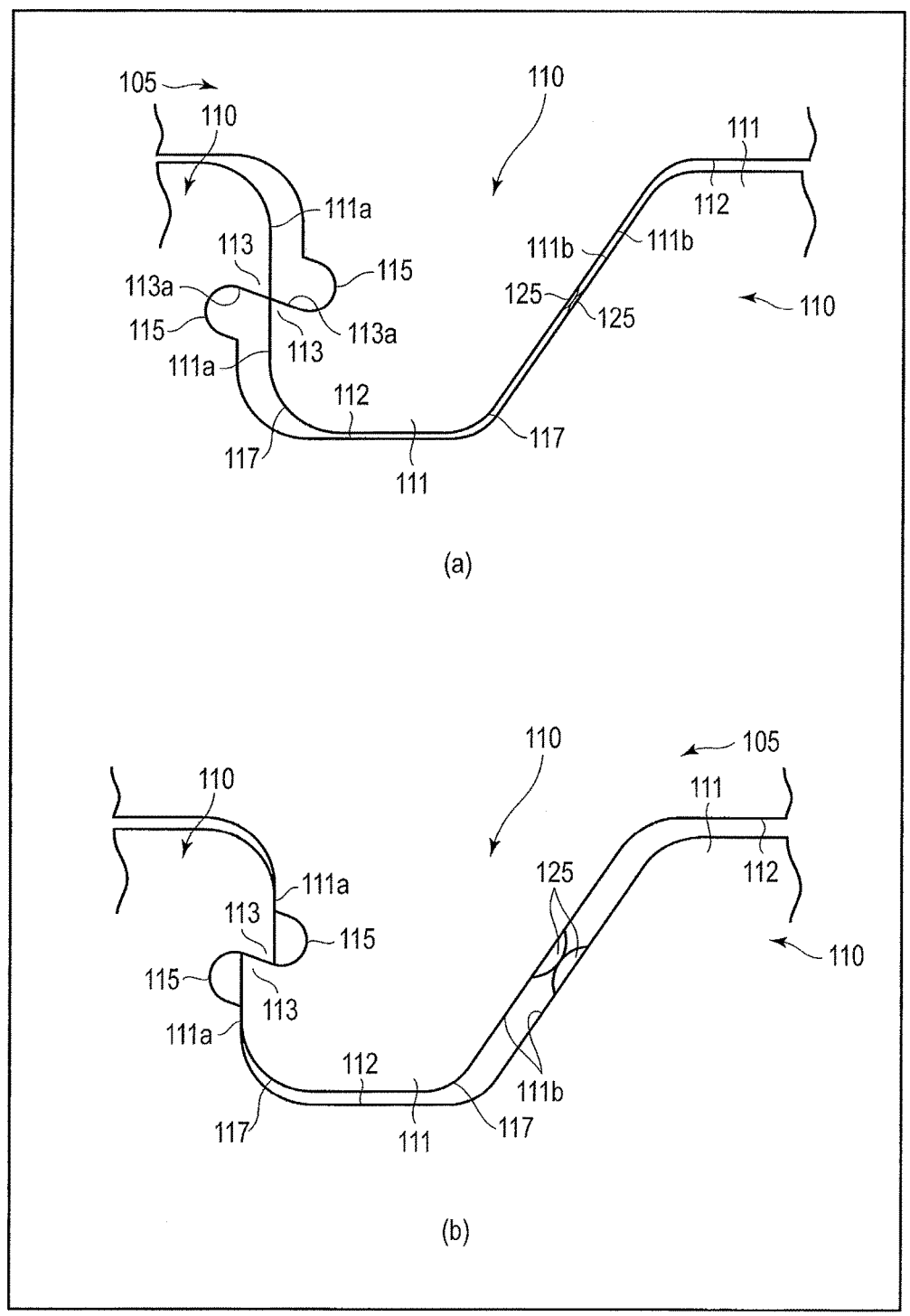
FIG. 3 including (a) and (b) is a drawing showing a state of the coupling portion when the couplings of the embodiment are coupled with each other.

FIGS. 1 to 7 illustrate an embodiment. FIG. 1 is a side view of a pair of couplings used as connection joints for a tube such as a hose in the above-described large-capacity foam-water discharge system, and FIG. 2 is an explanatory drawing showing a coupling condition where the pair of couplings is coupled together.

Further, in the present embodiment, a pair of couplings 100 has an axially-inverted identical structure, and coupling portions 110, which will be described later, have an identical unisex structure. Still further, each coupling 100 comprises a coupling body 101 formed of a substantially cylindrical tubular member. First, a metal material such as an aluminum alloy or a titanium alloy is forged, drawn, or extruded into a general shape, and the metal material is then subjected to a cutting process or the like, and finally the coupling body 101 is integrally formed. Generally, an ordinary casting product such as a casting has low elongation and poor toughness and is unsuitable for the material of the coupling body 101, and thus in the present embodiment, an ordinary casting product such as a casting is not used for the coupling body 101.

As shown in FIG. 1, the coupling body 101 has a fluid passage 102 which extends along a center axis O of the coupling body 101 in the inner space of the tubular portion of the coupling body 101. The outer periphery of one axial end of the coupling body 101 (an end located on the rear side when the coupling portion 110 side is assumed to be a front end) has recesses and projections, and this portion functions as a fitting portion 103 on which a hose or the like is fitted. To fit a hose or the like to the fitting portion 103, a hose or the like overlaps on the fitting portion 103 and is firmly secured by means of a binder (not shown) or the like.

Further, a substantially-cylindrical coupling part 105 is attached to the other end of the coupling body 101, that is, the outer periphery of the forward end of the coupling body 101 which is opposed to the coupling portion of the counterpart coupling. As in the case of the coupling body 101, the coupling part 105 is formed of a metal material such as an aluminum alloy or a titanium alloy. Further, the coupling part 105 including the coupling portion 110, which will be described later, is integrally formed of the material which is forged, drawn, or extruded into a general shape and is then finished by cutting process or the like.

Note that, since an ordinary casting product such as a casting has low elongation and poor toughness and is often unsuitable for the material, as in the case of the coupling body 101, an ordinary casting product such as a casting is not used for the coupling part 105.

Further, in light of the function of the coupling portion and the like, which will be described later, the materials of the coupling body 101 and the coupling part 105, in particular, the material of the coupling part 105 should preferably have an elongation rate of 10% or more. Therefore, the coupling body 101 and the coupling part 105 are formed of A5056TE of the JIS H 4140-1988: "aluminum or aluminum alloy forgings" and have a tensile strength of 321 N/mm$^2$ and an elongation rate of 22% as measurement values.

Further, a rear end portion located on the back side of the coupling part 105 (on an opposite side to a side where the counterpart coupling is located) functions as an attachment portion to be attached to the coupling body 101. In the inner periphery of the rear end portion, a female screw portion 106 is formed. According to the female screw portion 106, a male screw portion 107 is formed in the middle of the outer periphery of the coupling body 101. As the female screw portion 106 is fitted to the male screw portion 107, the coupling part 105 is secured to the coupling body 101.

Here, the female screw portion 106 is formed on the inner surface of a projected edge portion 108 which slightly projects inward with respect to the other portion of the coupling part 105. Further, as the projected edge portion 108 projects inward, a part of the outer periphery of the coupling body 101 in the position corresponding to the projected edge portion 108 has a smaller diameter, and a step portion 109 is created in the outer periphery of the coupling body 101. Still further, the male screw portion 107 is formed on the bottom surface of the step portion 109. Therefore, as shown in FIG. 1, the projected edge portion 108 of the coupling part 105 abuts into the standing wall of the step portion 109 of the coupling body 101 in an attachment position where the female screw portion 106 of the coupling part 105 is outwardly engaged with the mail screw portion 107 of the coupling body 101, and in this way, the axial position of the coupling part 105 with respect to the coupling body 101 is determined, and the forward movement of the coupling part 105 is limited at the same time.

As along as the axial position of the coupling part 105 can be specified with respect to the coupling body 101, the coupling part 105 may also be attached to the coupling body 101 in such a manner where the coupling part 105 rotates around the axis of the coupling body 101. Note that, in the description according to the present invention, the terms such as "the coupling body", which includes characters meaning "metal parts" in Japanese do not necessarily means that the corresponding members are formed of metal materials. In the description of the embodiment, the term: "coupling" is used in the sense of function, and the coupling also includes a material other than a metal material, for example, a compound material such as a fiber-reinforced resin and the like as long as the material is considered to be suitable in light of the material characteristics such as strength.

The coupling portions 110 are formed at the front ends of the pair of the coupling parts 105. The coupling portions 110 have the same unisex structure and are complementary to each other. As described above, the coupling portions 110 are integrally formed with the coupling parts 105, respectively. In the present embodiment, the coupling part 105 and the coupling portion 110 are integrally formed with each other, but the coupling part 105 and the coupling portion 110 may be formed as separate members and may be connected to each other.

As shown in FIG. 1, at the front end of the coupling part 105, the coupling portion 110 circumferentially projects a plurality of integrally-formed engagement projections, for example, twelve engagement projections 111 at regular intervals, and engagement recesses 112 are formed between the engagement projections 111. That is, a pair of the engagement projection 111 and the engagement recess 112 is provided within a range of 30° of the circumference, and twelve pairs of these are circumferentially provided.

Further, when a pair of the couplings 100 is axially coupled together, the engagement projections 111 of the one coupling part 105 are fitted into the engagement recesses 112 of the coupling part 105 of the counterpart, and the engagement projections 111 of the coupling part 105 of the counterpart are fitted into the engagement recesses 112 of the coupling part 105 and thus one coupling 100 is complementary to the other coupling 100. Note that the width of the engagement recess 112 in the circumferential direction is slightly greater than the width of the corresponding engagement projection 111 in the circumferential direction. Therefore, the engagement projection 111 is circumferentially rotatable by a predetermined amount (G2) as shown in FIG. 2 within the engagement recess 112.

As shown in FIG. 2, a side surface 111a located on one of the circumferentially-arranged sides of the engagement projection 111 is substantially parallel to the axial direction of the coupling part 105, while a side surface 111b located on the other of the circumferentially-arranged side of the engagement projection 111 is inclined with respect to the axial direction of the coupling part 105 such that the engagement projection 111 is tapered down toward the leading end. That is, in each engagement projection 111, one side surface is inclined such that the width of the engagement projection 111 in the circumferential direction tapers down toward the leading end of the engagement projection 111. Further, to conform to the shape of the engagement projection 111, the width of the engagement recess 112 in the circumferential direction tapers down toward the innermost portion of the engagement recess 112, accordingly.

Still further, as shown in FIG. 2, in a state where the engagement projection 111 and the engagement recess 112 of the counterpart are engaged with each other, a gap G1 is formed between the leading end surface of the engagement projection 111 and the innermost wall surface of the engagement recess 112. Therefore, even if engagement hooks 113 are inclined such that the engagement hooks 113 overhangs each other, the engagement hooks 113 can be easily engaged and disengaged from each other.

Further, as described above, the gap G2 is formed between the back surface of the engagement projection 111 and the back surface of the engagement recess 112. Therefore, it is possible to secure a sufficient distance between an engagement position where the engagement hooks 113, which will be described later, are engaged with each other and a retreat position where the engagement hooks 113 are disengaged from each other. Further, the engagement projection 111 and the engagement recess 112 are axially moved further from a position where the engagement hooks 113 are engaged with each other, and also the engagement projection 111 and the engagement recess 112 are axially rotatable. In this way, the engagement hooks 13 can be engaged with or disengaged from each other.

As shown in FIG. 2, the engagement hooks 113 are formed as a step-like hook in the one side surfaces 111a, which are substantially parallel to the axial direction of the coupling parts 105, of the respective engagement projections 111. These engagement hooks 113 will be coupled or uncoupled the pair of couplings by fitting the engagement projections 111 fitted into the innermost of the engagement recesses 112 of the counterpart and then circumferentially rotating the coupling parts 105 each other. That is, as a pair of engagement hooks 113 is getting closer with each other, the engagement hooks 113 are circumferentially engaged with each other and are hooked over each other as shown in FIG. 2. Then, the coupling portions 110 are coupled with each other such that the coupling portions 110 will not be axially separated or detached from each other.

Further, as shown in FIG. 2, an engagement face 113a of the engagement hook 113 is inclined at a predetermined angle in an overhanging manner with respect to the circumferential direction of the coupling part 105, and since the engagement face 113a is inclined in this manner, engagement strength of a pair of the engagement hooks 113 in an engaged state is enhanced.

Then, in the fluid transport operation, an axial load of water pressure or the like to be transported is applied to the coupling bodies 101 of the pair of the couplings 100 in separating direction of the coupling 100 each other. The axial tensile load is transferred from the coupling bodies 101 to the coupling parts 105 and further to the engagement hooks 113 which are engaged with each other. Since the engagement faces 113a are inclined at a predetermined angle in an overhanging manner, a circumferential rotation force which makes the engagement hooks 113 deeply engage, is generated. With this rotation force, the engagement hooks 113 are further firmly engaged with each other, and the pair of the coupling parts 105 is prevented from being uncoupled or detached from each other.

Further, as shown in FIG. 2, a round notch (curved portion) 115 is formed in the proximal portion of each engagement hook 113 to prevent the proximal portion from concentrating a stress, and an opening of the notch 115 serves as a fluid ejection port 116 having a fluid ejection function, which will be described later. Note that the leading edge of the engagement projection 111 has arc-like corners, and the arc-like portions serve as guide portions 117 which guide the engagement project 111 into the engagement recess 112. Similarly, the bottom portion of the engagement recess 112 has arc-like round portions 118. When the engagement projection 111 and the engagement recess 112 are engaged with each other, more specifically, when the engagement projection 111 and the engagement recess 112 are brought in contact with each other and abut to be engaged with each other, the guide portion 117 and round portion 118 facilitate the engagement of the engagement projection 111 and the engagement recess 112. Further, the guide portion 117 and the round portion 118 prevent stress concentration in the base portion of the engagement hook 113 and increase the strength of the coupling portion 110 comprising the engagement projection 111 including the engagement hook 113 and the engagement recesses 112.

Still further, as shown in FIG. 2, a pushing mechanism 120, which will be described later, is assembled in a position corresponding to the other inclined side surface 111b of the engagement projection 111. The pushing mechanism 120 comprises a pushing member, for example, a steel ball 125, accommodated in a cylindrical case member 124a in a freely projectable and retractable manner and a spring 126 which applies a pressing force to the steel ball 125 in the projecting direction, and the pushing mechanism 120 constitutes the so-called ball plunger. Further, the steel ball 125 is partly projected from the side surface 111b. Therefore, as shown in FIG. 3a, when the engagement projections 111 are fitted into the engagement recesses 112, the steel ball 125 hits and pushes against the steel ball 125 of the other side. Consequently, the engagement projections 111 are pushed in directions where the engagement projections 111 are separated from each other. As a result, the engagement projections 111 are pushed in directions where the side surfaces 111a of the engagement projections 111 are brought closer to each other, and this pressing force maintains the engagement hooks 113 to be engaged with each other as shown in FIG. 3b. Further, since the pushing mechanism 120 pushes one engagement projection 111 away from the other engagement projection 111, in the engagement of the pair of the couplings 100, the pushing mechanism 120 leads one engagement hook 113 to be engaged with the other engagement hook 113. Then, the pressing force of the pushing mechanism 120 maintains the engagement hooks 113 to be engaged with each other, after the engagement hooks 113 are engaged with each other.

In the meantime, as shown in FIG. 1, a seal ring portion 131 is integrally formed with a member of the coupling body 101 at the front end of the coupling body 101. The seal ring portion 131 has a sealing member fitting groove 132. The sealing member fitting groove 132 opens axially forward and is circumferentially arranged around the axis of the coupling body 101. Further, the sealing member fitting groove 132 is concentrically arranged with respect to the axis of the coupling body 101.

In the preset embodiment, although the coupling body 101 and the seal ring portion 131 are integrally formed with each other, it is also possible to attach attachment member for a sealing member to the coupling body 101 and then form a sealing member fitting groove 132 in this attachment member.

The sealing member fitting groove 132 is attached an annular sealing member 133 formed of an elastic member. The sealing member 133 is a lip seal type sealing member. The sealing member 133 is attached to the fitting groove by inserting a base portion 133a of the sealing member 133 in the fitting groove 132. Further, as shown in FIG. 7A, the sealing member 133 has a lip-like tip portion 133b which is continuous from the base portion 133a, extends forward, and is bent inward. The sealing member 133 has a contact face (abutting face) 133c which is provided on a front surface of the lip-like tip portion 133b and is opposed to the lip-like tip portion 133b of the counterpart coupling.

Figure 7C:
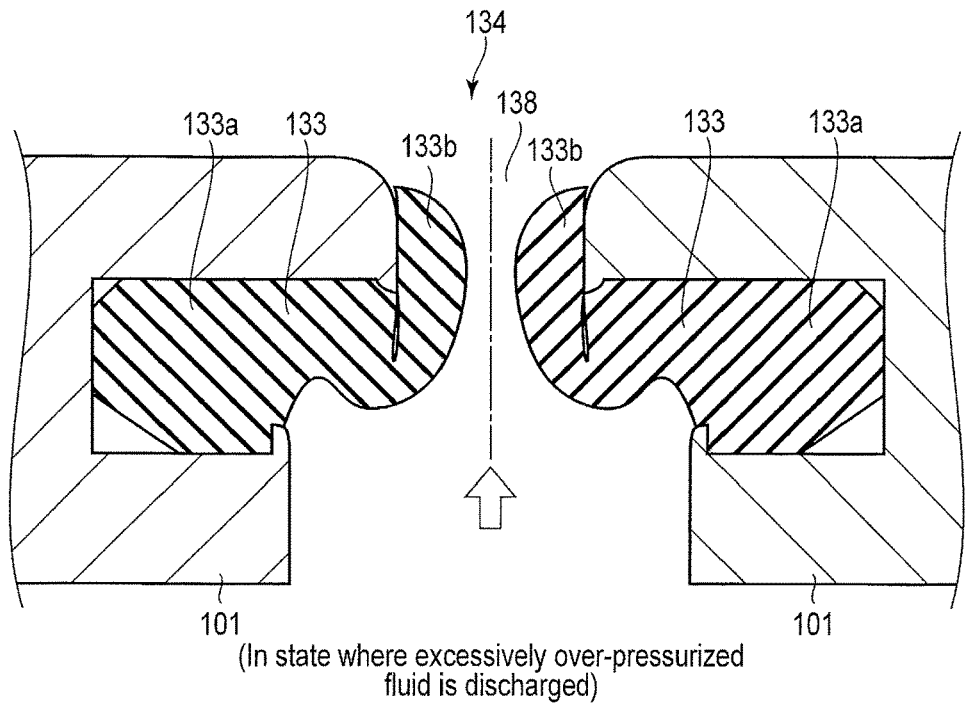
FIG. 7C is a cross-section drawing showing a region near the sealing members during an abnormally-high-pressure fluid discharge operation in a state where the pair of couplings of the embodiment is coupled together.
Figure 7D:
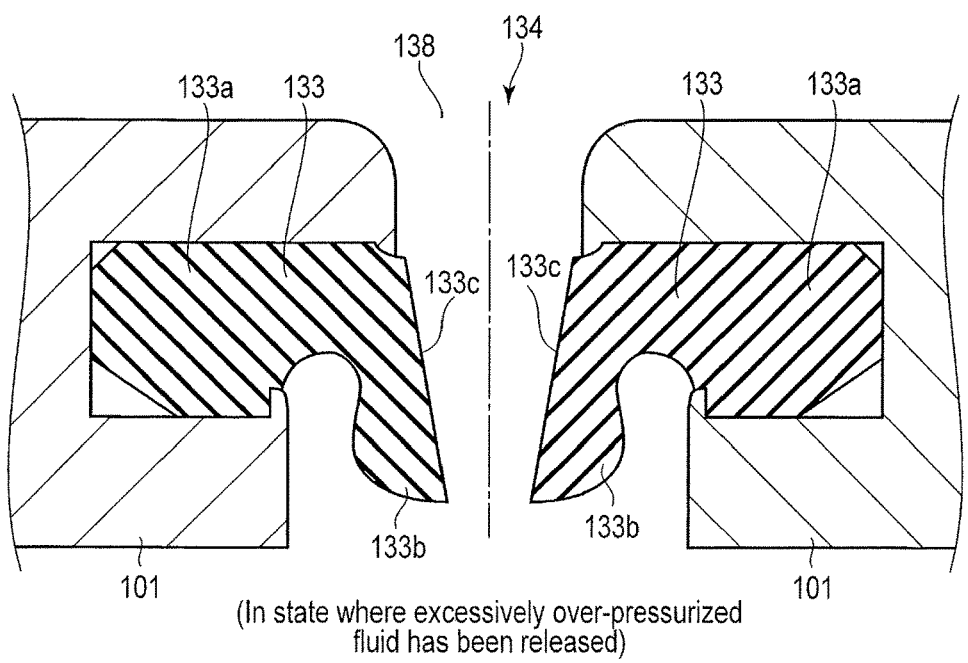
FIG. 7D is a cross-section drawing showing the sealing members and the sealing portions after the abnormally-high-pressure fluid discharge in a state where the pair of couplings is coupled together in the embodiment.

The contact face 133c of the lip-like tip portion 133b is inclined such that the inner part of the contact face 133c in the radial direction projects forward with respect to the outer part of the contact face 133c (FIG. 7D shows a free state). In a free state where the pair of the couplings 100 has not coupled together yet, the contact face 133c is inclined such that the contact face 133c gradually projects forward toward the innermost part of the contact face 133c. When the pair of the couplings 100 is coupled together as shown in FIG. 7A, only the ends of the coupling faces 133c contact each other and the leading edges (the innermost parts in the radial direction) are most strongly pressed against each other. When the lip-like tip portions 133b are in a standby state shown in FIG. 7A, the pair of the couplings 100 is coupled together, before the fluid transports.

Further, during the fluid transport operation, as the lip-like tip portions 133b are pressed by the internal fluid pressure (for example, 1.3 MPa), the lip-like tip portions 133b are pushed to the outside and are elastically deformed as shown in FIG. 7B, and as the entire contact faces 133c are tightly in contact with each other, the sealing effect is enhanced. When the lip-like tip portions 133b are a closed state, the contact faces 133c near the leading edges (the innermost parts in the radial direction) of the lip-like tip portions 133b are in contact with each other under the strongest contact pressure, and thus the fluid will not leak from between the lip-like tip portions 133b to the outside.

Further, as shown in FIG. 7A, at the opening edge of the fitting groove 132, an inner region, which corresponds to a portion where the lip-like tip portion 133b is bent inward, retreats as compared to an outer peripheral region of the coupling body. With this structure, it is possible to secure a sufficient room for the lip-like tip portion 133b to bend inward. The outer peripheral region at the opening edge of the fitting groove 132 forms a receiving portion 132c which receives the bending portion of the lip-like tip portion 133b. Still further, the fitting groove 132 has a projection 132d which projects toward the center of the opening of the fitting groove 132 and is formed in the circumference of the opening edge of the fitting groove 132. The projection portion 132d prevents the base portion 133a of the sealing member 133 from coming off the fitting groove 132. The projection portion 132d may be formed at a part of the circumference of the opening edge of the fitting groove 132 or may be formed at the entire circumference of the opening edge of the fitting groove 132.

In the meantime, the sealing members 133 of the pair of the couplings 100 are in such a relationship where the sealing member 133 of one coupling 100 will be a valve seat when the sealing member 133 of the counterpart coupling 100 is assumed to be a valve body and will be a valve body when the sealing member 133 of the counterpart coupling 100 is assumed to be a valve seat. That is, when serving as the valve body and the valve seat of the safety valve, the sealing members 133 of the pair of the couplings 100 are complementary to each other. The sealing members 133 have the same shape as each other, and works as a safety valve function 134 which has a valve structure in which the sealing members 133 are brought into contact with each other. Also, the seal ring portion 131 and the sealing member 133 may be unified and may be in such a relationship where each of the seal ring portion 131 and the sealing member 133 serves as a valve body or a valve seat. The sealing members 133 are also the sealing portions when the pair of the couplings 100 is coupled together.

Further, in light of the relationship of the pair of the sealing members 133 to the coupling portions 110, the contact faces (sealing surfaces) 133c of the sealing members 133 are in contact with each other in the middle of the engagement projection 111 and the engagement recess 112, that is, in the middle of the engagement position as shown in FIG. 2. Still further, this position is the center of the engagement region of the engagement faces 133a of the engagement hooks 113. That is, as shown in FIG. 2, the center of the pair of the engagement hooks 113 which are engaged with each other coincides with the contact plane of the contact faces 133c of the sealing members 133 which are in contact with each other. Further, the engagement position of the pair of the engagement hooks 113 is located in the middle of the pair of the fluid ejection ports 116 formed by the notches (curved portions) 115 of the pair of the engagement hooks 113. Still further, the contact plane of the contact faces 133c of the sealing members 133 is located in such a position as to cross the gap G2 formed between the back surface of the engagement projection 111 and the back surface of the engagement recess 112. Note that, although the steel balls 125 of the pushing mechanisms 120 are located in the gap G2, when the pressure of the fluid to be transported unusually increases and the fluid is then discharged from the leakage path 138 to the outside, the steel balls 125 are pushed into the respective case members 124 against the ejecting forces of the respective springs 126 by the force (mainly the kinetic pressure) of the fluid to be discharged, and thus an active region can be sufficiently secured in the gap G2 for the fluid ejection ports. In this way, relatively-large fluid ejection ports can be created also in the gap G2 (see FIG. 5).

Still further, a deformation portion 140 is formed of a portion of the coupling portion 110 which constitutes the engagement projection 111, and as the deformation portion 140 plastically is deformed, the whole coupling portion 110 is axially stretched. As the pressure of fluid within the fluid passage 102 of the coupling 100 unusually increases and the axial tensile stress is applied to the coupling part 105, the deformation portion 140 axially extends the coupling portion 110.

Still further, the engagement hook 113 is unevenly formed on one side of the engagement projection 111 and is engaged with the other engagement hook 113, and thus as shown in FIG. 5, while the engagement hook 113 is engaged with the other engagement hook 113, the whole engagement projections 111 are gradually bent and axially elongated. Then, at a stage where the engagement hooks 113 are maintained an engaging condition, the whole engagement projections 111 deform to extend and axially elongate the coupling portions 110 without causing these engagement hooks 113 to be uncoupled from each other by disruption of the coupled state.

Still further, according to the deformation of the coupling portion 110, when the pressure of the fluid within the fluid passage 102 of the coupling 100 unusually increases, that is, the fluid within the fluid passage 102 of the coupling 100 has abnormally high pressure, the sealing members 133, which have been pushed against each other, retreat in such a manner as to be separated from each other as shown in FIG. 5, and the leak path (fluid discharge passage) 138 for releasing the high-pressure fluid to the outside is created between the sealing members 133.

Figure 6:
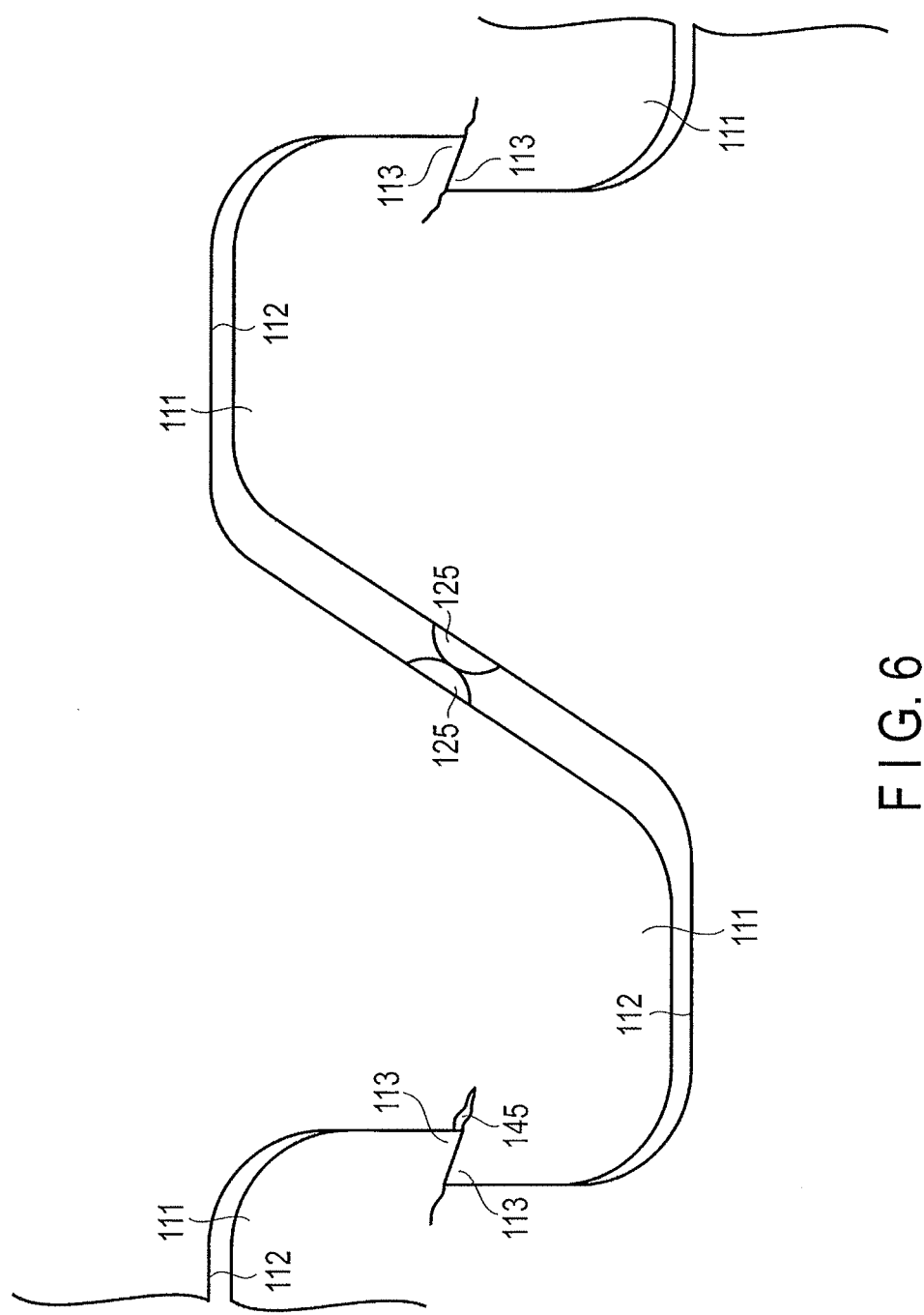
FIG. 6 is a drawing showing a state where a crack or the like is made in a proximal portion of an engagement hook provided with no relief hole.

In the meantime, a stress tends to locally concentrate on a region near the engagement hook 113 of the engagement projection 111 of the coupling portion 110, and thus if the engagement hook 113 is cut out in such a manner as to have a sharp corner in the base portion of the engagement hook 113, as shown in FIG. 6, a stress tends to concentrate on the corner, a crack 145 such as that shown in FIG. 6 will be created in a portion near the base portion of the engagement hook 113 before the whole engagement projection 111, that is, the whole coupling portion 110 is deformed and elongated, and the engagement hook 133 may break off from this portion.

Therefore, in the present embodiment, to prevent concentration of a stress on the base portion of the engagement hook 113, a round notch (curved portion) 115 is formed in the base portion of the engagement hook 113 as shown in FIGS. 2 to 5, and in this way, a stress will not be concentrated on the base portion of the engagement hook 133 or the engagement hook 113 will not crack. Further, since the notch 115 also serves as a fluid ejection port 142, the notch 115 is formed in large size.

Further, as shown in FIG. 5, as the deformation portions 140 are axially elongated, the sealing members 133 as the valve bodies retreat to be separated from each other, and the leak path 138 is created between the sealing members 133. At this time, at least a part of the fluid ejection portion 142 overlaps the region of the leak path 138. Still further, the position of a part of the region of the leak path 138 also corresponds to the position (here, the region of the gap G2 around where the steel balls 125 of the pushing mechanisms 120 are installed) between the side surfaces of the engagement projections 111 opposite to the side of the engagement projections 111 provided with the engagement hooks 113. The region of the gap G2 is also regarded as the fluid ejection port 142.

In the meantime, the engagement face of one engagement hook 113 are axially abutted and engaged with the engagement face of the engagement hook 113 of the counterpart coupling. A coupling force produced by the engagement is transferred from the coupling portions 110 to the coupling parts 105 and further to the coupling bodies 101.

Further, since the engagement projection 111 is tapered off and has a broader width toward the base end, that is, toward the coupling part 105 side, it is possible to prevent concentration of a stress on the base end portion of the coupling portion 110. Still further, as the length of the engagement projection 111 extends, the leading end area of the engagement projection 111 for supporting the engagement hook 113 increases, and the strength of the engagement hook 113 with respect to the tensile load increases, accordingly. Still further, even in the case of using a material of the same elongation, it is possible to increase the lift amount of the sealing member 133 by increasing the area from the base portion of the engagement projection 111 to the engagement portion of the engagement hook 113. Hence, the leak path as the safety valve function can be secured for releasing a sufficient amount of discharge.

Still further, as described above, when the engagement projection 111 is applied an unusually high tensile load, the engagement projection 111 is, while slightly being bent, axially elongated. Therefore, it is necessary to take measures to prevent from disengaging of the engagement hooks in consideration of this bending deformation. Therefore, the engagement face 113a of the engagement hook 113 is inclined in an overhanging manner with respect to the circumferential direction of the coupling part, and a counter-angle "θ" is set to greater than that of the conventional coupling. For example, in the outer periphery development diagram, the counter-angle θ should preferably be greater than that of the conventional coupling, that is, greater than 15 degrees. The counter-angle θ should preferably be, for example, within a range of 20 to 30 degrees, more desirably, 25 degrees.

Here, if the counter-angle θ is less than 20 degrees, when the leak path 138 of the safety vale 134 is created as shown in FIG. 5, the inclination of the engagement faces 113a of the pair of the engagement hooks 113 tends to shift from where the engagement faces 113a are perpendicular to the axial direction of the couplings toward where the engagement hooks 113 will be disengaged from each other. On the other hand, if the counter-angle θ is greater than 30 degrees, it is necessary to increase the gap G1 between the leading end face of the engagement projection 111 and the innermost wall face of the engagement recess 112, and in that case, the coupling cannot be designed in compact and may have problems to maneuver the coupling.

Therefore, if the counter-angle θ is about 20° to 30°, the counter-angle θ will not be negative even if the engagement hook having the engagement surface is deformed to the extent that the sealing member is separated from the other sealing member and the leak path through which the fluid is discharged to the outside is created between the sealing members when the coupling part is axially extended by the axial tensile force applied to the coupling part during the pressure of the fluid within the coupling body extremely increases, and in this way, the engagement of the pair of the engagement hooks is secured. That is, the angle of the engagement face is set to a range where the engagement face is still inclined in an overhanging manner at a positive angle even if the engagement hook having the engagement face is deformed to the extent that the sealing member is separated from the other sealing member and the leak path through which the fluid is discharged to the outside is created between the sealing members when the coupling part is axially extended by the axial tensile force applied to the coupling part during the pressure of the fluid within the coupling body extremely increases and, and is also set to a range where the engagement of the pair of the engagement hooks is maintained. Further, it is possible to most smoothly lead the engagement hook to the engagement with the other engagement hook and to easily disengage the engagement hook from the other engagement hook.

In the conventional coupling, when the engagement projection 111 is applied to pressure, the engagement projection 111 just slightly bends in a range of the elastic deformation, because the coupling "is used under pressure equal to or smaller than working pressure (normal maximum working pressure) after the coupling is applied a test pressure (about 1.5 to 2 times the working pressure) temporarily in a shipping inspection or the like)," and thus the engagement projection 111 springs back to the original shape (the original angle) when released from the pressure. Therefore, the counter-angle of the conventional coupling 100 has been set about 15 degrees.

On the other hand, the coupling 100 with the integrated safety valve function of the present embodiment is assumed to be applied excess pressure unusually greater than the test pressure (3 to 4 times the working pressure). That is, the assumed pressure is provided with a wide margin with respect to the normal working pressure. In the present embodiment, when abnormally excess pressure is applied, the axial load increases, and as the engagement projection 111 is axially elongated while being plastically or elastically deformed, and the engagement hook 113 is also deformed. As the bending deformation proceeds, the counter-angle θ decreases.

Therefore, in the present embodiment, the counter-angle θ is designed slightly large to allow for the decrement of the counter-angle θ associated with the bending deformation. Further, the counter-angle θ may vary depending on the material, the size, the shape or the like of the coupling, but the counter-angle θ of 20° to 30° is also applicable to the coupling (called 150 to 400 mm coupling) for the large-capacity foam-water discharge system.

As described above, if the counter-angle θ is shallow, when fluid to be transported has abnormally high pressure, the counter-angle θ will be formed in the opposite direction (for example, if the engagement projection 111 is bent at an angle of −20°, the counter-angle changes from 15° to −5°), and the axial load, which has been applied to the coupling, will generate a rotation force in the direction for uncoupling the coupling from the other coupling. In contrast, if the counter-angle θ is too steep, unless a greater gap is secured between the front end of one seal ring portion and the front end of the other seal ring portion in a state where the pair of the couplings is coupled together, the couplings cannot be engaged with or disengaged from each other. Therefore, the seal ring member 133 needs to be increased in size, and thus the coupling cannot be designed in compact size. Consequently, it is reasonable to design the counter-angle θ within a range of 20° to 30°.

When the fluid pressure within the fluid passage 102 exceeds the set pressure level for the safety vale 134, as shown in FIG. 5, the deformation portion 140 (the coupling portion 110) is plastically elongated axially on the whole while being slightly bent. Then, as the seal ring portions 131 of the pair of the couplings 100 are lifted and separated from each other, the contact faces of the sealing members 133 are separated from each other, and the leak path 138 is created between the sealing members 133. The high-pressure fluid within the fluid passage 102 is discharged to the outside through the leak path 138. The fluid to be discharged is forcefully ejected from the fluid ejection ports 142 in the radial directions of the coupling 100 (in twelve or twenty-four circumferential points in the case of a nominal 300 mm coupling). Then, the operator or the like know an abnormality is happened instantly by looking at the ejection when the ejection is occurred.

Note that, when the fluid is discharged, although the sealing member 133 is located in the fluid ejection port 142, the sealing member 133 is usually made of rubber, and thus the sealing member 133 will be pushed by the flow of the fluid and will not have a great impact on the fluid discharging rate. Further, although the steel ball 125 of the pushing mechanism 120 is located in the leak path 138, the steel ball 125 is pushed inside the case member 124 by the strong flow momentum of the fluid to be ejected, and thus the steel ball 125 will retreat from the region of the fluid ejection port as much as possible and will not substantially decrease the fluid discharge amount.

Figure 8:
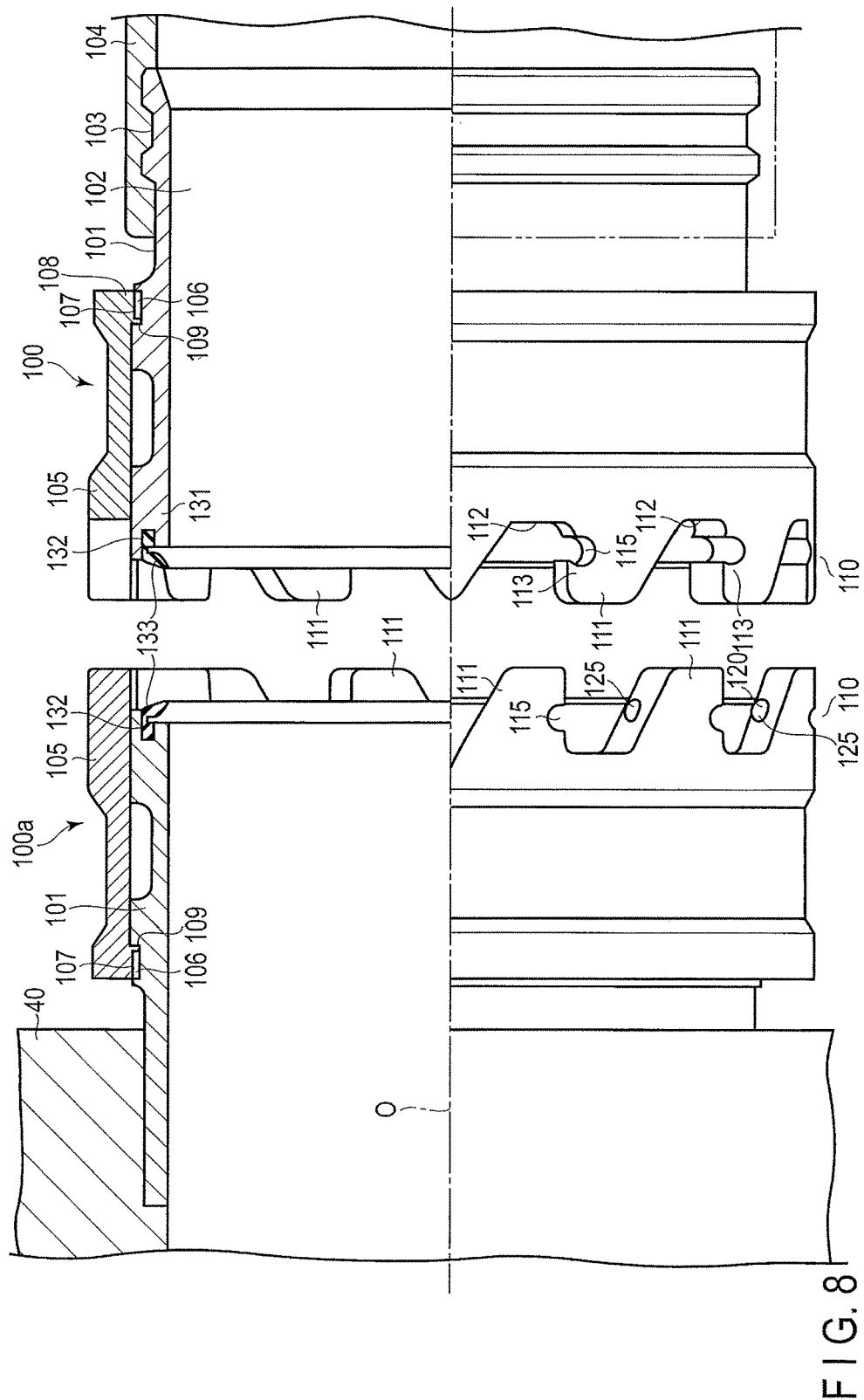
FIG. 8 is a schematic drawing partly in section showing a pair of couplings of a modification provided in a nearest manifold to a water cannon of a large-capacity foam-water discharge system.
Figure 19:
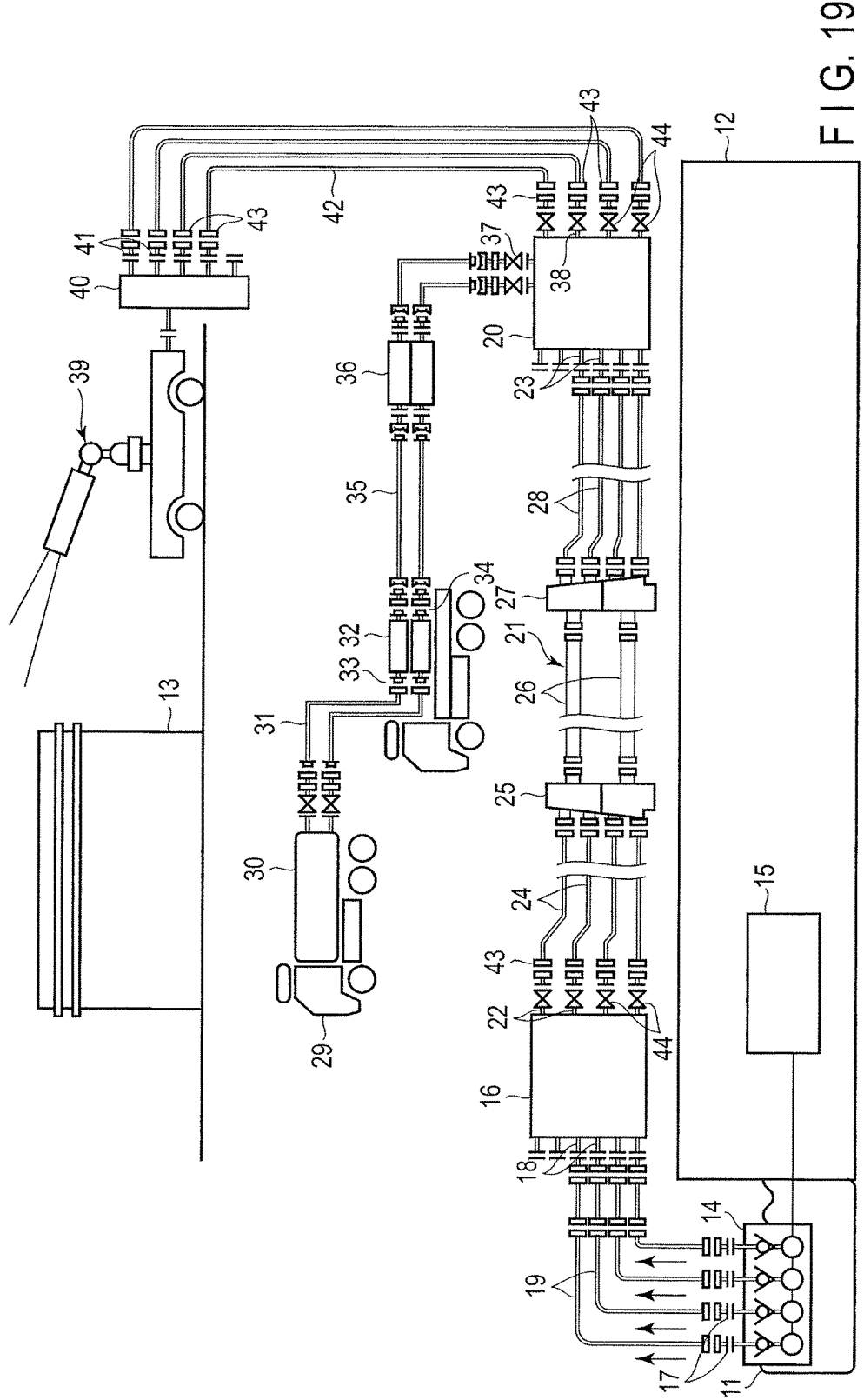
FIG. 19 is an explanatory drawing schematically showing the structure of a large-capacity foam-water discharge system.

FIG. 8 shows one of the pair of the couplings assumed to be a coupling 100a provided in the manifold 40 which is the closest to the water cannon 39 in the large-capacity foam-water discharge system shown in FIG. 19, but in this case, the above-described coupling 100 with the safety mechanism is realized by the pair of the couplings.

Next, the technical effect will be described when the coupling 100 is used. First, to engage the pair of the couplings 100 together, as shown in FIG. 1, the coupling portions 110 of the couplings 100 are opposed to each other on the same axis, and then the engagement projections 111 are inserted into the engagement recesses 112. Then, as shown in (a) of FIG. 3, the engagement projections 111 and the engagement recesses 112 are engaged with each other, and the steel balls 125 of the pushing mechanisms 120 are pushed away each other and the engagement projections 111 are circumferentially urged in the opposite directions at the same time. Therefore, it is possible to guide the couplings 100 to a state shown in (b) of FIG. 3 where the engagement hooks 113 are engaged with each other without actively rotating the couplings 100 in the circumferential directions. In a case where the coupling 100 has a significantly-large size, the operator should preferably assist engagement movements of the engagement hooks 113 by circumferentially rotating the couplings 100.

In the present embodiment, the coupling part 105 is secured to the coupling body 101, and thus the coupling part 105 is not independently rotatable. However, in such a structure where the coupling part 105 is rotatably attached to the coupling body 101, it is possible to couple the pair of the couplings 100 together simply by rotating the coupling parts 105.

In the meantime, in a state where the pair of the couplings 100 is coupled together as shown in FIG. 2, the sealing members 133 of the pair of the couplings 100 are in contact with each other. More specifically, as shown in FIG. 7A, the leading edges of the lip-like tip portions 133b of the sealing members 133 are pressed against each other. Then, under the inner pressure (fluid pressure) in the normal fluid transport operation, as shown in FIG. 7B, the lip-like tip portions 133b are pushed from inside to the outside by the pressure, and thus the sealing contact faces 133c are entirely in contact with each other and the sealing members 133 are tightly sealed with each other.

As described above, there is a case where a water hammer or the like occurs on the water supply line for various reasons such as an inappropriate operation of a valve or a lack of cooperation between pumps installed on the water supply line, and in the event of an abnormal pressure surge on the water supply line, the abnormally high pressure activates the safety valve function of the coupling 100.

Note that the relationship between the working pressure (this is the normal maximum working pressure and is usually indicated on the label, and this explanation will be omitted hereafter.) of the coupling and the abnormally high pressure in the present embodiment varies depending on a system which adopts the coupling. If the coupling is used as a connection joint which connects a hose or pipe in a large-capacity foam-water discharge system, generally, the working pressure (fluid pressure) in the fluid passage 102 during the fluid transport operation is about 1.0 to 1.6 MPa (megapascal), and the test pressure is about 1.5 to 2.4 MPa. Note that the test pressure is generally about 1.5 to 2 times the working pressure, and the abnormally high pressure in the present embodiment is assumed to be about 2 times the test pressure (about 3 to 4 times the working pressure).

In an implementation of the coupling of the present embodiment, which will be described later, the coupling is used as the connection joint which connects a tube such as a hose in a large-capacity foam-water discharge system, and a working pressure for a coupling called a 300 mm coupling is 1.3 MPa and a test pressure for it is 1.5 times the working pressure or more (2.0 MPa). Note that the bursting pressure of the hose body is a slightly less than 2.5 times (3.0 MPa) the working pressure and that the abnormally high pressure which activates the safety valve function of the coupling is set about 3 times the working pressure (3.9 MPa). Here, the reason for providing a large margin of 0.9 MPa between the bursting pressure of the hose and the abnormally high pressure is to prevent the safety valve function from being activated or the deformation portion 140 of the present coupling from being plastically deformed although there is no immediate danger of the coupling being broken and flying off.

Next, the activation of the safety valve function of the coupling 100 will be described. The sealing members 133 are in the state shown in FIG. 7A when the pair of the couplings 100 is coupled together. Further, during the fluid transport operation, the sealing members 133 are in the state shown in FIG. 7B, that is, in a state where the contact faces 133c are, although most strongly pushed against each other at the innermost edges, pushed against each other substantially entirely. Still further, according to the pressure of the fluid to be transported, the butting force between the sealing members 133 increases.

When the pressure (fluid pressure) in the fluid passage 102 extremely increases for some reason or other and exceeds the predetermined pressure level, the tensile force, which separates the pair of the couplings 100 from each other, increases according to the pressure. This axial tensile force is transferred all over from the coupling body 101 to the coupling portion 110 of the coupling part 105. In this way, when the pressure of the fluid within the fluid passage 102 unusually increases and exceeds the predetermined pressure level, the deformation portion 140 is axially stretched. At this time, the deformation portion 140, which is a most easily deformable portion, is axially elongated, but the portion except the deformation portion will hardly be stretched even under a tensile load.

The coupling body 101 equipped with the sealing member 133 will not be stretched, and therefore the sealing member 133 located at the front end of the coupling body 101 retreats with respect to the coupling portion 110 and changes from a sealed state shown in FIG. 2 to an open state shown in FIG. 5. That is, the sealing members 133 retreat with respect to the coupling portions 110. (Note that, in other words, the engagement portions of the pair of the coupling portions 110 proceed with respect to the sealing members 133 respectively.)

At this time, a retreat amount R of the sealing member 133 corresponds to an axial extension amount of the deformation portion 140 (see FIG. 5). Then, as the sealing members 133 of the pair of the coupling bodies 101 are separated from each other, the leak path 138 is formed therebetween. Since the pair of the couplings 100 is formed in the same structure, each coupling 100 retreats by the same retreat amount R, and the sealing members 133 of the pair of the couplings 100 are separated from each other at a distance L corresponding to the sum of these retreat amounts R (see FIG. 5). Then, when an unusual fluid pressure surge occurs, the leak path 138 which has a width (L) of 2 R appears between the sealing members 133, and the leak path 138 communicates with the fluid passages 102 of the coupling bodies 101. Subsequently, the unusually-high-pressure fluid in the fluid passages 102 is discharged from the couplings 100 through the leak path 138.

At this time, the lip-like tip portions 133b of the respective sealing members 133 are turned inside out by the flow of the fluid to be discharged through the leak path 138 and will be in a state shown in FIG. 7C in most cases. In this case also, the leak path 138 is still formed between the lip-like tip portions 133b, and as long as the unusually-high-pressure fluid remains, the high-pressure fluid is continuously discharged from the couplings 100. When the high-pressure fluid is completely discharged from the couplings 100 through the leak path 138, the pressure of the fluid within the fluid passage 102 rapidly decreases. Then, as the pressure drops down to the working pressure level or lower immediately, the unusually high pressure state is dissolved, and the fluid pressure will not be higher than that level and will not disrupt the coupling state of the coupling 100.

As described above, when the pressure of the fluid within the fluid passage 102 is unusually high, the safety value function is activated, the high-pressure fluid of the fluid passage 102 is discharged to the outside through the leak path 138, and the fluid pressure within the fluid passage 102 is reduced. Therefore, the coupling portions 110 and the like will not be broken or damaged. Further, at this time, the pair of the couplings 100 is maintained in the coupling condition.

Still further, when the fluid within the fluid passages 102 has unusually high pressure, the deformation portions 140 are preferentially elongated and the leak path 138 is opened between the sealing members 133 at a stage where the coupling state of the pair of couplings is still maintained by the coupling portions 110, and thus the safety valve function portion 134 performs a safety valve (pressure valve) function. Consequently, it is possible to prevent a danger associated with detachment of the couplings caused by disruption of the coupling state of the coupling portions 110 or the like.

In the present embodiment, as shown in FIG. 5, when the high-pressure fluid within the fluid passage 102 is discharged through the leak path 138, the distance between the distal ends (valve body/valve seat faces) of the two sealing members 133 opposed each other is 2 times the lift amount of the one sealing member 133.

Therefore, in the present embodiment, an elongation characteristics of the deformation portion 140 of the coupling part 105 is set such that the deformation portion 140 is axially elongated without causing disruption of the coupling state of the coupling portion 110 until the valve body/valve seat (seal face) of one sealing member 133 is separated from the valve body/valve seat (seal face) of the counterpart sealing member 133 by a total lift amount of greater than or equal to $1/100$ the minimum inner diameter of the fluid passage 102 of the coupling 100. This means that the fluid passage area (curtain area) of the leak path 138 formed of the valve body/valve seat faces is greater than or equal to 4% of the fluid passage area of the hose, the pipe or the like which is connected to the couplings 100.

Figure 16:
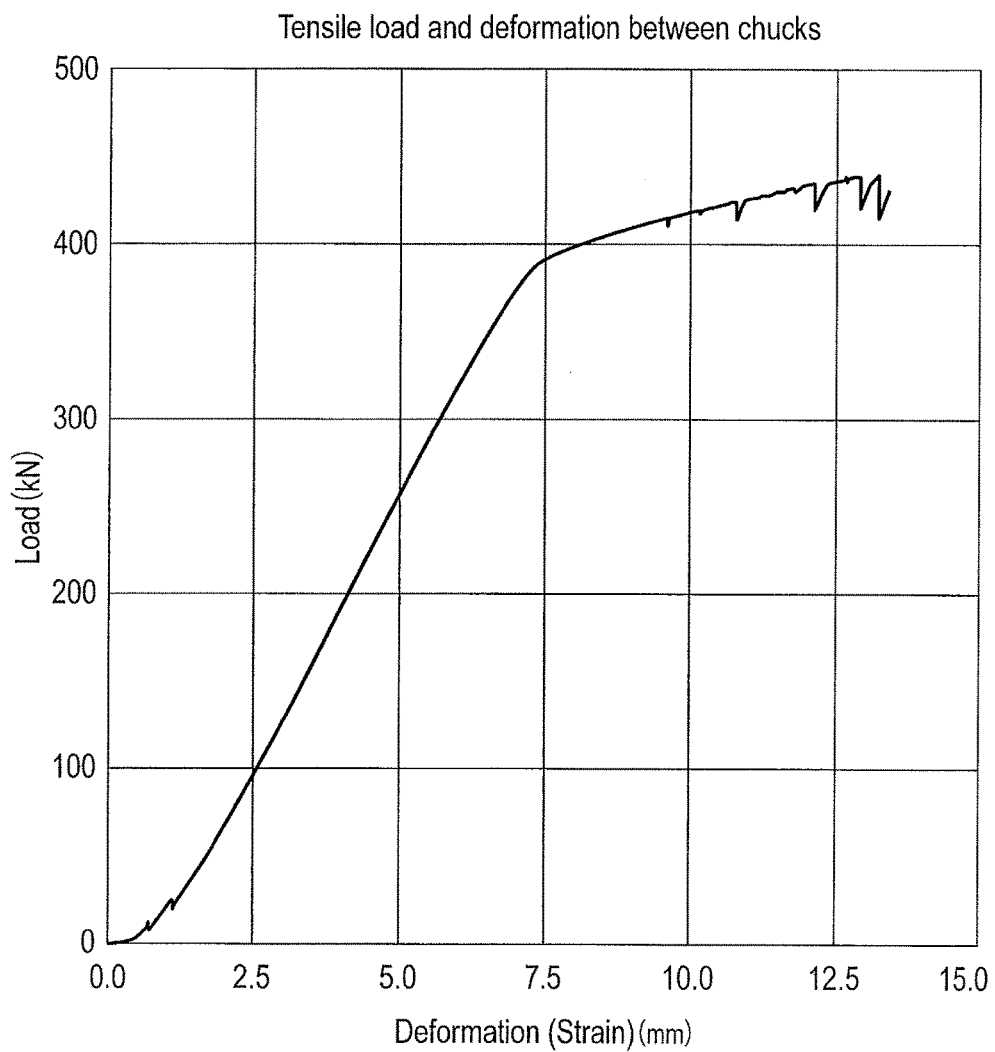
FIG. 16 is a chart automatically drawn by a testing machine, showing a test result of the test specimen of the embodiment in terms of a tensile load and a deformation (displacement between chucks).

Note that, in the example of a test for the coupling of the present embodiment, which will be described later, as shown in a graph of FIG. 16, "under a load of 440 kN (about 4.6 times the working pressure) within a pressure range where the coupling will not be broken, each of the seal rings was lifted about 5.9 mm, and the lift amount was 2.1/100 (5.9/275=0.0214) the minimum inner diameter, that is 275 mm (see FIG. 9), of the fluid passage 102".

On the other hand, in the case of the "lift-type safety valve" defined in the JIS B 8210-2009, the lift amount is specified as being greater than or equal to $1/40$, which means that the value seat fluid passage area (curtain area) is greater than or equal to 10% of the fluid passage area (valve seat portion area) of the hose, the pipe or the like which is connected to the couplings 100. Therefore, the discharge area of the alarm safety valve alone is $2/5$ the discharge area of the above-described JIS lift safety valve. If only the fluid passage area (curtain area) of the leak path 138 is taken into consideration, it is possible to secure a discharge area greater that of the JIS lift safety valve by using three sets of the alarm safety valves of the present embodiment.

In the present embodiment, since both sealing members 133 (valve members) move, the lift amount of the valve member of one sealing member 133 is 0.5/100 the minimum inner diameter of the fluid passage, and the total lift amount of $1/100$ the minimum inner diameter of the fluid passage is secured by the two sealing members 133.

In the example of the test for the coupling of the present embodiment, which will be described below, such a sealing structure where lip-seal-type sealing members (packing rings) are abutted with each other, is adopted. However, when the fluid pressure is very low, it is difficult to expect the pushing force of internal pressure to sufficiently press the sealing members (packing rings) against each other. In that case, the lip-seal-type sealing members may be arranged in such packing positions where "the sealing members are pushed against each other by a total lift amount of a range 0.7/100 to $1/100$ the diameter of the valve body/valve seat opening (in the case of a type 150 to 400 mm coupling)" when the pair of the couplings is coupled together.

Therefore, when the safety valve 134 has a lift amount of greater than or equal to $1/100$ the minimum inner diameter, the sealing members 133 are not pushed against each other, and thus if the inner pressure is applied by the unusually-high-pressure fluid in this state, the seaming members 133 in these positions will form an effective gap of greater than or equal to 0.5/100 the minimum inner diameter of the fluid passage 102 as shown in FIG. 7C (that is, the curtain area where the fluid is actually discharged from the sealing portions will be greater than or equal to 2% of the minimum area of the fluid passage 102).

The inverting phenomenon of the sealing members 133 by the inner pressure is occurred even though a gap is not created between the sealing members 133 when the sealing members 133 have lost the pushing force between them. Under such high pressure greater than the test pressure, the sealing members 133 will be inverted by the inner pressure when the sealing members 133 are lifted halfway (by half a lift amount of 0.7 to $1/100$ the diameter of the valve seat opening) from the pushing position of the sealing members 133 where the sealing members 133 are originally pushed against each other at a time when the pair of the couplings is coupled together. Here, the pushing position of the sealing members 133 are arranged in the position where the sealing members 133 are brought further closer to each other than a point where the sealing members 133 are, although abutting with each other, not deformed yet.

In the present embodiment, when the fluid pressure unusually increases, the deformation portion 140 is axially elongated, the sealing member 133 is axially lifted, and the fluid is discharged from the sealing portion of the sealing member 133 to the outside of the coupling, and here the area of the leak path 138 where the fluid is discharged from the present coupling is set to greater than or equal to 1% of the minimum area of the fluid passage 102 of the present coupling.

In the case of using an ordinary safety valve, an unusually-high-pressure fluid is generally discharged by a single safety valve. However, in a large system such as the above-described large-capacity foam-water discharge system, at least ten pairs of the couplings will be used, and thus each of the couplings should be a coupling with a safety valve function and should perform a safety valve function of discharging an unusually-high-pressure fluid. This structure satisfies the above-described requirement for the JIS B 8210 lift-type safety valve: "regarding the fluid passage area at a time when the valve body opens, the valve seat fluid passage area (curtain area) is the smallest fluid passage area, and the safety valve has a lift amount of greater than or equal to $1/40$", that is, "the actual fluid discharge area is greater than or equal to 10% of the valve seat area". Here, each pair of the couplings with the alarm safety valve function needs to satisfy $1/10$ the above-described requirement (such that the total requirement for the ten pairs of the present couplings will be the same as the above-described requirement for the JIS lift-type safety valve). Note that the JIS does not specify the water discharge amount of an alarm safety valve.

In the case of the deformation portion 140 of the present invention, the deformation portion 140 slightly exhibits elastic deformation under normal pressure and thus is hardly elongated until pressure extremely increases and exceeds a predetermined abnormally high pressure level. Until the pressure exceeds the predetermined abnormally high pressure level, the sealing members are pushed against each other, and the leakage of the pressure fluid is prevented. When the pressure reaches the predetermined abnormally high pressure level, the deformation portion 140 is plastically deformed and elongated (once the deformation portion 140 is significantly stretched, the deformation portion 140 may not be restored to the original shape). Further, when the fluid pressure in the fluid passage 102 is abnormally high, as shown in FIG. 5, the sealing members 133 are separated from each other, and the leak path 138 is created therebetween. In the region of the leak path 138, the fluid ejection ports 116 formed by the notches 115 of the engagement hooks 113 are located. That is, a part of the region of the leak path 138 overlaps a part of the region of the fluid ejection ports 116. Therefore, the high-pressure fluid discharged from the leak path 138 is swiftly discharged from the leak path 138 to the outside via the fluid ejection ports 116 linearly. Consequently, the fluid linearly discharged to the outside through the fluid ejection ports 116 is ejected to the outside of the couplings without being subjected to unnecessary resistance on the way. Since it is possible to discharge the leaking fluid in such a manner as to squirt the leaking fluid high or far away, it becomes possible to clearly notify of the abnormality by the squirting fluid. Therefore, the abnormality is more easily identifiable, and thus the observer, the operator and the like can easily recognize the abnormality by simply looking at the spouting fluid.

Further, the fluid is discharged from another engagement gap of the coupling portion which is formed in a position other than a position where the engagement hook 113 is disposed. Particularly, in a position where the steel ball 125 of the pushing mechanism 120 is arranged on the side surface of the engagement projection 111, the gap G2 opens relatively widely, and since the leak path 138 is located in the opening region of the gap G2, it is possible to spout the fluid also from the region (fluid ejection ports). Further, the steel ball 125 is sunk into a state shown in FIG. 5 by the flow of the high-pressure fluid when the fluid is discharged, and thus the steel ball 125 will not disturb the discharge of the high-pressure fluid but will allow large ejection ports to be created in that region.

Still further, the coupling portion 110 has the engagement projections 111 and the engagement recesses 112 at the front end of the coupling part 105, and the coupling portion 110 covers the coupling body 101 such that the inner surface of the coupling portion 110 is in close contact with the outer surface of the coupling body 101. Between the inner surface of the coupling portion 110 and the outer surface of the coupling body 101, there is only a gap sufficient for a smooth coupling operation. Therefore, a large volume of a fluid will not be discharged from between the inner surface of the coupling portion 110 and the outer surface of the coupling body 101.

Still further, the coupling of the present embodiment is a 300 mm coupling comprising the notches 115 in twelve radial directions, in addition to the gaps formed where the steel balls 125 are provided, and thus the fluid squirts in twenty-four radial directions in total, that is, the fluid squirts substantially in all directions. Therefore, a part of the leaking splash will be always observable regardless of the installation orientation of the coupling, and thus the abnormality can be easily recognized. If three fluid ejection ports 116 are circumferentially arranged at regular intervals, one port is always located at an angle of elevation greater than or equal to 30° on the upper half of the circumference, and thus an abnormality will be sufficiently noticeable. More preferably, six or more fluid ejection ports 116 should be circumferentially arranged at regular intervals, and in that case, one port is always located at an angle of elevation greater than or equal to 60° on the upper half of the circumference.

As described above, according to the present embodiment, since the fluid ejection port 116 functions as an ejection nozzle which squirts a fluid, the squirt fluid is easy to recognize, and the abnormality can be easily monitored. Therefore, the function of monitoring and warning of abnormality can be effectively and noticeably performed. Further, since the present invention has such an additional discharge function of ejecting the fluid from the fluid ejection ports 116 in an immediately noticeable fashion even from a distance, the present invention is suitable for a significantly-large system such as a large-capacity foam-water discharge system.

Further, as the fluid ejection ports 116 of the present embodiment, the notches 115, which prevent stress concentrations on the portions corresponding to the engagement hooks 113, are used. Therefore, as compared to the case of separately providing the fluid ejection ports 116, the structure can be simplified. It is also possible to provide the fluid ejection ports 116 in other positions of the region of the leak path 138, but in that case, it is necessary to take into consideration a decrease in the coupling strength associated with the processing of opening holes.

Still further, the deformation portion 140 of the present embodiment is hardly elongated until the pressure exceeds a predetermined unusually high pressure level, and normally, the sealing members 133 are pushed against each other, and the leakage of the fluid is prevented. However, when the pressure exceeds the predetermined pressure level, the deformation portion 140 is preferentially elongated to such an extent that the leak path 138 is opened. When the deformation portion 140 is elongated to such an extent that the leak path 138 is opened, the deformation portion 140 may be restored or may not be restored to the original shape, but if the deformation portion 140 is not restored to the original shape, the coupling part or the coupling itself needs to be replaced. Here, costs such as replacement or disposal of the coupling part 105 or the coupling 100 are considered to be inevitable because such an abnormality rarely occurs or the function is rarely activated, and also because when the function is activated, disruption or damage of the coupling state can be reliably prevented and a serious accident such as a fatal injury can be reliably avoided.

Figure 20:
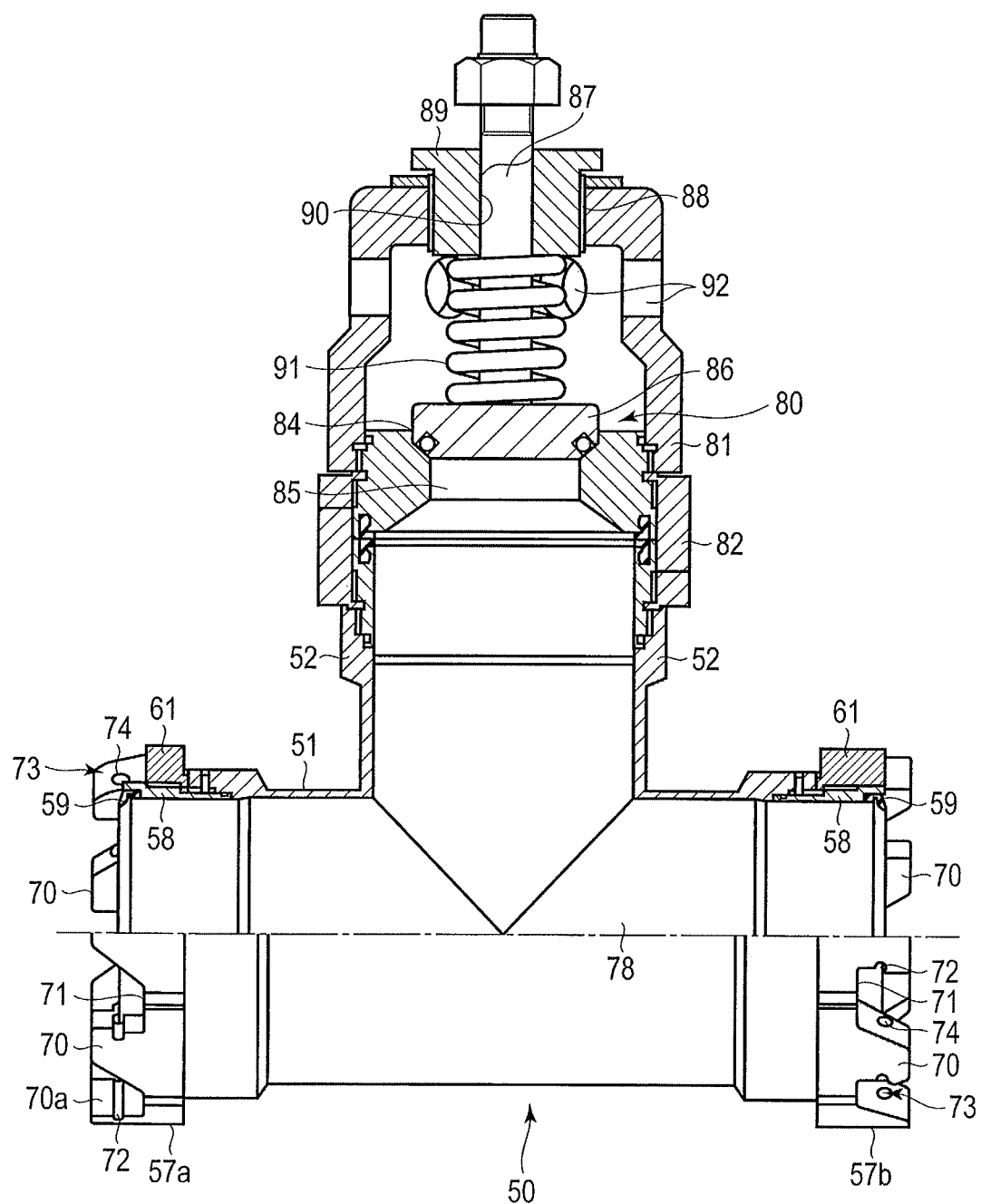
FIG. 20 is a side view partly in section of a coupling with a safety valve mechanism.

In the present embodiment, it is not necessary to incorporate the valve body 86, the valve seat 84 and the like of the safety valve 80 into the coupling as separate structural elements, comparing with the coupling shown in FIG. 20 conceived by the inventor. Further, it is not necessary to incorporate, as an urging element for the valve body 86, a large coil spring into the coupling, either. Further, in the present embodiment, it is possible to realize the coupling comprising the safety valve function by simply forming the deformation portion in a part of the coupling part itself which constitutes the coupling portion without changing the basic structures of the coupling portion and the seal portion of the coupling 100. Still further, since various members concurrently serve as a plurality of functional units, it is possible, without increasing the size of the coupling, to relatively simplify the structure of the coupling and to reduce the manufacturing cost of the coupling.

In the present embodiment, the sealing members of the valve bodies are pushed against each other and are sealed from the fluid in the normal operation, and when the pressure of the fluid to be transported is abnormally increased to high pressure, the coupling bodies are partly axially elongated without the coupling bodies will not be broken, the sealing member as the valve body (valve seat face) is separated from the sealing member or the seal portion as the counterpart valve seat face (valve body), and a leak path through which the high-pressure fluid is discharged is formed, and in this way, the safety valve function is realized. Therefore, it is unnecessary to separately incorporate into a coupling, an additional complicated valve body biasing device which discharges the abnormally-high-pressure fluid of the fluid passage.

Further, it is only necessary to provide the deformation portion such that a part of the coupling part within a predetermined range can be substantially uniformly deformed by a necessary amount. Therefore, it is possible to use one of the structural elements of the coupling, namely, the coupling part as the valve body urging device and to simplify the structure of the coupling.

Next, a coupling 100 of another embodiment will be described with reference to FIGS. 9 and 10. In the present embodiment, the basic structure of the coupling 100 is the same as that of the previous embodiment, and thus the same structural elements as those of the previous embodiment will be denoted by the same reference numbers.

In the coupling 100 of the embodiment, an inner surface 151 of an engagement projection 111 of one coupling portion 110 of a coupling part 105 is engaged with an outer periphery of a seal ring portion 131 of the counterpart coupling 100. When the fluid pressure significantly increases and the seal ring portions 131 and the like are lifted, as the distance corresponding to the lift amount increases, the gap between the inner surface 151 of the engagement projection 111 and the outer periphery of the seal ring portion 131 increases, accordingly. Further, to facilitate the operation of engaging or disengaging of the coupling, the center axis of couplings need to be aligned with each other, and thus when the pair of couplings is coupled together, the inner surface 151 of the engagement projection 111 is engaged with the outer periphery of the seal ring portion 131 of the counterpart. However, if the gap therebetween is too small, there is a problem with fitting the projecting seal ring portion 131 into the recessed inner surface 151 of the coupling portion 110.

To solve the above issue, the inner surface 151 of the engagement projection 111 is curved and inclined gradually separated from the outer periphery of the seal ring portion 131 of the counterpart coupling 100 toward the leading edge of the engagement projection 111. According to this structure, since the inner surface 151 of the engagement projection 111 is curved and inclined in this manner, as the distance from the counterpart coupling increases, the gap therebetween increases, accordingly. In the present embodiment, the gap between the inner surface 151 of the engagement projection 111 and the outer periphery of the seal ring portion 131 of the counterpart coupling 100 is used as a fluid discharge passage 153.

Further, the fluid discharge passage 153 communicates with a gap G3 formed between the seal ring portions 131 of the pair of the coupled couplings 100 and also with the gap G1 formed between the leading edge surface of the engagement projection 111 and the innermost wall surface of the engagement recess 112. Still further, the fluid discharge passage 153 also communicates with a gap G2 formed between the back surface of the engagement projection 111 and the back surface of the engagement recess 112.

Still further, the fluid discharge passage 153 communicates with the gap formed between the side surfaces provided with the engagement hooks 113 and also communicates with the fluid ejection ports 116. The fluid discharge passage 153 also communicates with the leak path 138 which is created when the pressure of a fluid to be transported significantly increases. Then, the abnormally-high-pressure fluid is swiftly discharged through the fluid discharge passage 153.

In the meantime, each gap is formed of upstanding walls which are perpendicular to the axis of the coupling and is open to the outside, and thus each gap communicates with the fluid discharge passage 153 and forms a fluid ejection port 155 which is open in a direction perpendicular to the axis of the coupling. Therefore, the high-pressure fluid is ejected from the fluid discharge port 155 in a direction perpendicular to the axis of the coupling, that is, in the radial direction of the coupling. Similarly, the fluid ejection port 116 is open in a direction perpendicular to the axis of the coupling.

Figure 10:
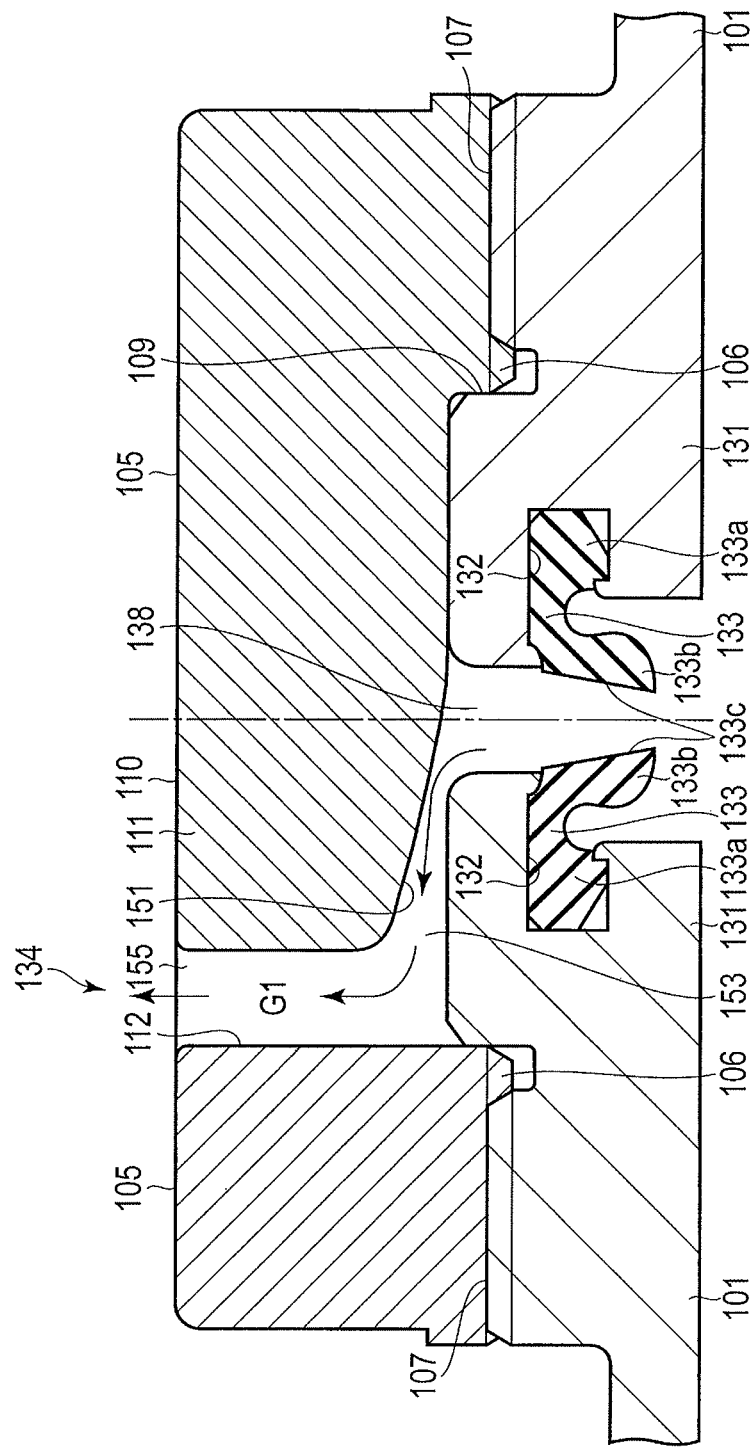
FIG. 10 is a drawing showing a region near the coupling portions and sealing portion when a safety function of the couplings of the modification is activated in the state shown in FIG. 9.

As described above, in the embodiment, when the pair of the couplings 100 is coupled together and if the pressure of the fluid to be transported abnormally exceeds the predetermined pressure level, as shown in FIG. 10, the seal ring portions 131 of the pair of the couplings 100 are lifted, and the leak path 138 is created between the seal ring portions 131. Then, as indicated by arrows in FIG. 10, the high-pressure fluid flows from the leak path 138 into the fluid ejection port 116 or the fluid ejection port 155 through the fluid discharge passage 153 and is then discharged from the coupling 100. Therefore, it is possible to immediately discharge the high-pressure fluid and to prevent breakage of the pair of the couplings, and it is also possible to notify of an abnormality by ejecting the high-pressure fluid from the circumferential portions in the radial directions of the coupling.

Example

Next, a tested example of the coupling will be described below. Here, a test specimen corresponds to the coupling used for a large-capacity foam-water discharge system (of a model which has working pressure of 1.3 MPa and is called a nominal 300 mm coupling).

The material and the property of the test specimen are as follows. First, the material is assumed to be A5083FH which is defined in the JIS H 4140-1988: "aluminum and aluminum alloy forgings". As compared to generally-used forged products, this material is more expensive and more intractable but is excellent in toughness (strong and not easily breakable).

Further, regarding the tensile strength and the elongation of the material of the test specimen, the JIS standard values and the average measurement values (measured in Yamagata Research Institute of Technology) are as follows.

| JIS standard values | Average measurement values |
| --- | --- |
| Tensile strength [N/mm$^2$] 275 or more | 296 (296, 296, 296) |
| Elongation [%] 16 or more | 28.7 (31, 29, 26) |

In the meantime, the material generally used for a large-diameter coupling for a large-capacity foam-water discharge system is an aluminum alloy sand mold casting and is greatly different from the forged aluminum alloy of the test specimen in elongation (toughness). Although a metal mold casting and the like are used by some manufacturing companies, the metal casting is basically castings, and thus it has not sufficiently toughness. In general, castings have limited elongation, and thus castings are plastically deformed immediately and end up being permanently deformed. Further, due to poor elongation, a coupling will not be significantly deformed but will be suddenly broken away.

The material generally used for this large-diameter coupling is AC7A which is defined in the JIS H 5202-1999: "aluminum alloy castings" and has the following standard values.

|  | JIS standard values |
|---|---|
| AC7A sand mold casting |  |
| Tensile strength [N/mm$^2$] | 140 or more |
| Elongation [%] | 6 or more |
| AC7A metal mold casting |  |
| Tensile strength [N/mm$^2$] | 210 or more |
| Elongation [%] | 12 or more |

Then, to examine a state of the coupling of the embodiment at a time when an abnormal fluid pressure surge occurs, a test for the coupling has been considered.

Here, in the case of a pressure test machine which can conduct a test under high pressure (5.2 MPa) which is four times the working pressure, the flow rate of its plunger pump is not that large. Therefore, when the inner pressure of the coupling increases up to an unusually high pressure level (3 to 4 times the working pressure) and the deformation portion of the test specimen is elongated, the sealing member is axially lifted and the fluid is discharged from the sealing portion, but as the fluid is discharged, the pump pressure significantly decreases. Once the fluid is discharged from the sealing portion, the pressure will not increase up to such an extent that the pressure becomes 4 times the working pressure or more. Therefore, in the present pressure test machine (plunger pump), it is impossible to actually observe behavior of the deformation portion at a time when the deformation portion is applied pressure higher than that level.

On the other hand, in the case of a volute pump actually used in a large-capacity foam-discharge system, although there are some pumps having sufficiently large flow rates, volute pumps can only increase the pressure up to such an extent that the pressure slightly exceeds the working pressure level. Further, as a method of creating in a laboratory, a water hammer phenomenon or an energy accumulation state where a hose expands in radial directions or in longitudinal directions and energy is accumulated (note that, in the case of a steel pipe, unlike a hose, a steel pipe hardly expands or energy is hardly accumulated), there are a testing method by accumulating energy by using a giant pump whose pumping capacity is significantly greater than those of the pumps of these two kinds or by using an accumulator or the like, but these methods are too dangerous. Therefore, these pressure test methods are not adopted.

Instead, a tensile test is conducted for a test specimen. In general, it is possible to calculate an axial load to be applied to the test specimen at a time when inner pressure of the coupling is increased up to an abnormally high pressure level by Pascal's law. In a case where inner pressure of the working pressure is applied to the test specimen, since the working pressure is 1.3 MPa (1,300,000 Pa) and the nominal diameter of the coupling, that is, the external diameter of the hose fitting portion (see FIG. 9) is 305 mm (0.305 m), the axial load will be 94.9 kN (kilonewton). As the deformation portion of the test specimen is applied a tensile force 3 to 4 times the tensile load, the deformation portion is elongated, and the seal ring portion (sealing member) is axially lifted.

Here, the axial load [N] is found from the following equation.

Figure 11:
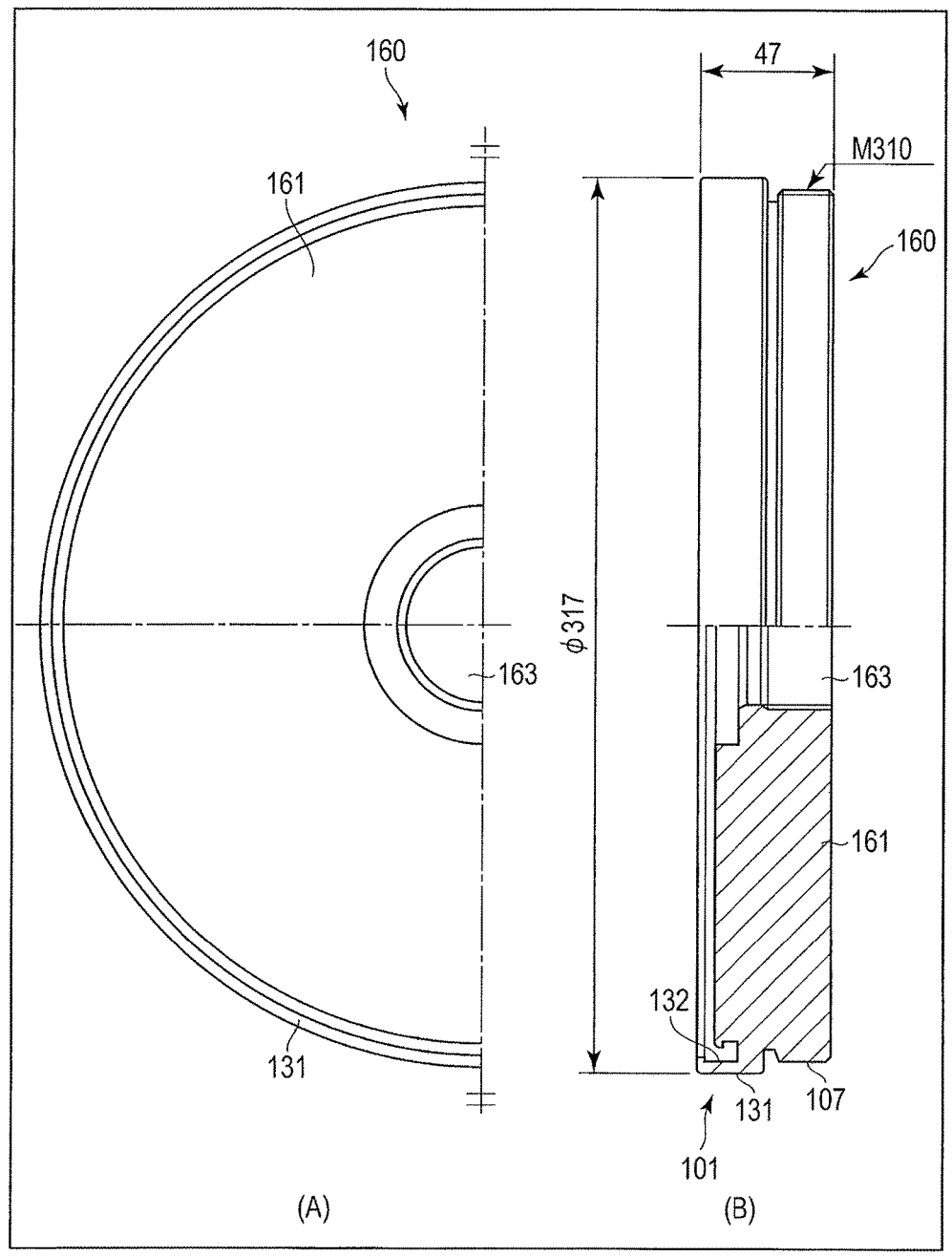
FIG. 11 including (A) and (B) is design drawing showing a part of a cross-section of a test specimen with shape and dimensions, corresponding to the coupling body of the embodiment.
Figure 12:
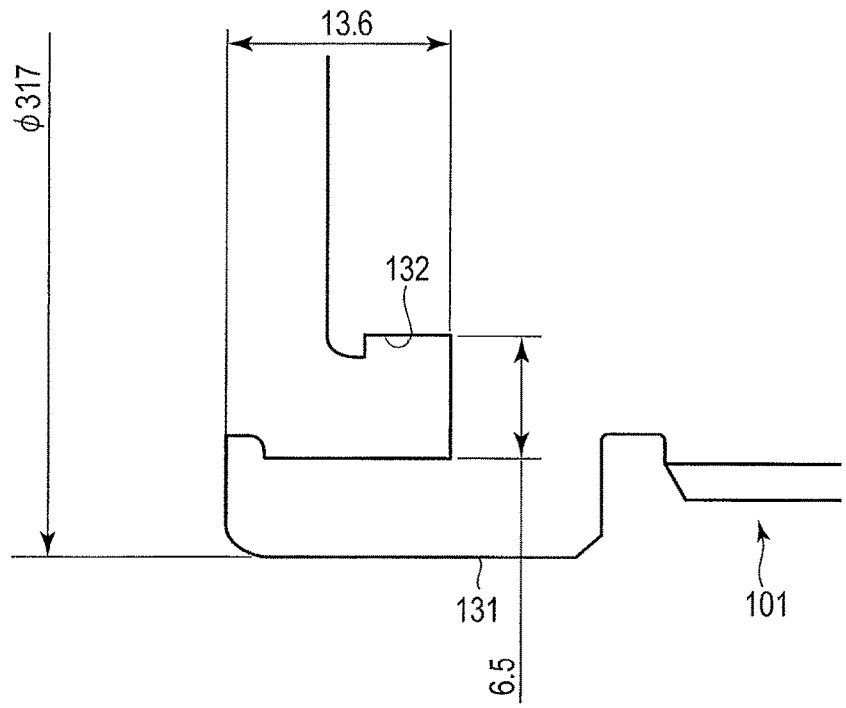
FIG. 12 is an enlarged cross-sectional view of a region near a sealing member built-in groove shown in FIG. 11.
Figure 13:
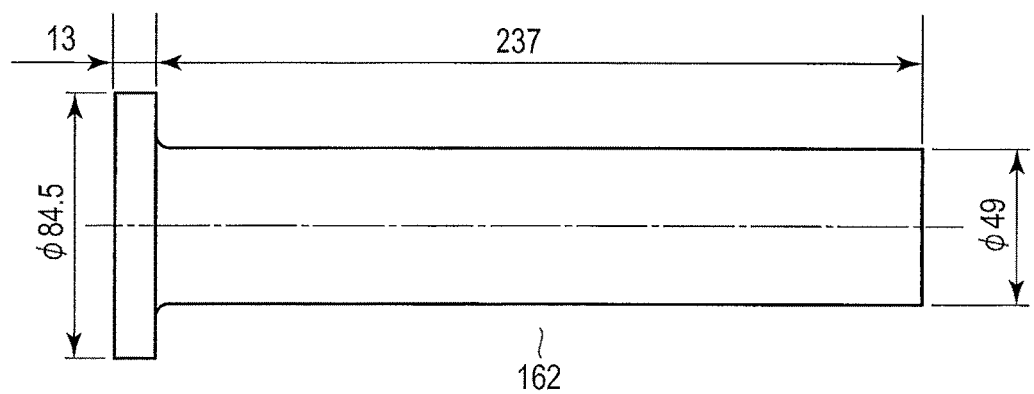
FIG. 13 is a design drawing showing a shape and dimensions of an element of a testing jig as a tensile rod attached to the test specimen corresponding to an example of the embodiment.
Figure 14:
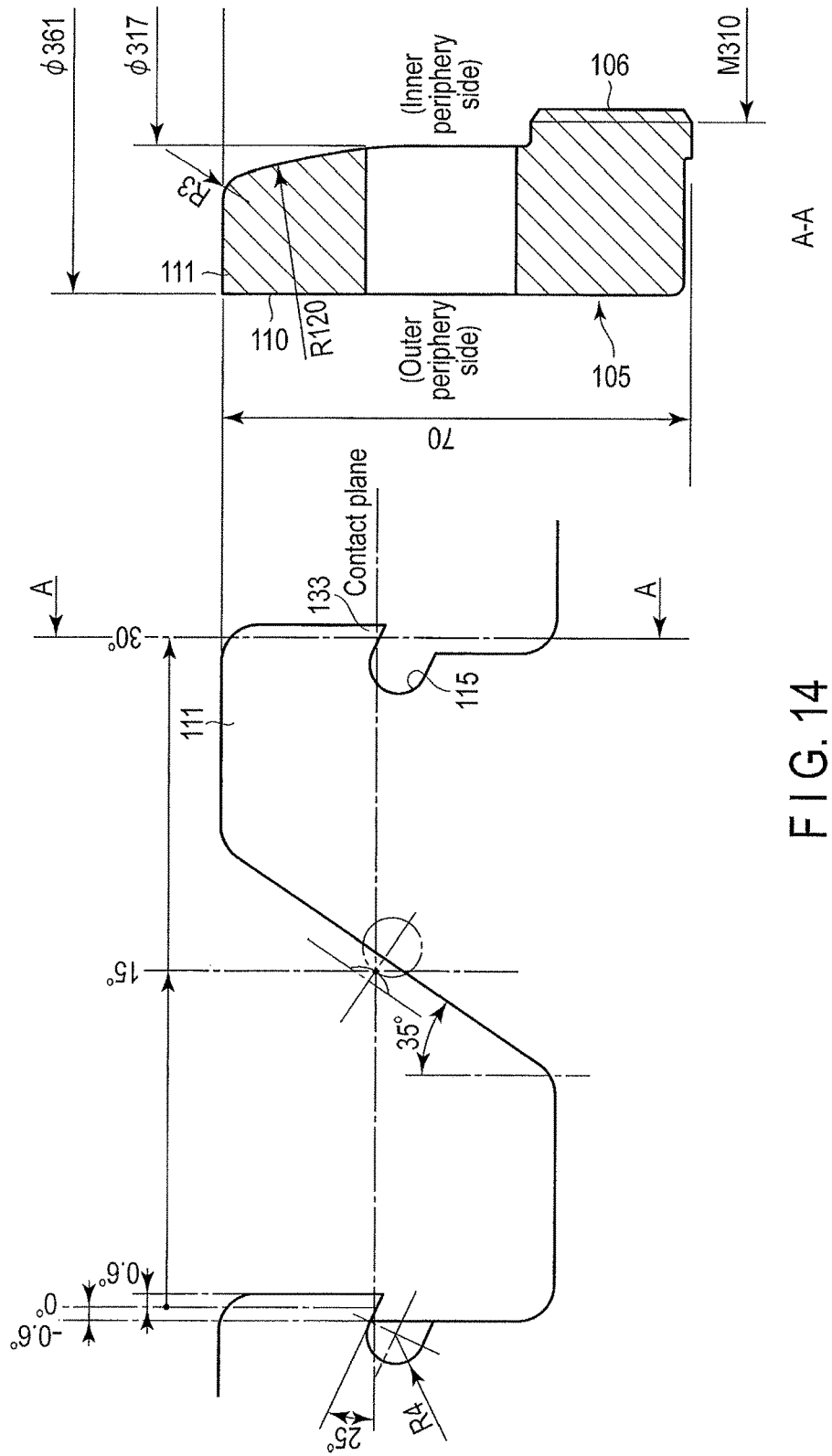
FIG. 14 is a development design drawing showing a part of the coupling portion within a range of 30° of the test specimen corresponding to the coupling body of the embodiment and a part of a cross-section of the coupling part with a shape and dimensions.
Figure 15:
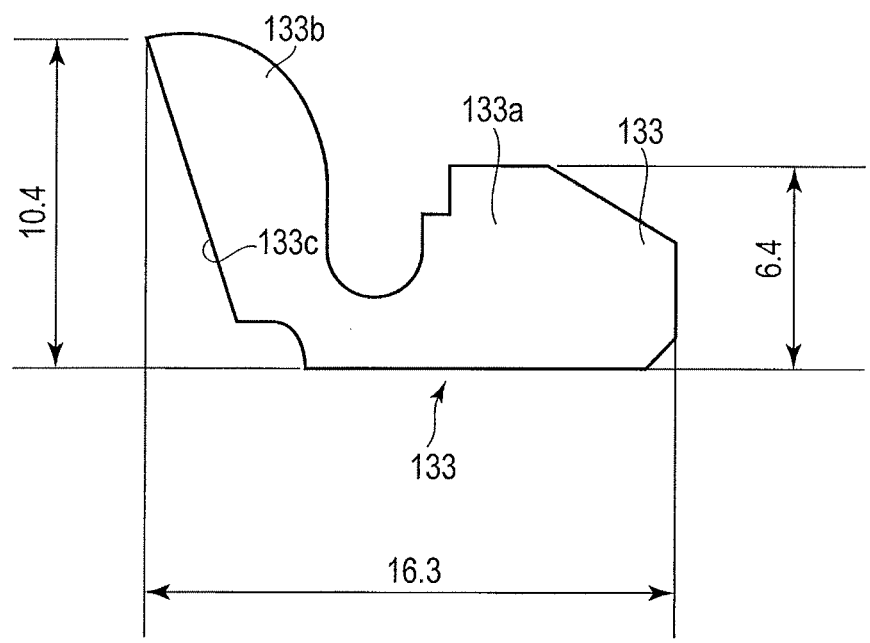
FIG. 15 is a design drawing showing a cross-sectional view of a sealing member of the test specimen with a shape and dimensions in an example of the embodiment.

The axial load $[N] = P\pi r^2 = 1{,}300{,}000 \times 3.14(0.305/2)^2 = 94{,}932$ Here, the shape and the dimensions of a test specimen 160 are shown in FIGS. 11 to 15. FIGS. 11 and 12 illustrate a test specimen corresponding to the coupling body 101, FIG. 13 illustrates a tensile rod 162, FIG. 14 illustrates a test specimen corresponding to the coupling part 105, and FIG. 15 illustrates a test specimen corresponding to the sealing member 133. A representation method of the shape and the dimensions is based on the JIS drafting standard and common drafting methods in Japan. Note that the dimensions are represented in the unit [mm].

Figure 4:
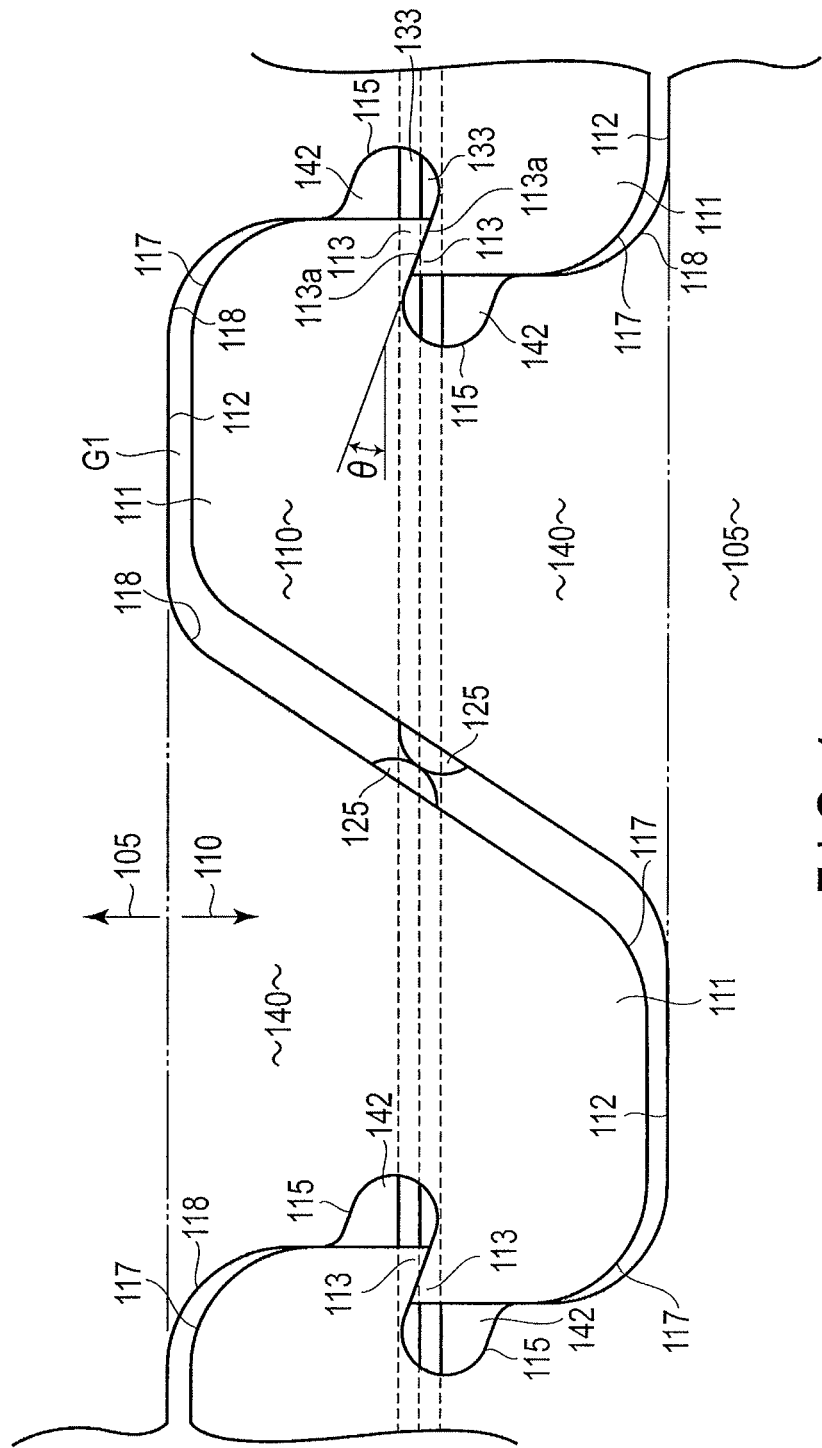
FIG. 4 is a drawing showing a region near coupling portions and sealing portions in a state where coupling portions of a pair of couplings are coupled together in the embodiment.

Here, the test specimen corresponds to the embodiment including the structural elements shown in FIGS. 4 and 5, and represents a coupling of such an embodiment where a coupling portion 110 is preferentially deformed.

Further, a test specimen corresponding to the coupling body 101 comprises a seal ring portion 131 around a sufficiently-strong supporting plate 161. Still further, an attachment hole 163 is formed in the center of the supporting plate 161, and the tensile rod 162 shown in FIG. 13 is inserted into the attachment hole 163.

Then, as the tensile rod 162 is inserted into the attachment hole 163 of the supporting plate 161, the supporting plate 161 is supported by the tensile rod 162, and the tensile rod 162 is then held by the chucks of the tensile testing machine. Subsequently, the pair of the test specimens is pulled away from each other, and in this way, the coupling portions 110 of the pair of the test specimens are applied tensile loads.

As the testing machine, a universal material testing machine RU500H-TK21 (500 kN) made by Tokyo Koki Manufacturing Co., LTD. settled at Industrial Technology Center of Tochigi Prefecture was used. Further, a load addition rate was 0.5 mm/min, a load range was 500 kN, and a displacement range was 100 mm.

As a result of the tensile test, the following data was obtained. FIG. 16 shows a test result represented as a graph of an axial tensile load and an axial deformation amount (displacement amount between chucks).

According to the result of the tensile test, there is a great difference between a slop obtained under a load of up to 390 kN and a slop obtained under a load of beyond that level. As is evident from the graph, elastic deformation has occurred under a load of up to 390 kN, and plastic deformation has occurred under a load of beyond that level. Further, the graph shows a jagged line at the point of a load of about 430 kN, and thus local breakage of the test specimen seems to have begun at that point. This shows that the coupling can be used without being broken under a load of up to about 440 kN. This load corresponds to about 4.6 times the working pressure. Note that an actual measurement value of the bursting pressure of the hose body is about 2.5 times the working pressure or less (3.0 MPa).

In the graph of the tensile testing result, the displacement amount indicates a displacement amount between the chucks of the tensile testing machine. Therefore, the displacement amount is the total displacement amount of the whole of the test specimens and also includes such a displacement amount which does not contributes to the axial lift effect of the seal ring portions 131 (sealing members 133) such as an amount of displacement of the supporting plate (solid plate) 161 associated with bowl-like deformation. In this way, it is possible to macroscopically understand the load/displacement characteristics of the whole test specimen.

Figure 17:
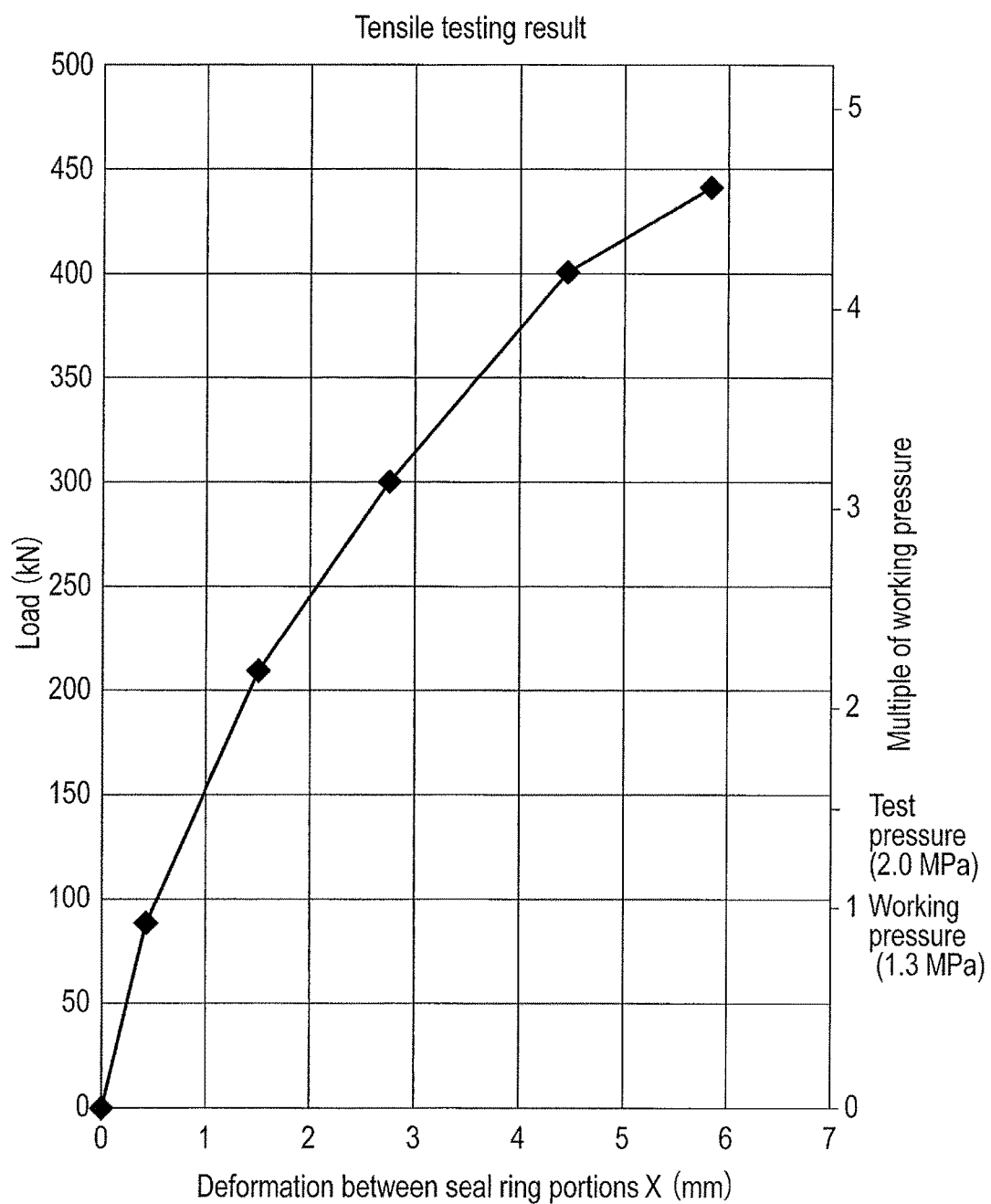
FIG. 17 is a graph showing a test result of the test specimen in terms of a tensile load and a displacement between seal rings.

Next, FIG. 17 shows a test result obtained at a time when the deformation portion of the test specimen, namely, the coupling portion 110 is axially elongated, the seal ring portion 131 (the sealing member 133) is axially lifted, and the fluid is then discharged from the seal ring portion. FIG. 17 is a graph showing data indicating a tensile load and a displacement amount between the pair of seal rings.

Figure 18B:
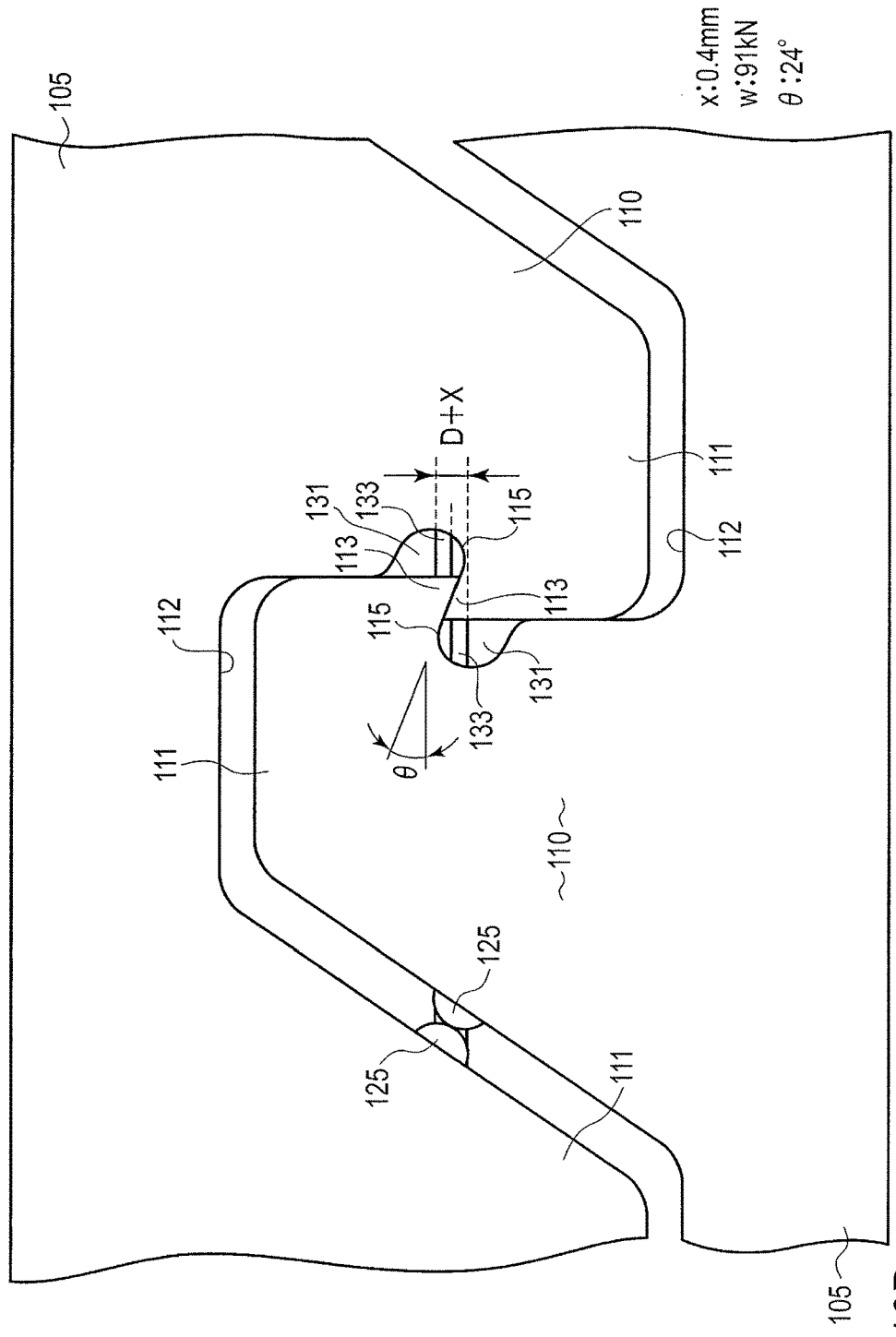
FIG. 18B is an explanatory drawing showing a deformation state of the coupling portion of the test specimen of the embodiment under a tensile load of 91 [kN].
Figure 18C:
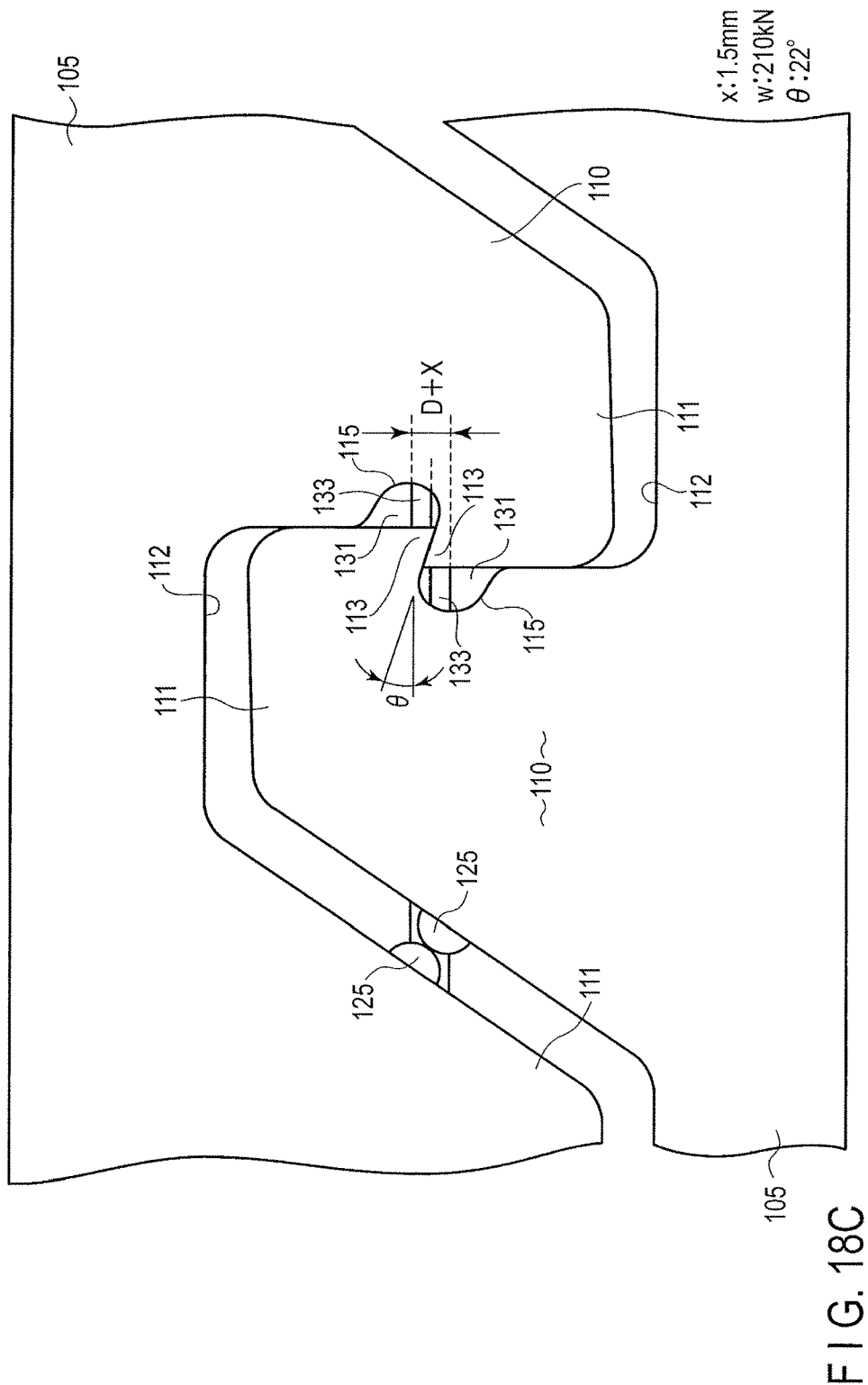
FIG. 18C is an explanatory drawing showing a deformation state of the coupling portion of the test specimen of the embodiment under a tensile load of 210 [kN].
Figure 18D:
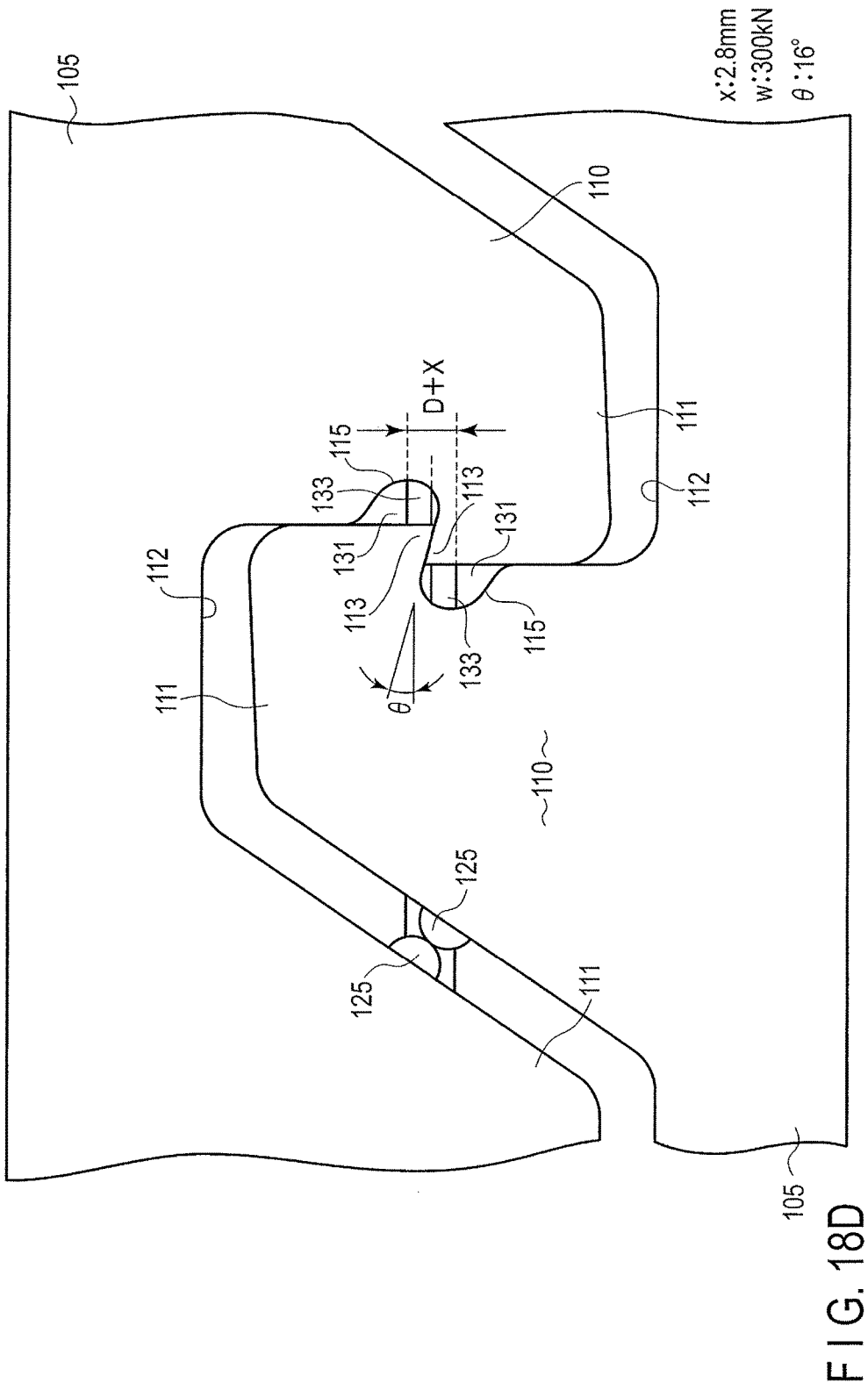
FIG. 18D is an explanatory drawing showing a deformation state of the coupling portion of the test specimen of the embodiment under a tensile load of 300 [kN].
Figure 18E:
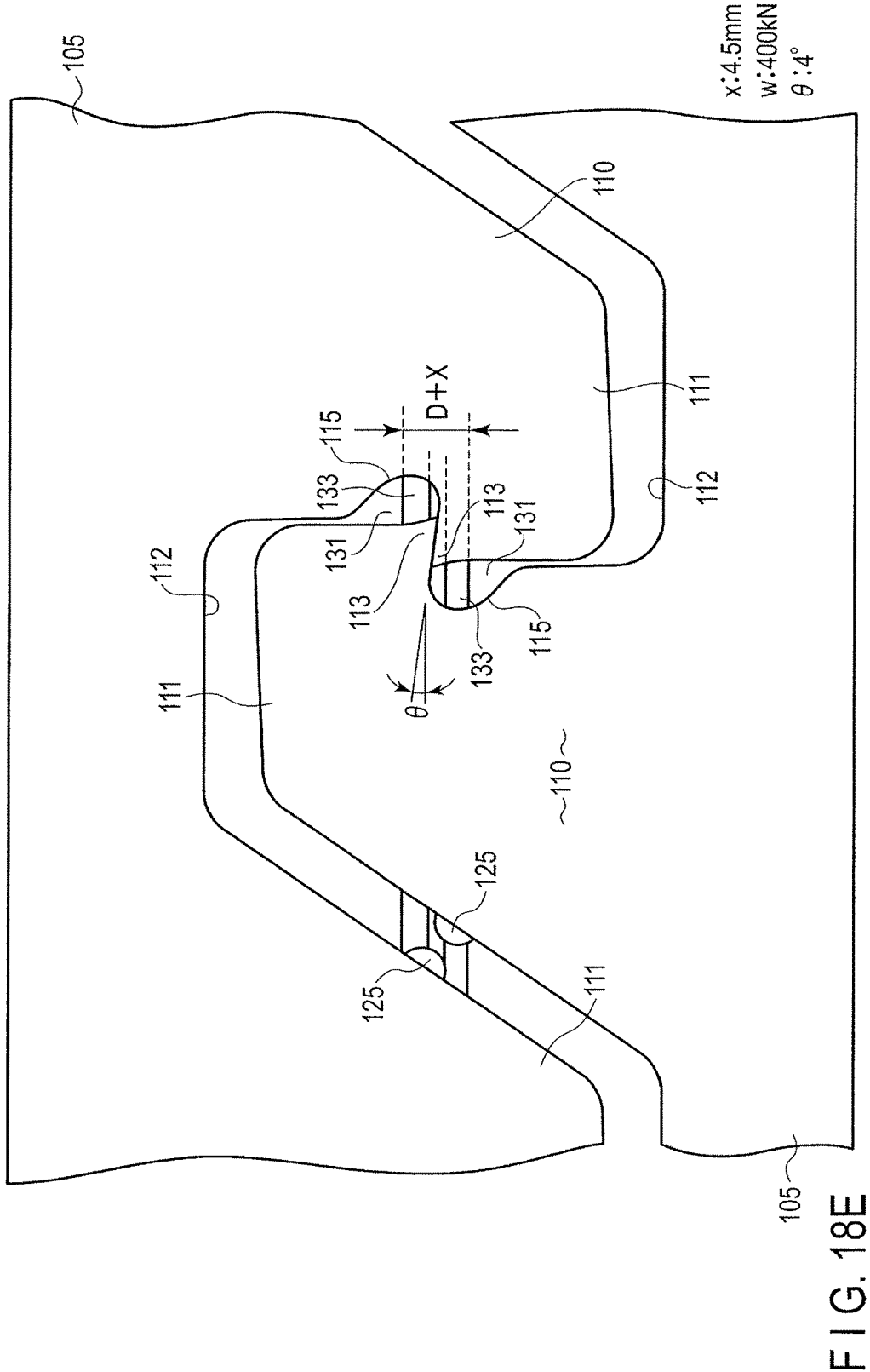
FIG. 18E is an explanatory drawing showing a deformation state of the coupling portion of the test specimen of the embodiment under a tensile load of 400 [kN].
Figure 18F:
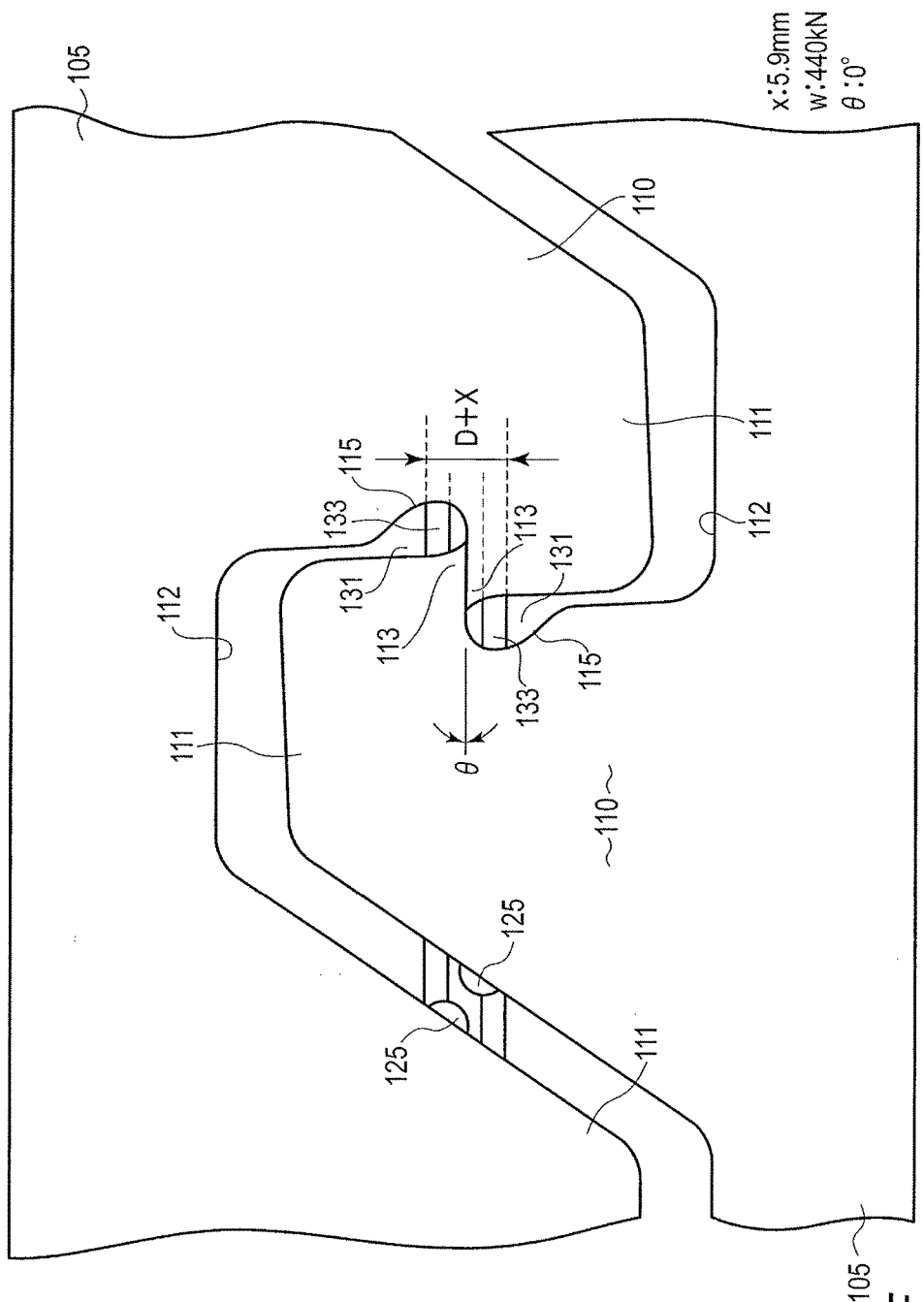
FIG. 18F is an explanatory drawing showing a deformation state of the coupling portion of the test specimen of the embodiment under a tensile load of 440 [kN].

Each of FIGS. 18A to 18F shows a tensile load and a deformation state of the coupling portion 110 under the tensile load. More specifically, FIG. 18A shows a case where the tensile load W is 2 kN and the displacement amount between the seal rings is 0.0 mm, FIG. 18B shows a case where the tensile load W is 91 kN and the displacement amount between the seal rings is 0.4 mm, FIG. 18C shows a case where the tensile load W is 210 kN and the displacement amount between the seal rings is 1.5 mm, FIG. 18D shows a case where the tensile load W is 300 kN and the displacement amount between the seal rings is 2.8 mm, FIG. 18E shows a case where the tensile load W is 400 kN and the displacement amount between the seal rings is 4.5 mm, and FIG. 18F is a case where the tensile load W is 440 kN and the displacement amount between the seal rings is 5.9 mm.

In this case, as shown in the graph of FIG. 17, when the maximum tolerable load of the coupling 100 which will not cause disruption of the coupling state of the coupling 100, that is, 400 kN (about 4.6 times the working pressure) is applied, the seal rings were lifted about 5.9 mm. This lift amount corresponds to 2.15/100 the inner diameter (275 mm) of the fluid passage 102 of the coupling 100, which is substantially equal to the diameter of the valve seat. Note that, since the pair of the couplings comprises two seal ring portions 131 (sealing members 133), this lift amount is the sum of the lift amounts of these two seal ring portions 131. Further, it has been found from the results of FIGS. 16 and 17 that about half the displacement amount of the whole test specimen contributes to the axial lift effect of the seal ring portions 131 (sealing members 133).

Further, engagement hook 113 is provided on one side of the engagement projection 111 (the coupling portion 110), and the engagement face 113a of the engagement hook 113 is axially engaged with that of the counterpart coupling. Now, the angle (counter-angle) θ of this engagement surface will be considered.

When applied a load greater than the test pressure of the coupling, the whole engagement projection 111 (the whole coupling portion 110) is, while being bent toward the side opposite to the engagement hook 113 side, axially stretched. Note that, since the bending deformation under the working pressure or the test pressure falls within the range of slight elastic deformation, the bending deformation springs back to the original shape when the load is released. In the test, a load was increased up to such an extent that the load was about 4.6 times the working pressure, and a counter-angle θ was measured under each load, and in this way, a change in the counter-angle θ was examined.

The counter-angle θ of the test specimen was 25° in the outer periphery development diagram, and in the tensile test, the counter-angle θ changed in the following manner under a large load.

| Load [kN] | Pressure [multiple of working pressure] | Counter-angle θ [degree] |
|---|---|---|
| 2 | 0.0 | 25 |
| 91 | 1.2 | 24 |
| 210 | 2.7 | 22 |
| 300 | 3.9 | 16 |
| 400 | 5.2 | 4 |
| 440 | 5.7 | 0 |

In the conventional coupling, after the test pressure (1.5 to 2.0 times the working pressure) is temporarily applied in the shipping inspection or the like, the coupling is used under such pressure less than or equal to the working pressure (normal maximum working pressure), and thus it has been considered that the bending deformation of the engagement projection 111 still falls within the spring back range. Therefore, although the counter-angle varies depending on the material, the size, the detailed shape or the like of the coupling, the counter-angle of about 15° would be sufficient for the conventional coupling.

However, the coupling comprising an integrated safety valve function is assumed to be applied pressure abnormally higher than the test pressure (3 to 4 times the working pressure), and thus it should be considered that the engagement projection 111 (coupling portion 110) is deformed and plasticity elongated when the coupling is applied the unusually pressure. Further, when the engagement projection 111 is deformed toward the side opposite to the engagement hook 113 side, the counter-angle θ decreases and the technical effect of the counter-angle θ diminishes, accordingly. Therefore, it is necessary to design the counter-angle θ steeply in expectation of the decrease of the counter-angle θ.

Therefore, the counter-angle θ of the coupling for the large-capacity foam-discharge system (called 150 to 400 mm nominal coupling) is set to 25°, although the counter-angle θ varies depending on the material, the size, the shape or the like of the coupling.

According to the test results, tolerable pressure where the coupling can be used without being broken was about 440 kN (about 4.6 times the working pressure), and under this pressure, the remaining counter-angle θ was substantially zero degree, and thus the counter-angle of the basic design, namely, the counter-angle of about 25° was the minimum angle and the optimal value. Further, if the counter-angle θ is shallow than that angle, the counter-angle θ will be deformed in the opposite direction under abnormally high pressure, and the axial load, which has been applied to the coupling, will generate a rotation force in the direction of uncoupling the couplings.

In contrast, if the counter-angle θ is too steep, unless a greater gap is secured between the end of the seal ring portion 131 of one coupling and the end of the seal ring portion 131 of the counterpart coupling in a state where the pair of the couplings is coupled together, the couplings cannot be engaged with or disengaged from each other. Therefore, the other members need to be enlarged in size, and thus the coupling cannot be formed in compact design.

Therefore, for the same reason, the counter-angle θ should be at least within a range of 20° to 30°, and more desirable, the counter-angle θ should be 25°.

Next, a result of a pressure resistance test will be described. As a test specimen, the coupling where the seal ring portions 131 were lifted about 5.9 mm under the load of 440 kN (about 4.6 times the working pressure) in the previous tensile test was also used in the pressure test, and the pressure and flow test of the test specimen was carried out.

Note that, when released from the load in the tensile test, the coupling slightly reset to the original shape by the springback effect of elastic deformation, but since the deformation of the coupling was mostly plastic deformation, the original lift amount could not be secured even after the coupling was released from the load.

Since the flow rate is essential to the pressure and flow test, although being somewhat powerless as compared to a large-capacity pump (pressure of 1.3 MPa and a flow rate of 20,000 L/min) actually used for a large-capacity foam-water discharge system, outdoor fire hydrant equipment (pressure of 0.9 MPa and a flow rate of 350 L/min) was used for the pressure and flow test.

First, the fluid pressure and the ejection operation of the test specimen were examined in the test. That is, the test specimen is sealed, and the inner pressure is gradually increased. When the inner pressure reached 0.4 MPa, the ejection of the fluid started, and the pressure is reduced. Then, when the valve of the outdoor fire hydrant is fully opened, the fluid squirts to a distance of 2 to 3 meters in the radial directions. At this time, since the fluid was ejected in large volume, the pressure could only be increased up to 0.3 MPa. As a result of the pressure and flow test, it was confirmed that it is possible to warn the operator or the like of the occurrence of the abnormality by the ejection of the fluid from the leak path.

Note that the angle of the engagement face has been assumed to be set to a range where, even if the engagement hook having the engagement face is deformed to the extent that the sealing member is separated from the other sealing member and the leak path through which the fluid is discharged to the outside is created between the sealing members when the coupling part is axially extended by the axial tensile forced applied to the coupling part during the pressure of the fluid within the coupling fitting body significantly increases, the engagement surface is still inclined in an overhanging manner at a positive angle and the engagement of the pair of the engagement hooks is maintained. However, the technical object can also be achieved in a case where the angle of the engagement face is set to a range where the engagement face is still inclined in an overhanging manner at a positive angle even when an axial load corresponding to the breaking pressure of the tube such as the hose connected to the coupling body is applied to the coupling body in the direction of separating the coupling bodies from each other. Further, the technical object can also be achieved in a case where the angle of the engagement face is set to a range where the engagement face is still inclined in an overhanging manner at a positive angle even if the engagement hook is axially deformed by an axial load applied to the coupling body in the direction of separating the coupling bodies from each other when the pressure of the fluid is 3 times the assumed working pressure of the coupling in a state where the engagement hook is engaged with the other engagement hook. Still further, the technical object can also be achieved in a case where the angle of the engagement surface is set to a range where the engagement surface is still inclined in an overhanging manner at a positive angle even if the engagement hook is deformed by an axial load applied to the coupling body in the direction of separating the coupling fitting body from the other coupling body when the pressure of the fluid reaches the test pressure of the coupling in a state where the engagement hook is engaged with the other engagement hook.

Note that, although a pair of twinstar (registered trademark) couplings comprising coupling portions of the same unisex structure has been used in each of the above-described embodiments, the coupling of each embodiment is not limited to any particular coupling portion type or a particular coupling type and is also applicable, for example, to a MultiLug coupling manufactured by AWG Fittings GmbH or to a Storz-type coupling (DIN14300 A-Druckkupplung) manufactured by Yone Corporation, or the like.

According to the above-described embodiments, in addition to the inventions of the claims, at least the following inventions can be realized.

1. A coupling which couples tubes to each other or the tube with another device, the coupling comprising: a coupling body including a fitting portion which is formed at one axial end of the coupling body and on which the tube or the other device is fitted, and a fluid passage which is formed inside the coupling body; a coupling part including an attachment portion which is formed at one axial end of the coupling part and is attached to the coupling body, and a coupling portion which is formed at the other axial end of the coupling part and is coupled with a counterpart coupling; a sealing member which is provided at the other axial end of the coupling body to close a gap with a sealing member of the counterpart coupling between the coupling and the counterpart coupling; an engagement hook which is provided in the coupling portion to engage with an engagement hook of the counterpart coupling; and an engagement face which is provided in the engagement hook and is inclined at an angle in an overhanging manner with respect to a circumferential direction of the coupling, wherein the engagement face is kept the angle in a range where the engagement face is still inclined in the overhanging manner at a positive angle, even if the coupling part is axially extended by a axial tensile force applied to the coupling part and the engagement hook having the engagement face is deformed to the extent that the sealing member is separated from the sealing member of the counterpart coupling and a leak path through which the fluid is discharged to the outside is created between the sealing member and the sealing member of the counterpart coupling when pressure of a fluid within the coupling body unusually increases, and the engagement hook is still maintained to be engaged with the engagement hook of the counterpart coupling.

2. A coupling which couples tubes to each other or the tube with another device, the coupling comprising: a coupling body including a fitting portion which is formed at one axial end of the coupling body and on which the tube is fitted, and a fluid passage which is formed inside the coupling body; a coupling part including an attachment portion which is formed at one axial end of the coupling part and is attached to the coupling body, and a coupling portion which is formed at the other axial end of the coupling part and is coupled with a counterpart coupling; a sealing member which is provided at the other axial end of the coupling body and closes a gap with a sealing member of the counterpart coupling fitting between the coupling and the counterpart coupling; an engagement hook which is provided in the coupling portion and is engaged with an engagement hook of the counterpart coupling; and an engagement face which is provided in the engagement hook and is inclined at an angle in an overhanging manner with respect to a circumferential direction of the coupling, wherein the engagement face is kept at the angle in a range where the engagement face is still inclined in the overhanging manner at a positive angle, even when an axial load corresponding to bursting pressure of the tube is applied to the coupling body in a direction of separating the coupling bodies from each other in a state where the engagement hooks are engaged with each other.

3. The coupling described in claims 1 or 2, wherein the deformation portion has a total lift amount in which the sealing member is separated from the sealing member of the counterpart the total lift amount is 1/100 the minimum inner diameter of the fluid passage of the coupling.

4. The coupling described in claims 1 or 2, an area of an opening of the sealing portion, which is opened when the deformation portion is elongated and the sealing member is axially lifted and thus the fluid is discharged to the outside, is 1% of the more of the minimum area of the fluid passage of the coupling body.

REFERENCE SIGNS LIST

100: Coupling
101: Coupling body
102: Fluid passage
103: fitting portion
105: Coupling part
110: Coupling portion
113: Engagement hook
113*a*: Engagement face
116: Fluid ejection port
138: Leak path
θ: Counter-angle (angle of engagement face)

What is claimed is:

1. A coupling which couples tubes to each other or the tube with another device, the coupling comprising:
   a coupling body including a fitting portion which is formed at one axial end of the coupling and on which the tube is fitted;
   a coupling portion which is formed at the other axial end of the coupling and is coupled with a counterpart coupling;
   an engagement hook which is provided in the coupling portion and is engaged with an engagement hook of the counterpart coupling; and
   a sealing face which axially abuts and closes a gap with a sealing face of the counterpart coupling, wherein
   a fluid passage is formed inside the coupling body,
   wherein the engagement hook protrudes in an axial direction of the coupling body, and
   the engagement hook includes a first side portion that is opposed to the engagement hook of the counterpart coupling in a circumferential direction of the coupling, a second side portion on a side opposite to the first side portion, and an engagement face in contact with the engagement hook of the counterpart coupling,
   wherein the engagement face includes a first edge on a side closer to the first side portion, and a second edge on a side closer to the second side portion, and
   the engagement face is inclined in an overhanging manner at an angle inclined with respect to the circumferential direction of the coupling such that the first edge is located closer to the coupling body than the second edge in the axial direction, the engagement face making the engagement hook engage further tightly with the engagement hook of the counterpart coupling when an axial load which acts in a direction to separate the couplings from each other in an engagement state where the engagement hooks are engaged with each other is produced, as a part of the load generates a component force in the circumferential direction of the coupling according to the angle of inclination in the overhanging manner which brings the engagement hooks further closer to each other in the circumferential direction in the engagement state, and wherein
   the engagement face is kept at the angle in a range where the engagement face is still inclined in the overhanging manner at a positive angle with respect to the circumferential direction of the coupling, which allows the first edge to be kept in a state of being closer to the coupling body than the second edge in the axial direction, whereby the engagement hooks are still maintained in the engagement state of being engaged with each other, even if the coupling portions or the couplings are deformed when an excess load is applied,
   the excess load is a load applied axially to the coupling portions or the couplings when pressure of a fluid increases up to bursting pressure of the tube, and
   the engagement face is kept at the angle in the range where the engagement face is still inclined in the overhanging manner at the positive angle with respect to the circumferential direction of the coupling even if the coupling portion is deformed when the axial load is produced, as a result of the pressure of the fluid increasing to 3 times a maximum working pressure of the coupling.

2. The coupling according to claim 1, wherein
   the engagement face is kept at the angle in a range where the engagement face is still inclined in the overhanging manner at the positive angle with respect to the circumferential direction of the coupling even if the coupling portion is deformed when the axial load is produced, as a result of the pressure of the fluid increasing up to a test pressure of the coupling, which is 1.5 times as high as the maximum working pressure.

3. The coupling according to claim 1, further comprising:
   a sealing member including a base portion and a tip portion, the tip portion including the sealing face, extending forward and projecting from the base portion to an inside of the coupling,
   wherein the coupling portion includes a ring portion including a groove portion which holds the sealing member, and
   the ring portion has an outer region and an inner region, the inner region retreats in the axial direction of the coupling with respect to the outer region, and an end of the inner region is opposed to the tip portion.

4. The coupling according to claim 3, wherein an end of the outer region has a projection which projects inward.

5. The coupling according to claim 1, wherein a center of the engagement hooks which are engaged with each other coincides with a plane of the sealing faces which are in contact with each other.

6. The coupling according to claim 1, wherein a plane of the sealing faces is located in such a position as to cross a gap formed between the second side portions of the engagement hooks.

7. A coupling which couples tubes to each other or the tube with another device, the coupling comprising:
   a coupling body including a fitting portion which is formed at one axial end of the coupling body and on which the tube or the other device is fitted, and a fluid passage which is formed inside the coupling body;
   a coupling part including an attachment portion which is formed at one axial end of the coupling part and is attached to the coupling body, a sealing member including a base portion and a tip portion, the tip portion including a sealing face, extending forward and projecting from the base portion to an inside of the coupling, the sealing face axially abutting and closing a gap with a sealing face of a tip portion of a sealing member of a counterpart coupling, a coupling portion which is formed at the other axial end of the coupling part and is coupled with the counterpart coupling, the coupling portion including a ring portion including a groove portion which holds the sealing member, and an engagement hook which is provided in the coupling portion and is engaged with an engagement hook of the counterpart coupling;

a deformation portion which is formed in the coupling part, the deformation portion creating a leak path through which a fluid is discharged to outside by separating the tip portion of the sealing face from the tip portion of the sealing face of the counterpart coupling when the deformation portion is axially elongated by a tensile force which is applied axially to the coupling part when pressure of a fluid within the coupling body abnormally increases; and an engagement face which is provided on the engagement hook that is engaged with the engagement hook of the counterpart coupling, the engagement face which is inclined at an angle in an overhanging manner in a circumferential direction of the coupling, wherein the engagement face is kept at the angle in a range where the engagement face is still inclined in the overhanging manner at a positive angle with respect to the circumferential direction of the coupling and the engagement hook is still maintained in the engagement state, even if the leak path through which the fluid is discharged to the outside is created by inverting the tip portion of the sealing member to the outside and opening the closed gap with the tip portion of the sealing member of the counterpart coupling which is similarly inverted when the deformation portion is elongated while the pressure of the fluid increases.

8. The coupling according to claim 7, wherein
the engagement face is kept at the angle in a range where the engagement face is still inclined in the overhanging manner at a positive angle with respect to the circumferential direction of the coupling even if the coupling portion is deformed by being applied an axial load which is generated when the pressure of the fluid increases to 3 times a maximum working pressure of the coupling.

9. The coupling according to claim 8, wherein
the engagement face is kept at the angle in a range where the engagement face is still inclined in the overhanging manner at a positive angle with respect to the circumferential direction of the coupling even if the coupling portion is deformed by being applied an axial load which is generated when the pressure of the fluid increases up to test pressure of the coupling, which is 1.5 times as high as the maximum working pressure.

10. The coupling according to claim 7, wherein
at least one of the coupling body, the coupling part, and the coupling portion is formed of a forged aluminum alloy having a tensile strength of 250 N/mm$^2$ or more and an elongation rate of 15% or more, and
the engagement face is set at the angle in a range of 20° to 30°.

11. The coupling according to claim 7, wherein the ring portion has an outer region and an inner region, the inner region retreats in an axial direction of the coupling with respect to the outer region, and an end of the inner region is opposed to the tip portion.

12. The coupling according to claim 11, wherein an end of the outer region has a projection which projects inward.

13. The coupling according to claim 7, wherein the sealing face of the tip portion is inclined such that an inner part of the sealing face in a radial direction projects forward with respect to an outer part of the sealing face.

14. The coupling according to claim 7, wherein a center of the engagement hooks which are engaged with each other coincides with a plane of the sealing faces of the sealing members which are in contact with each other.

15. The coupling according to claim 7, wherein a plane of the sealing faces of the sealing members is located in such a position as to cross a gap formed between back surfaces of the engagement hooks.

16. A coupling which couples tubes to each other or the tube with another device, the coupling comprising:
a coupling body including a fitting portion which is formed at one axial end of the coupling and on which the tube is fitted;
a coupling portion which is formed at the other axial end of the coupling and is coupled with a counterpart coupling;
an engagement hook which is provided in the coupling portion and is engaged with an engagement hook of the counterpart coupling; and
a sealing face which axially abuts and closes a gap with a sealing face of the counterpart coupling, wherein
a fluid passage is formed inside the coupling body,
wherein the engagement hook protrudes in an axial direction of the coupling body, and
the engagement hook includes a first side portion that is opposed to the engagement hook of the counterpart coupling in a circumferential direction of the coupling, a second side portion on a side opposite to the first side portion, and an engagement face in contact with the engagement hook of the counterpart coupling,
wherein the engagement face includes a first edge on a side closer to the first side portion, and a second edge on a side closer to the second side portion, and
the engagement face is inclined in an overhanging manner at an angle inclined with respect to the circumferential direction of the coupling such that the first edge is located closer to the coupling body than the second edge in the axial direction, the engagement face making the engagement hook engage further tightly with the engagement hook of the counterpart coupling when an axial load which acts in a direction to separate the couplings from each other in an engagement state where the engagement hooks are engaged with each other is produced, as a part of the load generates a component force in the circumferential direction of the coupling according to the angle of inclination in the overhanging manner which brings the engagement hooks further closer to each other in the circumferential direction in the engagement state, and wherein
the engagement face is kept at the angle in a range where the engagement face is still inclined in the overhanging manner at a positive angle with respect to the circumferential direction of the coupling, which allows the first edge to be kept in a state of being closer to the coupling body than the second edge in the axial direction, whereby the engagement hooks are still maintained in the engagement state of being engaged with each other, even if the coupling portions or the couplings are deformed when an excess load is applied,
the excess load is a load applied axially to the coupling portions or the couplings when pressure of a fluid increases up to bursting pressure of the tube, and at least one of the coupling body and the coupling portion is formed of a forged aluminum alloy having a tensile strength of 250 N/mm² or more and an elongation rate of 15% or more, and the engagement face is set at the angle in a range of 20° to 30°.

17. A coupling which couples tubes to each other or the tube with another device, the coupling comprising:
- a coupling body including a fitting portion which is formed at one axial end of the coupling and on which the tube is fitted;
- a coupling portion which is formed at the other axial end of the coupling and is coupled with a counterpart coupling;
- an engagement hook which is provided in the coupling portion and is engaged with an engagement hook of the counterpart coupling; and
- a sealing face which axially abuts and closes a gap with a sealing face of the counterpart coupling; and
- a sealing member including a base portion and a tip portion, the tip portion including the sealing face, extending forward and projecting from the base portion to an inside of the coupling, wherein
- a fluid passage is formed inside the coupling body,
- wherein the engagement hook protrudes in an axial direction of the coupling body, and
- the engagement hook includes a first side portion that is opposed to the engagement hook of the counterpart coupling in a circumferential direction of the coupling, a second side portion on a side opposite to the first side portion, and an engagement face in contact with the engagement hook of the counterpart coupling,
- wherein the engagement face includes a first edge on a side closer to the first side portion, and a second edge on a side closer to the second side portion, and
- the engagement face is inclined in an overhanging manner at an angle inclined with respect to the circumferential direction of the coupling such that the first edge is located closer to the coupling body than the second edge in the axial direction, the engagement face making the engagement hook engage further tightly with the engagement hook of the counterpart coupling when an axial load which acts in a direction to separate the couplings from each other in an engagement state where the engagement hooks are engaged with each other is produced, as a part of the load generates a component force in the circumferential direction of the coupling according to the angle of inclination in the overhanging manner which brings the engagement hooks further closer to each other in the circumferential direction in the engagement state, and wherein
- the engagement face is kept at the angle in a range where the engagement face is still inclined in the overhanging manner at a positive angle with respect to the circumferential direction of the coupling, which allows the first edge to be kept in a state of being closer to the coupling body than the second edge in the axial direction, whereby the engagement hooks are still maintained in the engagement state of being engaged with each other, even if the coupling portions or the couplings are deformed when an excess load is applied,
- the excess load is a load applied axially to the coupling portions or the couplings when pressure of a fluid increases up to bursting pressure of the tube, and
- the coupling portion includes a ring portion including a groove portion which holds the sealing member, and
- the sealing face of the tip portion is inclined such that an inner part of the sealing face in a radial direction projects forward with respect to an outer part of the sealing face.

\* \* \* \* \*